(12) United States Patent
Yamaguchi

(10) Patent No.: US 10,402,125 B2
(45) Date of Patent: Sep. 3, 2019

(54) SYSTEM FOR CHECK PRINTING

(71) Applicant: CANON KABUSHIKI KAISHA, Tokyo (JP)

(72) Inventor: Naohiro Yamaguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 27 days.

(21) Appl. No.: 14/884,829

(22) Filed: Oct. 16, 2015

(65) Prior Publication Data

US 2016/0034229 A1 Feb. 4, 2016

Related U.S. Application Data

(63) Continuation of application No. 12/199,453, filed on Aug. 27, 2008, now abandoned.

(30) Foreign Application Priority Data

Sep. 4, 2007 (JP) .................................. 2007-229457

(51) Int. Cl.
*G06F 3/12* (2006.01)
*H04N 1/00* (2006.01)
(Continued)

(52) U.S. Cl.
CPC .......... *G06F 3/1204* (2013.01); *G06F 3/1217* (2013.01); *G06F 3/1264* (2013.01); *G06F 3/1282* (2013.01); *H04N 1/0032* (2013.01); *H04N 1/00411* (2013.01); *H04N 1/00432* (2013.01); *H04N 1/00472* (2013.01); *H04N 1/00474* (2013.01); *H04N 1/00482* (2013.01); *H04N 1/00633* (2013.01); *H04N 1/00639* (2013.01); *H04N 1/00832* (2013.01);
(Continued)

(58) Field of Classification Search
CPC .......... H04N 1/00633; H04N 1/00917; H04N 2201/3219; H04N 2201/0098; H04N 1/00411; G06F 3/1217; G06F 3/1282; G06F 3/1256; G06K 15/025
USPC ...................................................... 358/1.15
See application file for complete search history.

(56) References Cited

U.S. PATENT DOCUMENTS 3,742,244 A 6/1973 Raible
3,936,180 A * 2/1976 Willard .................. G03G 15/22
271/303
(Continued)

FOREIGN PATENT DOCUMENTS

JP 7-210037 * 8/1995
JP 2000079742 A 3/2000
(Continued)

OTHER PUBLICATIONS

English language machine translation of JP 7-210037 to Hansen.*
(Continued)

*Primary Examiner* — Eric A. Rust
(74) *Attorney, Agent, or Firm* — Rossi, Kimms & McDowell LLP

(57) ABSTRACT

A printer is caused to perform a checking print for a job in a case that a predetermined user's instruction is received via a user interface. The printer is caused to perform the checking print for the job without receiving the predetermined user's instruction in a case that the job meets a predetermined condition.

19 Claims, 27 Drawing Sheets

(51) Int. Cl.
  *H04N 1/23* (2006.01)
  *H04N 1/32* (2006.01)

(52) U.S. Cl.
  CPC ..... *H04N 1/00917* (2013.01); *H04N 1/00954* (2013.01); *H04N 1/2338* (2013.01); *H04N 1/32* (2013.01); *H04N 2201/0094* (2013.01); *H04N 2201/0098* (2013.01); *H04N 2201/3205* (2013.01); *H04N 2201/3214* (2013.01); *H04N 2201/3215* (2013.01); *H04N 2201/3219* (2013.01); *H04N 2201/3221* (2013.01)

(56) References Cited

U.S. PATENT DOCUMENTS

| 4,501,419 | A | 2/1985 | Takahashi et al. |
|---|---|---|---|
| 6,685,368 | B1 * | 2/2004 | Beckman ............... G06K 15/02 400/61 |
| 7,336,909 | B2 | 2/2008 | Yamazaki |
| 2002/0171868 | A1 | 11/2002 | Yoshimura et al. |
| 2004/0027602 | A1 | 2/2004 | Kuboki |
| 2004/0046989 | A1 | 3/2004 | Matsugi |
| 2006/0034631 | A1 | 2/2006 | Lofthus et al. |
| 2006/0061807 | A1 | 3/2006 | Matsuda |
| 2006/0092453 | A1 | 5/2006 | Okada et al. |
| 2006/0165421 | A1 | 7/2006 | Yamazaki |
| 2007/0058221 | A1 | 3/2007 | Heink et al. |
| 2008/0030756 | A1 | 2/2008 | Carney et al. |

FOREIGN PATENT DOCUMENTS

| JP | 2003134279 A | | 5/2003 |
|---|---|---|---|
| JP | 2004054912 A | | 2/2004 |
| JP | 2004310746 A | | 11/2004 |
| JP | 2004310747 A | | 11/2004 |
| JP | 2006205407 A | | 8/2006 |
| JP | 2007-041505 A | * | 2/2007 |
| JP | 2007041353 A | | 2/2007 |
| JP | 2007196475 A | | 8/2007 |

OTHER PUBLICATIONS

English langage machine translation of JP 2007-041505 A to Yamamoto et al.*
Office Action issued in U.S. Appl. No. 12/199,453, dated Jul. 22, 2011.
Office Action issued in U.S. Appl. No. 12/199,453, dated Jan. 5, 2012.
Office Action issued in U.S. Appl. No. 12/199,453, dated Jul. 6, 2012.
Office Action issued in U.S. Appl. No. 12/199,453, dated Jan. 7, 2013.
Office Action issued in U.S. Appl. No. 12/199,453, dated May 9, 2013.
Office Action issued in U.S. Appl. No. 12/199,453, dated Nov. 25, 2013.
Office Action issued in U.S. Appl. No. 12/199,453, dated Jul. 9, 2014.
Office Action issued in U.S. Appl. No. 12/199,453, dated Nov. 25, 2014.
Office Action issued in U.S. Appl. No. 12/199,453, dated Mar. 17, 2015.
Office Action issued in U.S. Appl. No. 12/199,453, dated Sep. 11, 2015.

* cited by examiner

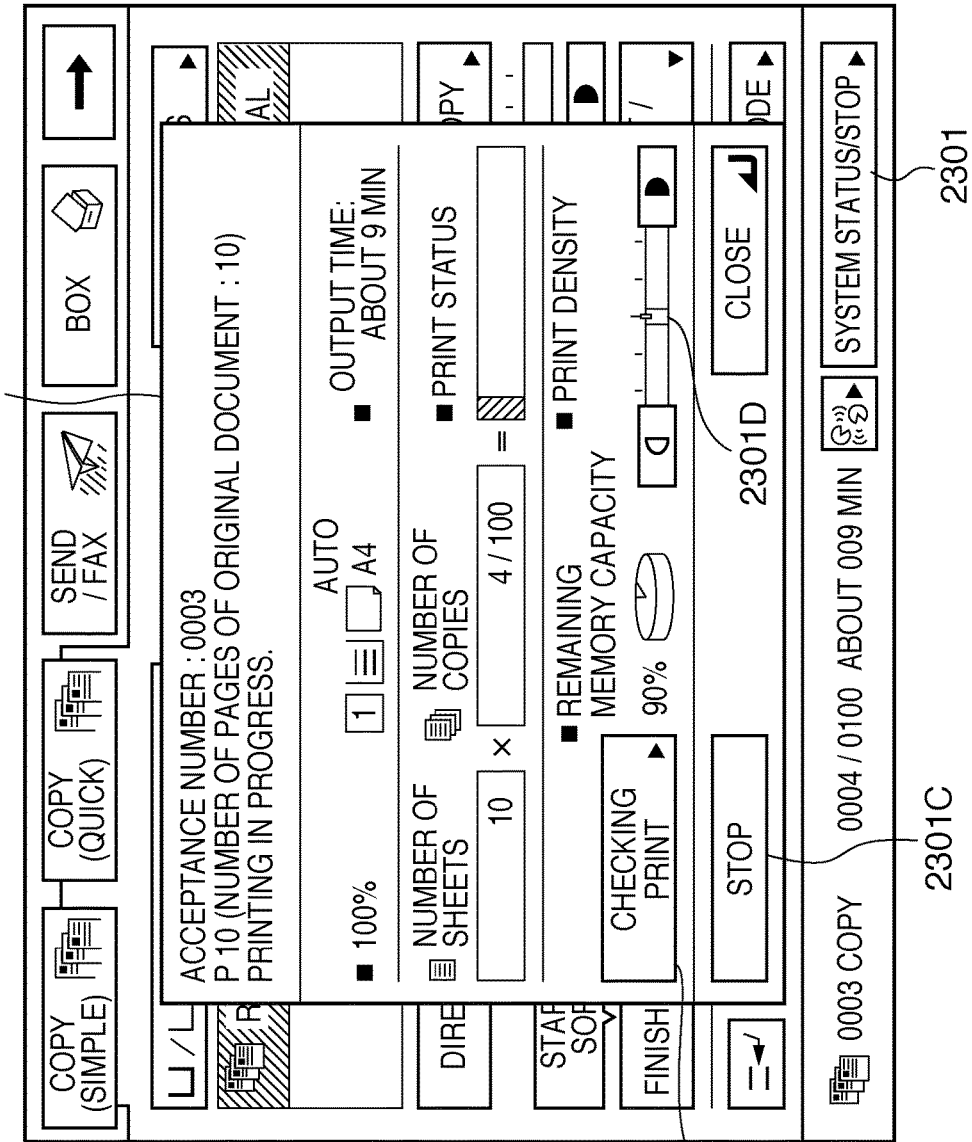

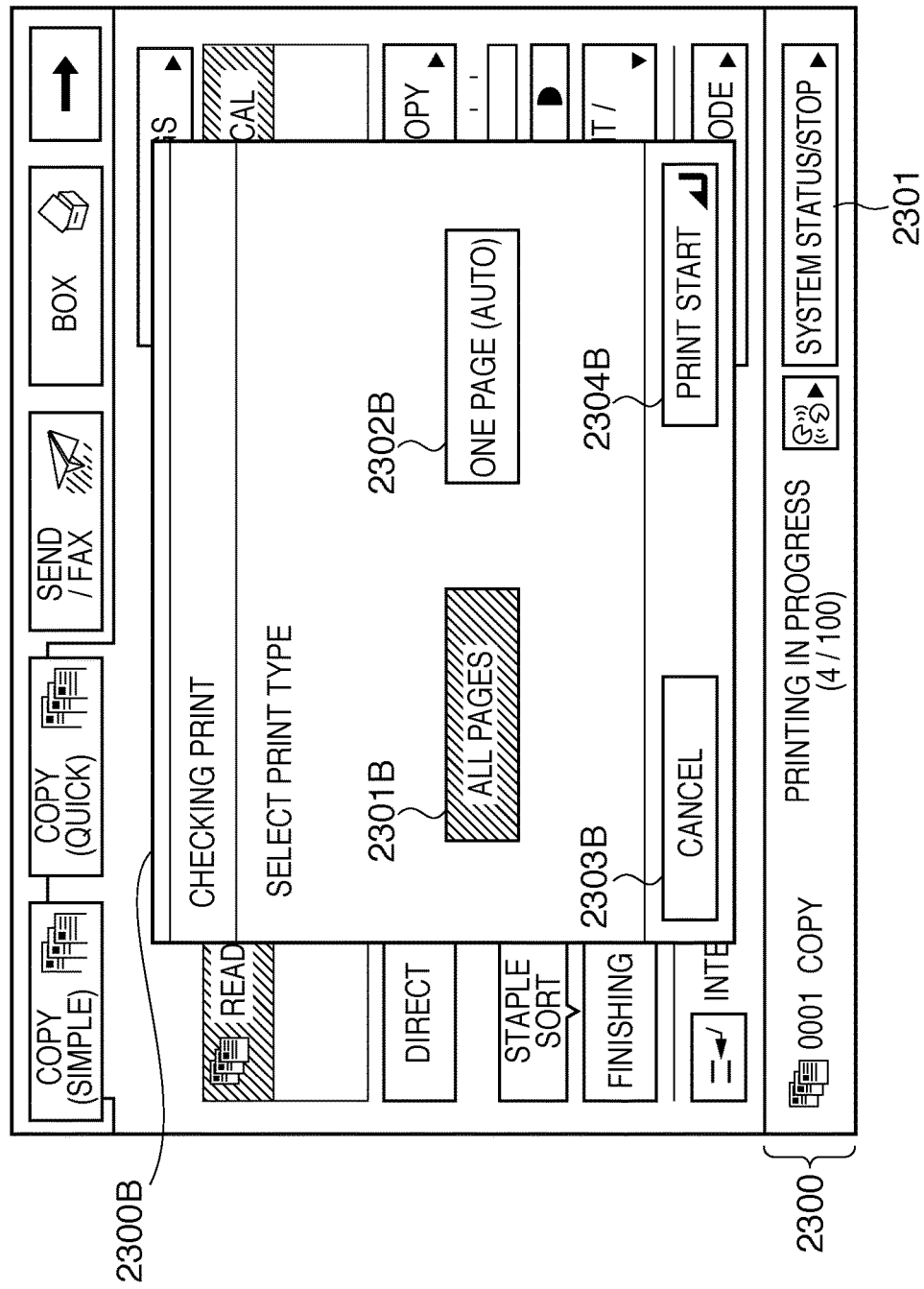

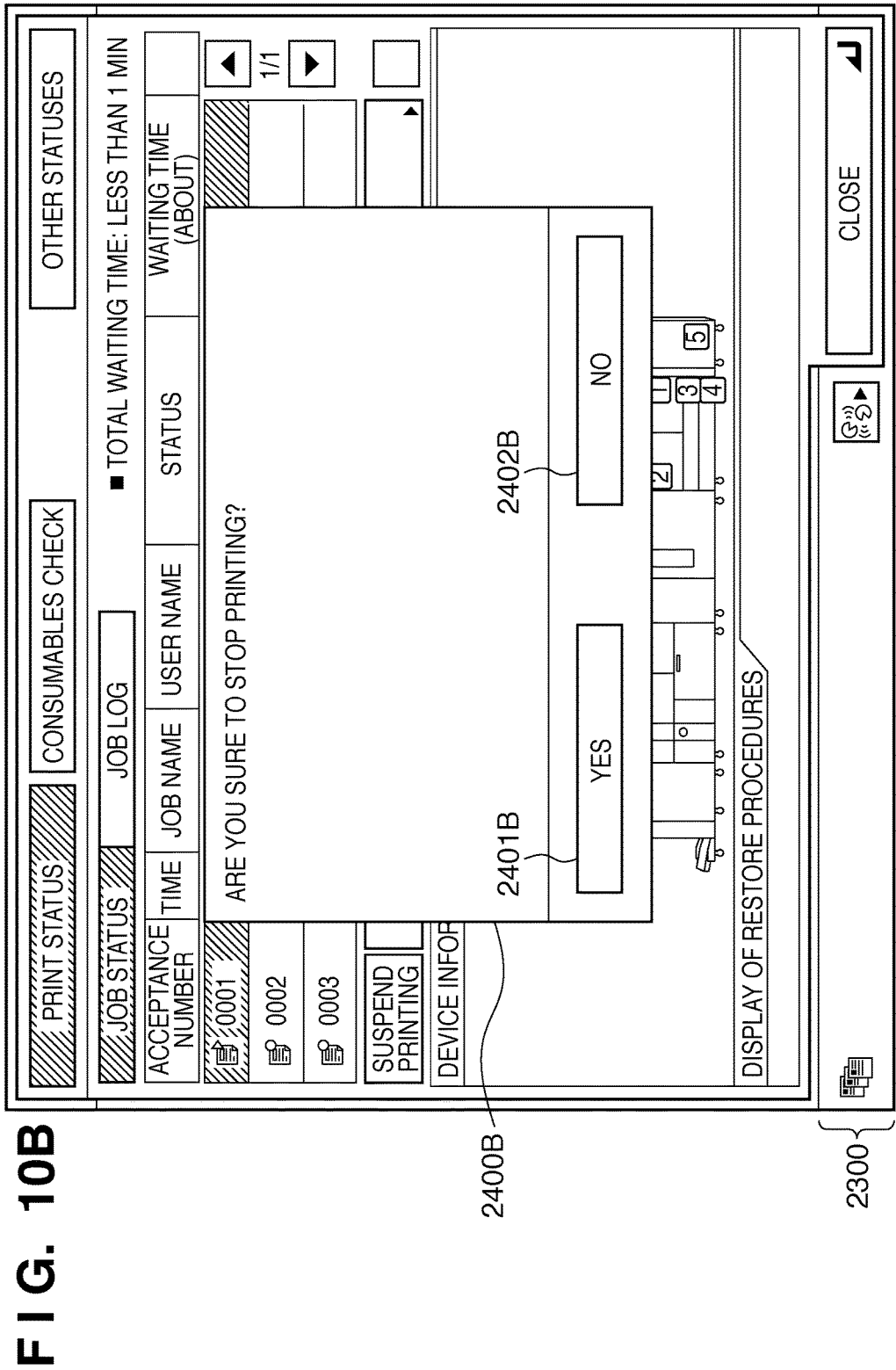

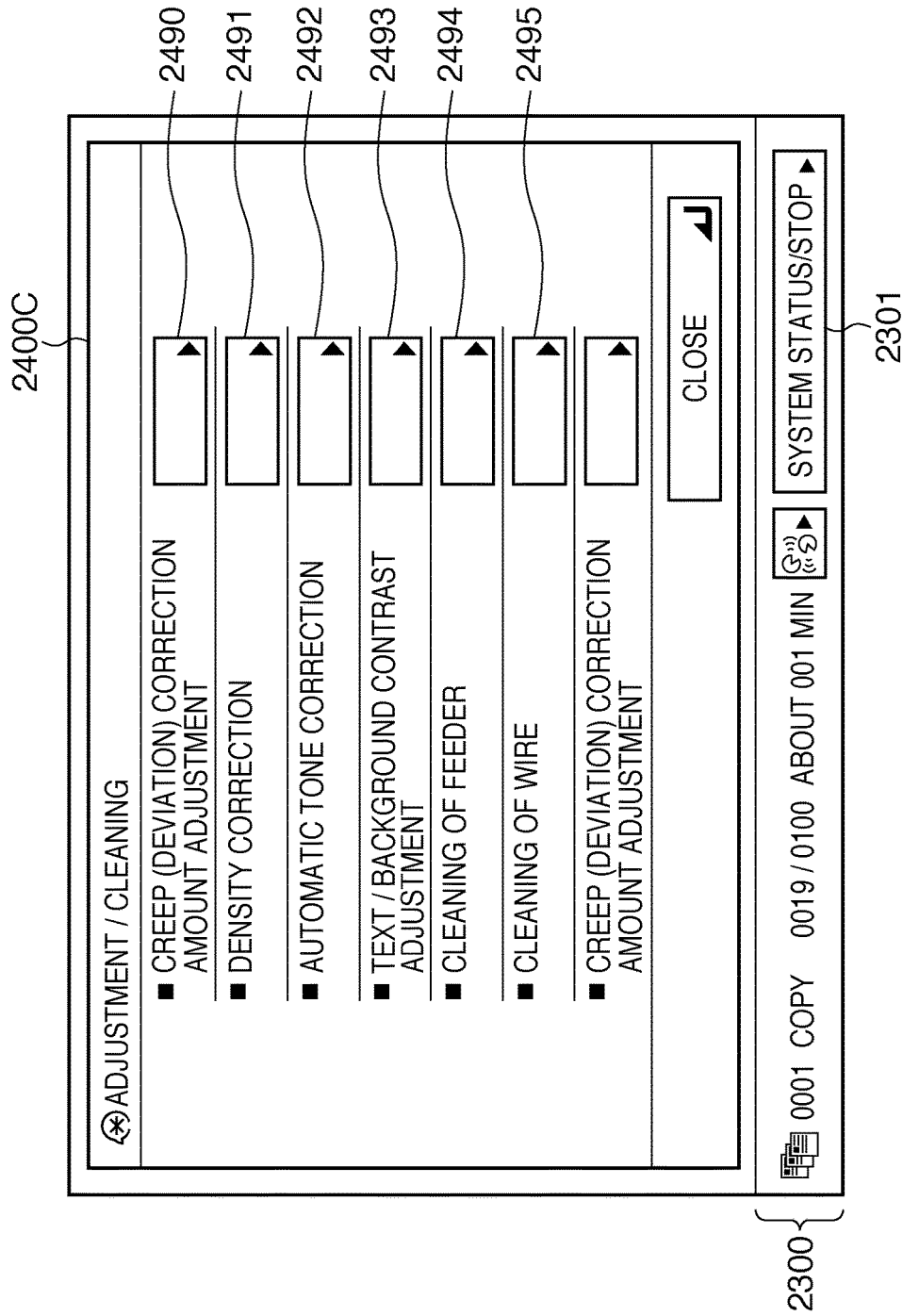

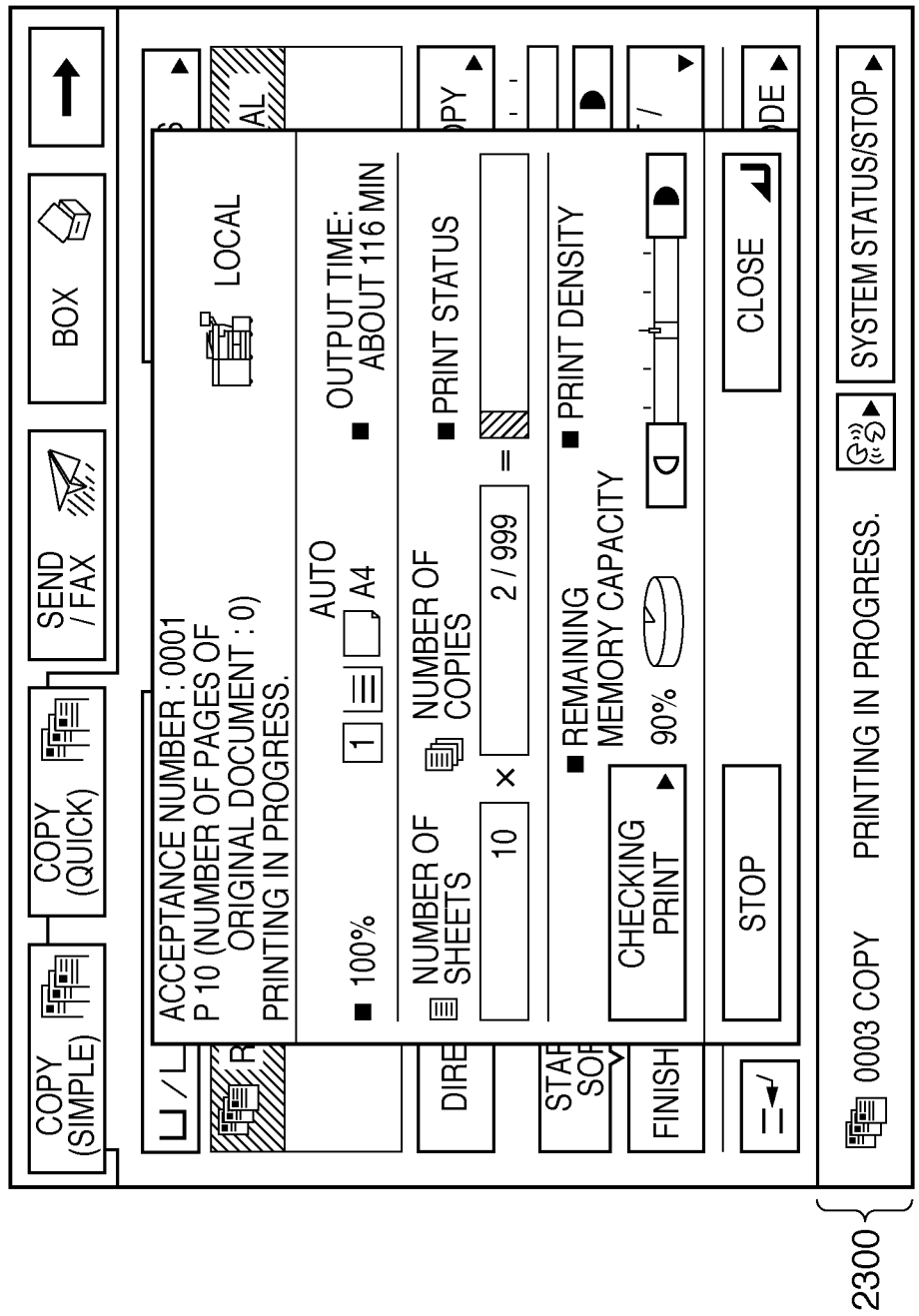

SYSTEM FOR CHECK PRINTING

BACKGROUND OF THE INVENTION

Field of the Invention

The present invention relates to a printing system, controlling method, printing apparatus, and storage medium.

Description of the Related Art

In a conventional printing industry, an offset reproduction printing press has been used in printing processing, so the block copy preparation process is indispensable. However, once the block copy is prepared, it is difficult to correct the block copy, and correcting the block copy raises the cost. Hence, the block copy preparation requires careful proofreading (i.e., careful layout check and color confirmation), and it takes time to issue publications.

In this situation, POD (Print On Demand) printing systems using electrophotographic and inkjet printing apparatuses have been proposed recently (see patent references 1 and 2).

The POD printing system can omit the block copy preparation and other cumbersome work processes.

[Patent Reference 1]
Japanese Patent Laid-Open No. 2004-310746
[Patent Reference 2]
Japanese Patent Laid-Open No. 2004-310747

However, there is room for further study in commercializing the POD printing system.

Assume that the printing company or the like uses the POD printing system. In this printing environment, it is important to efficiently create customer-satisfactory print materials as many as possible in a short period.

In this printing environment, it is expected that the operator at the printing site needs to check whether the printing system outputs print materials which satisfy the customer. It is also expected that the printing system needs to continuously operate without unnecessarily stopping the print operation of the printing system.

Considering these requirements, there will be a need to check print materials in the above-described way without unnecessarily stopping the print operation of the printing system. In the future, the following need will arise. That is, the operator wants a print unit to perform printing automatically by a print checking function on condition that a job to be printed satisfies a condition to cause the print unit to perform printing automatically using the checking print function available to check printing results and/or change printing conditions. However, a mechanism which meets this need has not been proposed at present.

SUMMARY OF THE INVENTION

The present invention has been made to overcome the conventional drawbacks. That is, it is an object of the present invention to build a user-friendly printing environment capable of effectively using a checking print without unnecessarily bothering the operator.

According to the first aspect of the present invention, there is provided a printing system comprising: a receiver adapted to receive a predetermined user's instruction via a user interface, the predetermined user's instruction being adapted to request a checking print, the checking print being adapted to perform at least one of checking of a printing result and changing of a printing condition; and a controller adapted to cause a printer to perform the checking print for a job in a case that the predetermined user's instruction is received via the user interface, wherein the controller is adapted to cause the printer to perform the checking print for the job without receiving the predetermined user's instruction via the user interface in a case that the job meets a predetermined condition, the predetermined condition being adapted to cause the printer to perform the checking print automatically.

According to the second aspect of the present invention, there is provided a printing apparatus which can be adapted to the printing system of the first aspect, the apparatus comprising the printer, the receiver, and the controller.

According to the third aspect of the present invention, there is provided a controlling method adapted to a printing system configured to cause a printer to perform a checking print, the checking print being adapted to perform at least one of checking of a printing result and changing of a printing condition, the method comprising: causing the printer to perform the checking print for a job in a case that a predetermined user's instruction is received via a user interface, the predetermined user's instruction being adapted to request the checking print; and causing the printer to perform the checking print for the job without receiving the predetermined user's instruction via the user interface in a case that the job meets a predetermined condition, the predetermined condition being adapted to cause the printer to perform the checking print automatically.

Further features of the present invention will become apparent from the following description of exemplary embodiments with reference to the attached drawings.

BRIEF DESCRIPTION OF THE DRAWINGS

FIG. 9D is a view showing an example of a user interface window;

FIG. 9E is a view showing an example of a user interface window;

FIG. 10B is a view showing an example of a user interface window;

FIG. 10C is a view showing an example of a user interface window;

FIG. 14 is a view showing an example of a user interface window;

DESCRIPTION OF THE EMBODIMENTS

Preferred embodiments of the present invention will be described in detail with reference to the accompanying drawings. These embodiments are merely examples of a preferred configuration of the present invention set forth in the following claims, and the present invention is not limited to these embodiments.

Figure 1:
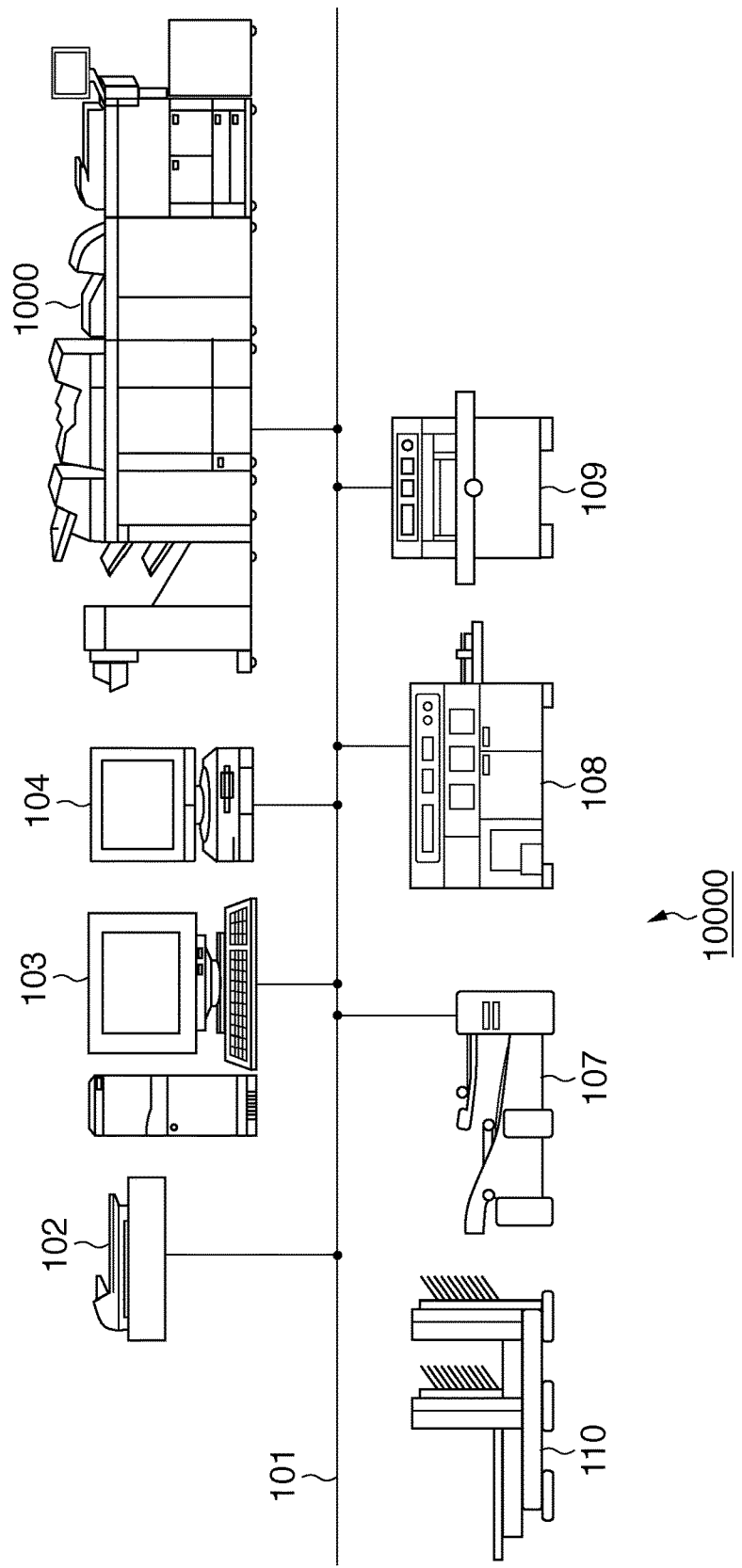
FIG. 1 is a view showing an example of the configuration of a POD system 10000.

A POD system 10000 in FIG. 1 comprises a printing system 1000, scanner 102, server computer 103 (PC 103), and client computer 104 (PC 104), which are connected via a network 101. The POD system 10000 also comprises a paper folding apparatus 107, sheet cutting device 109, saddle stitching apparatus 110, case binding apparatus 108, and the like.

Figure 2:
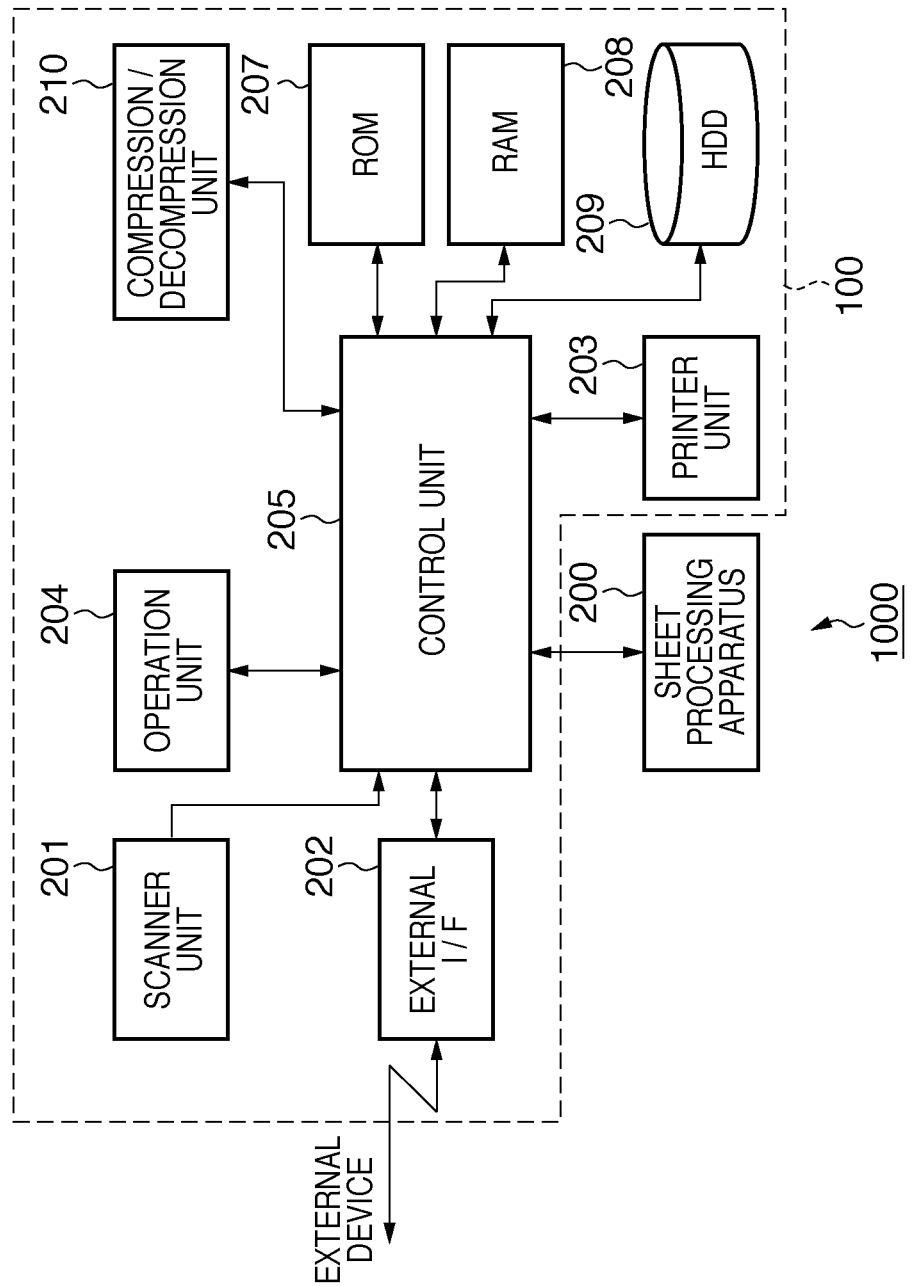
FIG. 2 is a block diagram for explaining an example of the internal configuration of a printing system 1000.

As shown in FIG. 2, the printing system 1000 comprises a printing apparatus 100 and sheet processing apparatus 200. As the printing apparatus 100, the embodiment will exemplify a MFP (Multi Function Peripheral) having a plurality of functions such as the copy function and printer function. However, the printing apparatus 100 may also be a single function type printing apparatus having only the copy function or printer function.

The PC 103 manages data transmission/reception to/from a variety of apparatuses connected to the network 101. The PC 104 transmits image data to the printing apparatus 100 and PC 103 via the network 101. The paper folding apparatus 107 folds sheets printed by the printing apparatus 100. The case binding apparatus 108 case-binds sheets printed by the printing apparatus 100. The sheet cutting device 109 cuts each bundle of sheets printed by the printing apparatus 100. The saddle stitching apparatus 110 saddle-stitches sheets printed by the printing apparatus 100.

In the use of the paper folding apparatus 107, case binding apparatus 108, sheet cutting device 109, and saddle stitching apparatus 110, the user takes sheets printed by the printing apparatus 100 out of the printing system 1000, sets them in an apparatus for use, and causes the apparatus to process the sheets. A plurality of apparatuses in the POD system 10000 of FIG. 1 except the saddle stitching apparatus 110 are connected to the network 101 and can communicate data with each other.

The configuration of the printing system 1000 will be explained with reference to the system block diagram of FIG. 2.

The printing apparatus 100 incorporates units shown in FIG. 2 in the printing system 1000 except the sheet processing apparatus 200. The printing apparatus 100 allows connecting an arbitrary number of sheet processing apparatuses 200.

The printing system 1000 is configured to allow the sheet processing apparatus 200 connected to the printing apparatus 100 to perform sheet processing for sheets printed by the printing apparatus 100. The printing system 1000 can also be built from only the printing apparatus 100 without connecting the sheet processing apparatus 200.

The sheet processing apparatus 200 is configured to be communicable with the printing apparatus 100, and can perform sheet processing (to be described below) upon receiving an instruction from the printing apparatus 100. A scanner unit 201 scans an image on an original document, converts it into image data, and transfers the image data to another unit. An external I/F 202 transmits/receives data between the printing apparatus 100 and other apparatuses connected to the network 101. A printer unit 203 prints an image based on input image data on a sheet. An operation unit 204 comprises a hard key input section (key input section) 402 and touch panel section 401 (to be described later), and accepts an instruction from the user via them. The operation unit 204 presents various displays on the touch panel of the operation unit 204.

A control unit 205 controls all the processes, operations, and the like of various units of the printing system 1000. That is, the control unit 205 also controls the operation of the printing apparatus 100 and that of the sheet processing apparatus 200 connected to the printing apparatus 100. A ROM 207 stores various computer programs to be performed by the control unit 205. For example, the ROM 207 stores programs to cause the control unit 205 to perform various processes of a flowchart (to be described later), and a display control program necessary to display various setup windows (to be described later). The ROM 207 also stores a program to cause the control unit 205 to analyze PDL (Page Description Language) code data received from the PC 103, PC 104, or the like, and rasterize it into raster image data. In addition, the ROM 207 stores a boot sequence, font information, and the like. A RAM 208 stores image data sent from the scanner unit 201 and external I/F 202, various programs loaded from the ROM 207, and setting information. The RAM 208 also stores information on the sheet processing apparatus 200 (e.g., the number of (0 to n) sheet processing apparatuses 200 connected to the printing apparatus 100, information on the functions of each sheet processing apparatus 200, and the connection order of the sheet processing apparatuses 200).

An HDD (Hard Disk Drive) 209 includes a hard disk, and a driving unit for reading/writing data from/in the hard disk. The HDD 209 is a large-capacity storage device which stores image data that is input from the scanner unit 201 or external I/F 202 and compressed by a compression/decompression unit 210. The control unit 205 can cause the printer unit 203 to print image data stored in the HDD 209 on the basis of an instruction from the user. The control unit 205 can also transmit image data stored in the HDD 209 to an external apparatus such as the PC 103 via the external I/F 202 on the basis of an instruction from the user.

The compression/decompression unit 210 compresses/decompresses image data and the like stored in the RAM 208 and HDD 209 according to various compression schemes such as JBIG and JPEG.

Figure 3:
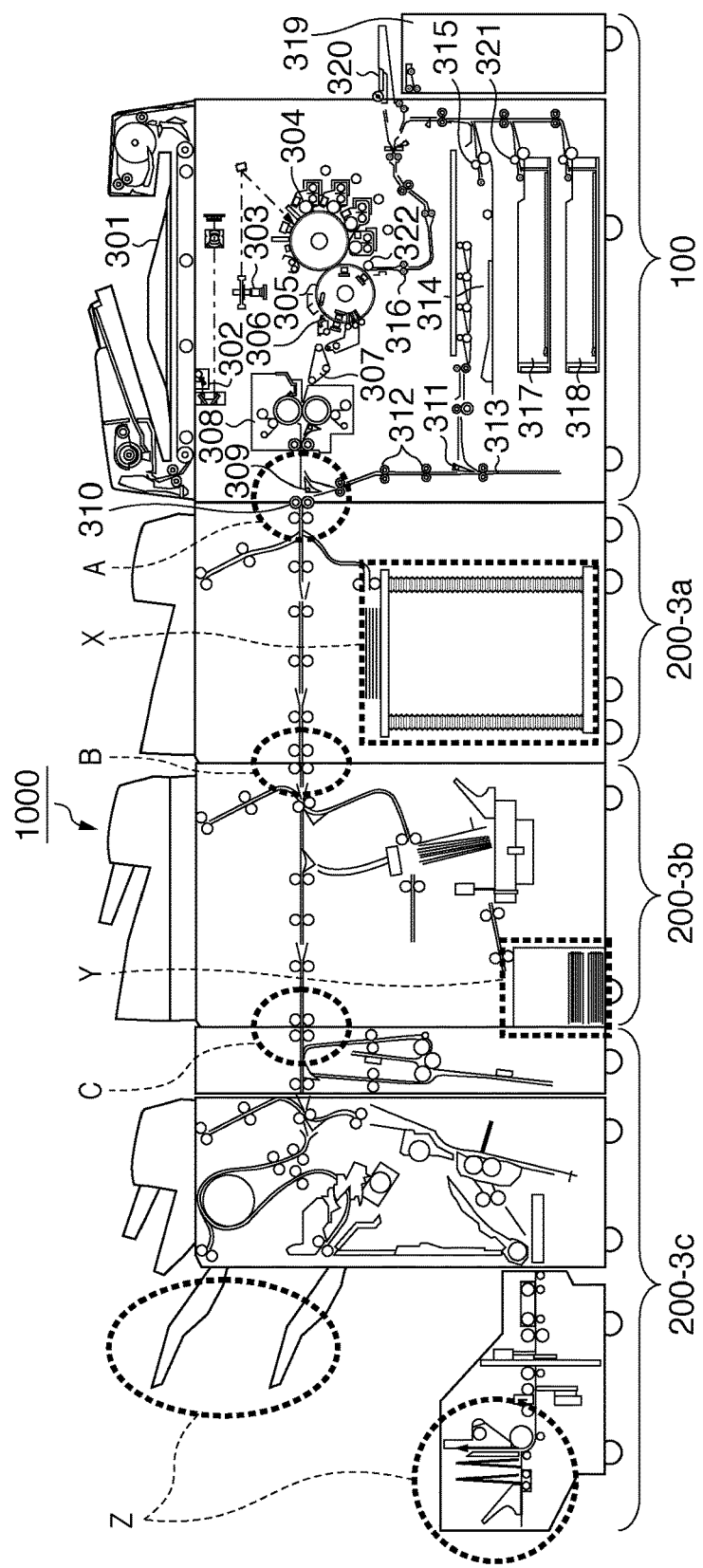
FIG. 3 is a sectional view of a printing apparatus 100 and a sheet processing apparatus 200 connected to the printing apparatus 100.

The configuration of the printing system 1000 will be explained with reference to FIG. 3. FIG. 3 is a sectional view of the printing apparatus 100 and the sheet processing apparatuses 200 connected to the printing apparatus 100.

An auto document feeder (ADF) 301 separates a bundle of original document sheets set on the support surface of the document tray in the order of pages from the first page, and feeds each original document sheet to the original table glass in order to scan it by a scanner 302.

The scanner 302 scans the image of the original document sheet fed onto the original table glass, and converts the image into image data by a CCD. A light ray (e.g., a laser beam) modulated in accordance with the image data strikes a rotary polygon mirror 303, and irradiates a photosensitive drum 304 as a reflected scan beam via a reflecting mirror. A latent image formed by the laser beam on the photosensitive drum 304 is developed with toner. The toner image is transferred onto a sheet material supported on a transfer drum 305. A series of image forming processes is executed sequentially with yellow (Y), magenta (M), cyan (C), and black (K) toners, forming a full-color image. After four image forming processes, the sheet material bearing the full-color image is separated from the transfer drum 305 by a separation gripper 306, and conveyed to a fixing unit 308 by a pre-fixing conveyor 307. The fixing unit 308 has a combination of rollers and belts, and incorporates a heat source such as a halogen heater. The fixing unit 308 fuses and fixes, by heat and pressure, toner on a sheet material bearing a toner image. A delivery flapper 309 is swingable about the swing shaft, and regulates the sheet material conveyance direction. When the delivery flapper 309 swings clockwise in FIG. 3, a sheet material is conveyed straight, and discharged outside the apparatus by delivery rollers 310.

The control unit 205 controls the printing apparatus 100 to perform single-sided printing according to this sequence.

To form images on the two surfaces of a sheet material, the delivery flapper 309 swings counterclockwise in FIG. 3. The course of the sheet material changes downward to supply the sheet material to the double-sided conveyor. The double-sided conveyor comprises a reverse flapper 311, reverse rollers 312, reverse guide 313, and double-sided tray 314. The reverse flapper 311 swings about the swing shaft, and regulates the sheet material conveyance direction. To process a double-sided print job, the control unit 205 controls to swing the reverse flapper 311 counterclockwise in FIG. 3 and supply a sheet having the first surface printed by the printer unit 203 to the reverse guide 313 via the reverse rollers 312. While the reverse rollers 312 clamp the trailing end of the sheet material, the reverse rollers 312 temporarily stop, the reverse flapper 311 swings clockwise in FIG. 3, and the reverse rollers 312 rotate backward. The sheet is switched back to replace its trailing and leading ends, and then the sheet is guided to the double-sided tray 314. The double-sided tray 314 temporarily supports the sheet material, and a refeed roller 315 supplies the sheet material again to registration rollers 316. At this time, the sheet material is sent with a surface opposite to the first surface in the transfer step facing the photosensitive drum 304. The second image is formed on the second surface of the sheet by the same processing as that described above. After the images are formed on the two surfaces of the sheet material, the sheet undergoes the fixing step and is discharged from inside the main body of the printing apparatus 100 to outside it via the delivery rollers 310. The control unit 205 controls the printing apparatus 100 to perform double-sided printing according to this sequence.

The printing apparatus 100 also comprises paper feed units for storing sheets necessary for print processing. The paper feed units are, for example, paper cassettes 317 and 318 (each capable of storing, e.g., 500 sheets), a paper deck 319 (capable of storing, e.g., 5,000 sheets), and a manual feed tray 320. The paper cassettes 317 and 318 and the paper deck 319 allow setting sheets of different sizes and materials in distinction from each other in the paper feed units. The manual feed tray 320 allows setting a variety of sheets including a special sheet such as an OHP sheet. The paper cassettes 317 and 318, paper deck 319, and manual feed tray 320 respectively have pickup rollers, and the pickup rollers successively feed sheets one by one.

The sheet processing apparatuses 200 shown in FIG. 3 will be explained.

In the printing system 1000 according to the embodiment, an arbitrary number of sheet processing apparatuses 200 of arbitrary types can be coupled as long as they can convey sheets from an upstream apparatus to a downstream apparatus via a sheet feeding path. For example, as shown in FIG. 3, a large-volume stacker 200-3a, glue binding apparatus 200-3b, and saddle stitching apparatus 200-3c can be coupled in the order named from a side close to the printing apparatus 100, and selectively used in the printing system 1000. Each sheet processing apparatus 200 has a sheet discharge portion, and the user can take processed sheets out of the sheet discharge portion of the sheet processing apparatus.

The control unit 205 accepts, via the operation unit 204 together with a print execution request, a request to perform sheet processing of a type the user wants among a plurality of types of sheet processing candidates executable by the sheet processing apparatuses 200 connected to the printing apparatus 100. Upon accepting the print execution request from the user via the operation unit 204 for a target job, the control unit 205 causes the printer unit 203 to perform print processing necessary for the job. The control unit 205 controls to convey sheets of the job having undergone print processing via the sheet feeding path to a sheet processing apparatus capable of performing sheet processing the user wants, and causes the sheet processing apparatus to perform the sheet processing.

Assume that a target job, for which a print execution request has been accepted from the user, instructs the large-volume stacker 200-3a to perform large-volume stacking when the printing system 1000 has the system configuration shown in FIG. 3. This job is called a "stacker job".

When processing the stacker job in the system configuration of FIG. 3, the control unit 205 makes sheets of the job printed by the printing apparatus 100 pass through point A in FIG. 3, and conveys them into the large-volume stacker 200-3a. Then, the control unit 205 causes the large-volume stacker 200-3a to perform stacking of the job. The control unit 205 causes the large-volume stacker 200-3a to hold the print materials of the job stacked in the large-volume stacker 200-3a at a delivery destination X inside the large-volume stacker 200-3a without conveying the print materials to another apparatus (e.g., a succeeding apparatus).

The user can directly take out, from the delivery destination X, the print materials of the stacker job held at the delivery destination X in FIG. 3. This can omit a series of apparatus operations and user operations to convey sheets to a most downstream delivery destination Z in the sheet conveyance direction in FIG. 3 and take out the print materials of the stacker job from the delivery destination Z.

Assume that a target job, for which a print execution request has been accepted from the user, instructs the glue binding apparatus 200-3b to perform sheet processing (e.g., glue binding of either case binding or pad binding) in the system configuration of FIG. 3. This job is called a "glue binding job".

When processing the glue binding job in the system configuration of FIG. 3, the control unit 205 conveys sheets printed by the printing apparatus 100 into the glue binding apparatus 200-3b via points A and B in FIG. 3. Then, the control unit 205 causes the glue binding apparatus 200-3b to perform glue binding of the job. The control unit 205 causes the glue binding apparatus 200-3b to hold, at a delivery destination Y inside the glue binding apparatus 200-3b, the print materials of the job having undergone glue binding by the glue binding apparatus 200-3b, without conveying the print materials to another apparatus (e.g., a succeeding apparatus).

Assume that a target job, for which a print execution request has been accepted from the user, requires sheet processing by the saddle stitching apparatus 200-3c in the system configuration of FIG. 3. Sheet processing by the saddle stitching apparatus 200-3c includes, e.g., saddle stitching, punching, cutting, shift delivery, and folding. This job is called a "saddle stitching job".

When processing the saddle stitching job in the system configuration of FIG. 3, the control unit 205 makes sheets of the job printed by the printing apparatus 100 pass through points A, B, and C, and conveys them to the saddle stitching apparatus 200-3c. Then, the control unit 205 causes the saddle stitching apparatus 200-3c to perform sheet processing of the job. The control unit 205 causes the saddle stitching apparatus 200-3c to hold, at the delivery destination Z of the saddle stitching apparatus 200-3c, the print materials of the saddle stitching job having undergone the sheet processing by the saddle stitching apparatus 200-3c.

The delivery destination Z has a plurality of delivery destination candidates. These delivery destination candidates are used to change the delivery destination for each sheet process because the saddle stitching apparatus 200-3c can perform a plurality of types of sheet processes.

As described with reference to FIGS. 1 to 3, the printing system 1000 according to the embodiment allows connecting a plurality of sheet processing apparatuses to the printing apparatus 100. An arbitrary combination of sheet processing apparatuses can be connected to the printing apparatus 100. The connection order of sheet processing apparatuses is also freely changeable as long as their sheet feeding paths communicate with each other. Also, there are a plurality of types of sheet processing apparatus candidates connectable to the printing apparatus 100.

The internal structure of a large-volume stacker 200-3a applicable as the sheet processing apparatus 200 will be explained with reference to the sectional view shown in FIG. 4. In the embodiment, the large-volume stacker 200-3a functions as a specific type of post processing apparatus configured to stack print materials obtained by printing by a checking print function (to be described later). The large-volume stacker 200-3a conveys sheets from an upstream apparatus selectively to three feeding paths: a sample tray 403 path, stack path 404, and straight path 405.

The stack path 404 in the large-volume stacker 200-3a is a sheet feeding path for conveying sheets to the stack tray 406 (e.g., a discharge portion arranged inside the large-volume stacker 200-3a). The stack tray 406 in FIG. 4 is a stacking unit mounted on an extensible stay 407 or the like. A detachable dolly 408 supports the extensible stay 407 from below it. By using the dolly 408, the operator can carry sheets stacked on the stack tray 406.

Assume that the control unit 205 accepts a request from the user via the operation unit 204 to perform a job set to stack sheets on the large-volume stacker 200-3a. In this case, the control unit 205 conveys sheets printed by the printing apparatus 100 to the stack path 404 of the large-volume stacker 200-3a, and delivers them to the stack tray 406 via the stack path 404.

Figure 4:
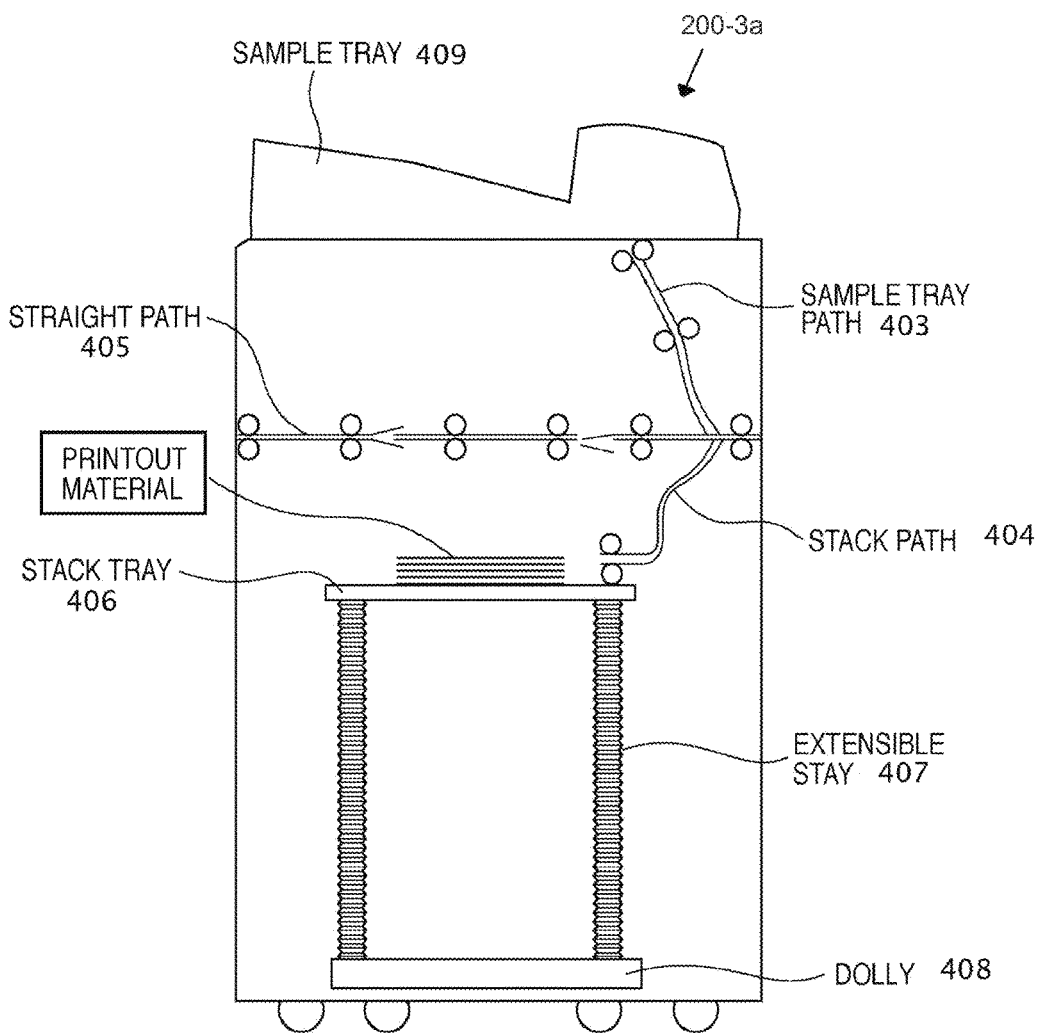
FIG. 4 is a sectional view showing an example of the internal structure of a large-volume stacker.

The straight path 405 in the large-volume stacker 200-3a shown in FIG. 4 is a sheet feeding path for conveying, to a succeeding apparatus, sheets of a job requiring no stacking of sheets using the stack tray 406 of the large-volume stacker 200-3a.

The sample tray path 403 is a sheet feeding path for discharging sheets to the sample tray 409 (e.g., a discharge portion arranged outside the large-volume stacker 200-3a). The sample tray path 403 is used to, for example, make it easy to take out outputs from the stack tray 406 when checking them. In this case, for example, the control unit 205 conveys sheets printed by the printing apparatus 100 to the sample tray path 403 and discharges them to the sample tray 409. In the embodiment, the control unit 205 controls to output print materials obtained by printing based on the checking print function to the sample tray 409.

Note that the sheet feeding path in the large-volume stacker 200-3a has a plurality of sheet sensors necessary to detect the sheet feeding state and jam.

The large-volume stacker 200-3a comprises a CPU (not shown), and notifies the control unit 205 of sheet detection information from each sensor via a signal line for communicating data. Based on the information from the large-volume stacker 200-3a, the control unit 205 grasps the sheet feeding state and jam in the large-volume stacker 200-3a. When another sheet processing apparatus is connected between the large-volume stacker 200-3a and the printing apparatus 100, the CPU (not shown) of this sheet processing apparatus notifies the control unit 205 of sensor information of the large-volume stacker 200-3a.

The arrangement of the operation unit 204 will be described with reference to FIG. 5.

The operation unit 204 comprises the touch panel section 401 and key input section 402. The touch panel section 401 is formed from an LCD (Liquid Crystal Display) and a transparent electrode adhered onto the LCD, and displays various setup windows for accepting an instruction from the user. The touch panel section 401 has both a function of displaying various windows and an instruction input function of accepting an instruction from the user. The key input section 402 comprises a power key 501, start key 503, stop key 502, user mode key 505, and ten-key pad 506. The start key 503 is used to cause the printing apparatus 100 to perform a copy job and send job. The ten-key pad 506 is used to set a numerical value such as the number of copies.

The control unit 205 controls the printing system 1000 to n perform various processes based on user's instructions accepted via various windows displayed in the touch panel section 401 and user's instructions accepted via the key input section 402.

Figure 5:
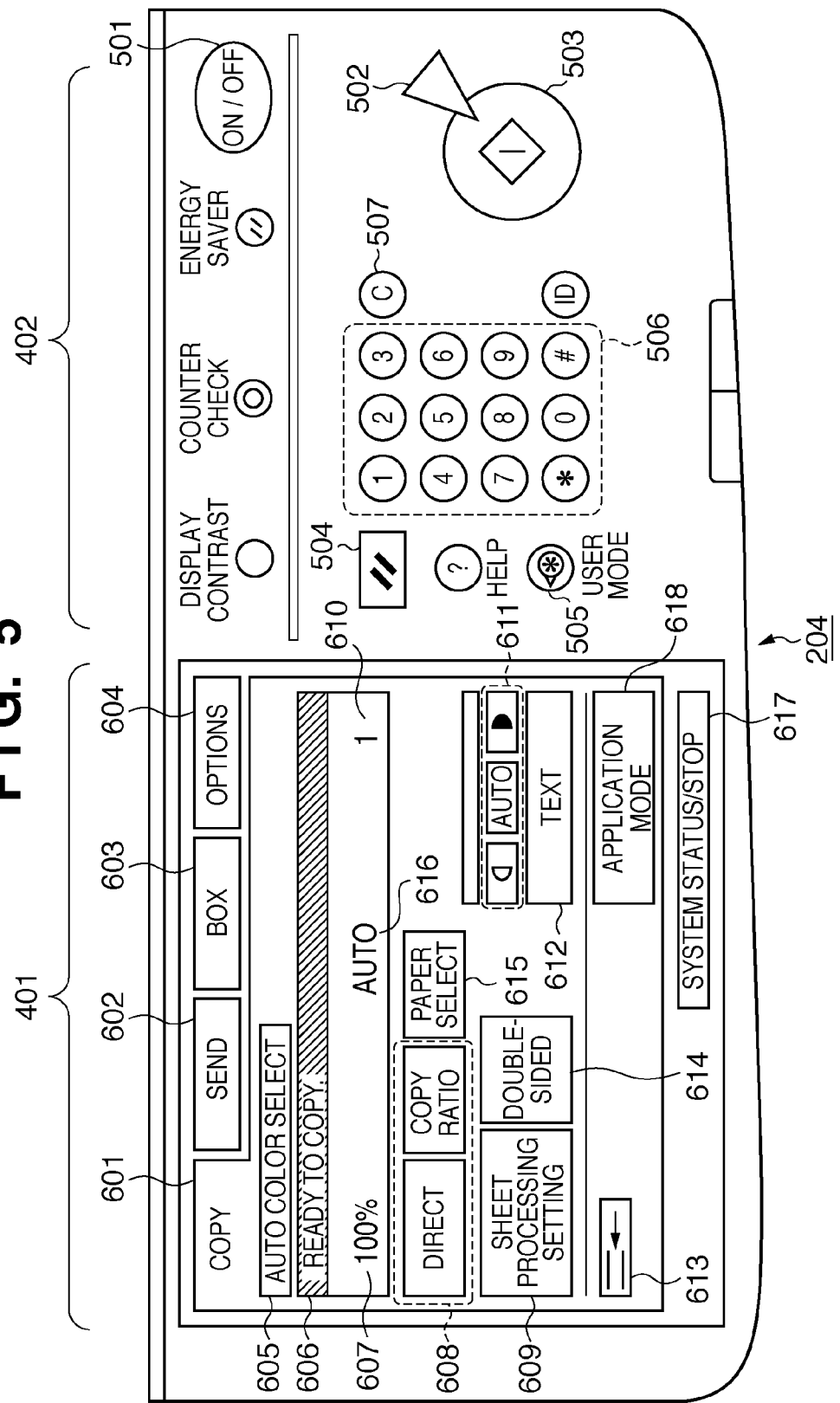
FIG. 5 is a view showing an example of an operation unit 204.
Figure 6:
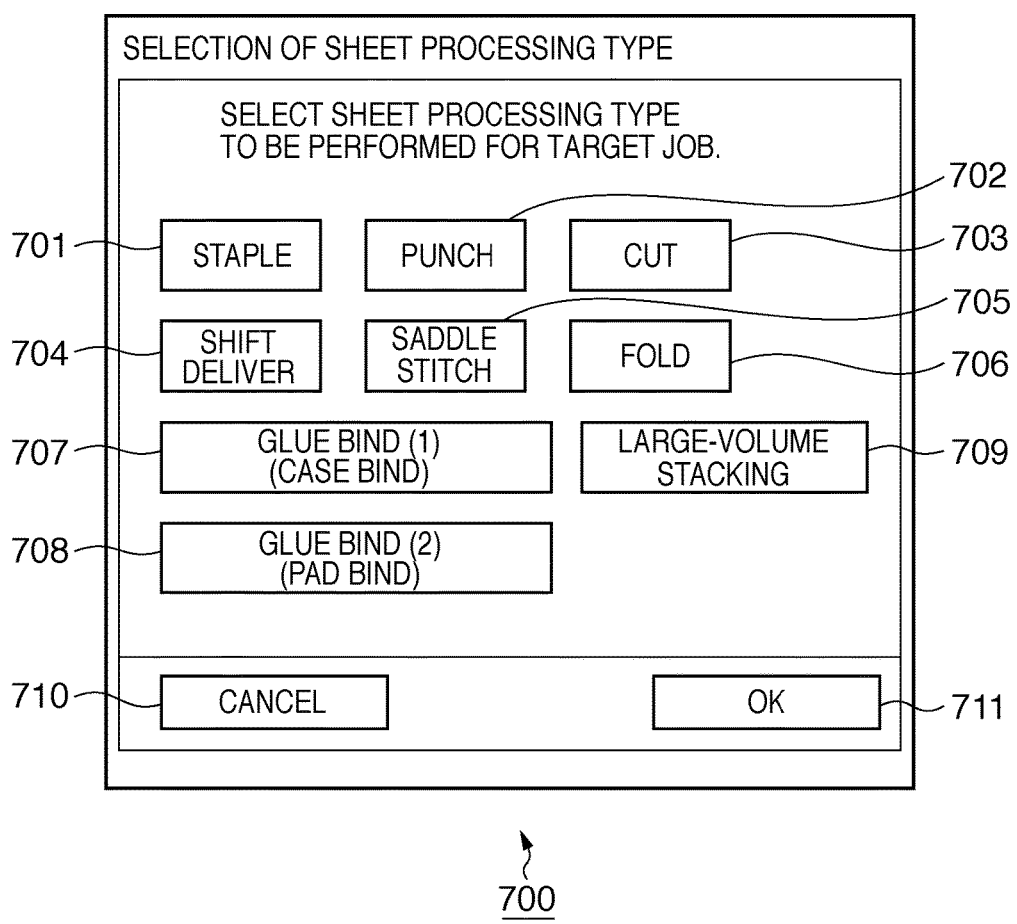
FIG. 6 is a view showing a display example of a setup window for prompting the user to select the type of sheet processing to be performed for sheets printed by the printing apparatus 100.

FIG. 6 is a view showing a display example of a setup window for prompting the user to select the type of sheet processing to be performed for sheets printed by the printing apparatus 100. When the user presses a sheet process setting key 609 shown in FIG. 5 in the window displayed in the touch panel section 401, the control unit 205 causes the touch panel section 401 to display the window in FIG. 6. The window in FIG. 6 is a setup window which allows the user to select the type of sheet processing executable using the sheet processing apparatus 200 in the printing system 1000. The control unit 205 accepts, from the user via the window in FIG. 6, settings of sheet processing to be performed for a target job, and causes the sheet processing apparatus 200 to perform the sheet processing according to the settings.

Figure 7:
FIG. 7 is a view showing a display example of a setup window configured to allow the user to register information for specifying, e.g., the number, types, and connection order of sheet processing apparatuses in the case where the sheet processing apparatuses 200 are connected to the printing apparatus 100.

A window shown in FIG. 7 is a setup window which allows the user to register information for specifying the number, types, and connection order of sheet processing apparatuses in the case where the sheet processing apparatuses 200 are connected to the printing apparatus 100. When the user presses the user mode key 505, the control unit 205 controls the touch panel section 401 to be able to display the window shown in FIG. 7.

For example, when the printing system 1000 has the system configuration as shown in FIG. 3, the user sets registration information that three sheet processing apparatuses, i.e., a large-volume stacker, glue binding apparatus, and saddle stitching apparatus are connected to the printing apparatus 100 sequentially from the large-volume stacker, as shown in FIG. 7. The control unit 205 causes the RAM 208 to hold, as system configuration information, the information on the sheet processing apparatuses 200 that is set by the user via the window in FIG. 7. The control unit 205 properly reads out and refers to the system configuration information. From the system configuration information, the control unit 205 confirms the number, types, and connection order of sheet processing apparatuses connected to the printing apparatus 100.

The printing system 1000 comprises the printing apparatus 100 having the printer unit 203 capable of printing data in the HDD 209 capable of storing data of a plurality of jobs. The printing system 1000 is configured to allow connecting the printing apparatus 100 and a plurality of sheet processing apparatuses 200. Each of the sheet processing apparatuses 200 connectable to the printing apparatus 100 is configured to be able to perform sheet processing (also called finishing or post processing) for sheets (also called print materials or print media) of a job printed by the printer unit 203. Each sheet processing apparatus 200 is configured to allow the operator to take out print materials having undergone sheet processing by the apparatus 200. The printing system 1000 according to the embodiment is configured to be able to selectively supply sheets of a job printed by the printer unit 203 from the printer unit 203 to the sheet processing apparatuses 200.

The printing apparatus 100 applied to the printing system 1000 in the embodiment has a checking print function available to check printing results and/or change printing conditions.

In the embodiment, the control unit 205 functions as a controller for causing the printer unit 203 (printer) to perform printing automatically by the checking print function.

The control unit 205 also functions as a determination unit for determining whether the job to be printed by the printer unit 203 satisfies a condition to cause the printer unit 203 to perform printing automatically by the checking print function.

Assume that the control unit 205 obtains a result of this determination that the job to be printed by the printer unit 203 satisfies the condition to cause the printer unit 203 to perform printing automatically by the checking print function.

When the job to be printed satisfies the condition to cause the printer unit 203 to perform printing automatically by the checking print function, the control unit 205 causes the printer unit 203 to perform printing automatically by the checking print function.

In this manner, the printing system 1000 according to the embodiment is configured to be able to perform printing automatically by the checking print function when the job to be printed satisfies the condition to perform printing automatically by the checking print function. The printing system 1000 has a mechanism capable of building, without unnecessarily bothering the operator, a user-friendly printing environment capable of effectively using the checking print without unnecessarily stopping the print operation of the printing system.

When performing printing by the checking print function, the control unit 205 causes the printer unit 203 to perform printing automatically by the checking print function using print data of a job to be printed by the printer unit 203. In addition, when performing printing by the checking print function, the control unit 205 causes the printer unit 203 to perform printing automatically by the checking print function during printing of a target job. The operator can check a printing result using print data itself for actual use. Without unnecessarily stopping the print operation, the operator can easily check a parameter (e.g., print density) which changes output results as the print operation actually proceeds, as if he executed a sampling check.

As an embodiment of the above-mentioned determination, the control unit 205 in the embodiment determines whether the job to be printed by the printer unit 203 requires a predetermined number (predetermined stipulated number) or more of print media in order to complete printing.

Assume that the job to be printed by the printer unit 203 does not require a predetermined number or more of print media in order to complete printing. If the control unit 205 makes a determination corresponding to this case, it causes the printer unit 203 to complete printing of the job without causing the printer unit 203 to perform printing automatically by the checking print function during printing of the job.

Assume that the job to be printed by the printer unit 203 requires a predetermined number or more of print media in order to complete printing. If the control unit 205 makes a determination corresponding to this case, it causes the printer unit 203 to perform printing automatically by the checking print function during printing of the job.

The printing system 1000 having the following configuration instead of this configuration is also applicable as an embodiment of the present invention.

For example, as another embodiment of the above-mentioned determination, the control unit 205 determines whether the job to be printed by the printer unit 203 requires a predetermined time (stipulated time) or longer in order to complete printing.

Assume that the job to be printed by the printer unit 203 does not require a predetermined time or longer in order to complete printing. If the control unit 205 makes a determination corresponding to this case, it causes the printer unit 203 to complete printing of the job without causing the printer unit 203 to perform printing automatically by the checking print function during printing of the job.

Assume that the job to be printed by the printer unit 203 requires a predetermined time or longer in order to complete printing. If the control unit 205 makes a determination corresponding to this case, it causes the printer unit 203 to perform printing automatically by the checking print function during printing of the job.

The printing system 1000 having the following configuration instead of this configuration is also applicable as an embodiment of the present invention.

For example, as still another embodiment of the above-mentioned determination, the control unit 205 determines whether the job to be printed by the printer unit 203 needs to output print materials to a predetermined discharge destination inside a specific type of post processing apparatus. In the embodiment, a concrete example of the predetermined discharge destination inside the specific type of post processing apparatus is the stack tray in the large-volume stacker described above.

Assume that the job to be printed by the printer unit 203 need not output print materials to the predetermined discharge destination inside the specific type of post processing apparatus. If the control unit 205 makes a determination corresponding to this case, it causes the printer unit 203 to complete printing of the job without causing the printer unit 203 to perform printing automatically by the checking print function during printing of the job.

Assume that the job to be printed by the printer unit 203 needs to output print materials to the predetermined discharge destination. If the control unit 205 makes a determination corresponding to this case, it causes the printer unit 203 to perform printing automatically by the checking print function during printing of the job.

With this configuration, for example, when the print material delivery destination is a delivery destination exposed outside the housing of a post processing apparatus, the control unit 205 controls to inhibit performing the checking print automatically. To the contrary, when the print material delivery destination is a delivery destination incorporated in the housing of a post processing apparatus, the control unit 205 controls to perform the checking print automatically. The printing system 1000 according to the embodiment is applicable to this configuration. This can prevent a trouble that the operator cannot check print materials output to the large-volume stacker during printing using a delivery destination inside the large-volume stacker. While preventing this trouble, it is uniformly controlled not to perform the checking print automatically regardless of the delivery destination. It can be prevented to automatically perform the checking print more than necessary, and an unnecessary operation which influences productivity can be suppressed. As a result, the user friendliness of the checking print function can improve.

The printing system 1000 having the following configuration instead of this configuration is also applicable as an embodiment of the present invention.

For example, as still another embodiment of the above-mentioned determination, the control unit 205 determines whether the job to be printed by the printer unit 203 requires specific type of post processing including a plurality of steps. A concrete example of the specific type of post processing is case binding by the above-mentioned glue binding apparatus including a step of gluing the body of print materials, a step of adhering a cover, and a step of cutting an edge.

Assume that the job to be printed by the printer unit 203 does not require the specific type of post processing. If the control unit 205 makes a determination corresponding to this case, it causes the printer unit 203 to complete printing of the job without causing the printer unit 203 to perform printing automatically by the checking print function during printing of the job.

Assume that the job to be printed by the printer unit 203 requires the specific type of post processing. If the control unit 205 makes a determination corresponding to this case, it causes the printer unit 203 to perform printing automatically by the checking print function during printing of the job.

With this configuration, for example, when the job to be printed requires post processing including a simple work step, like a stapling job, the control unit 205 controls to inhibit performing the checking print automatically. To the contrary, when the job to be printed requires post processing using a high value-added advanced function, like the above-mentioned glue binding job, the control unit 205 controls to perform the checking print automatically. The printing system 1000 according to the embodiment is applicable to this configuration. This can improve the user friendliness of the checking print function, and prevent a trouble that print materials completed through post processing using a high value-added advanced function after considerable time and much effort provide only defective printing results.

The printing system 1000 having the following configuration instead of this configuration is also applicable as an embodiment of the present invention.

For example, as still another embodiment of the above-mentioned determination, the control unit 205 determines whether the job to be printed by the printer unit 203 requires the specific type of consumable. A concrete example of the specific type of consumable is a high value-added toner such as a toner used for color printing or a clear toner used to give glossiness. Another concrete example of the specific type of consumable is a high value-added post processing resource such as glue used for glue binding. Still another concrete example of the specific type of consumable is a high value-added print medium such as glossy paper.

Assume that the job to be printed by the printer unit 203 does not require the specific type of consumable. If the control unit 205 makes a determination corresponding to this case, it causes the printer unit 203 to complete printing of the job without causing the printer unit 203 to perform printing automatically by the checking print function during printing of the job.

Assume that the job to be printed by the printer unit 203 requires the specific type of consumable. If the control unit 205 makes a determination corresponding to this case, it causes the printer unit 203 to perform printing automatically by the checking print function during printing of the job.

In this configuration, assume that the job to be printed is a monochrome print job, stapling job, or a job using plain paper for printing. That is, assume that the job to be printed is a job using a consumable lower in value than that for a color print job, a glue binding job, or a job using glossy paper for printing. In this case, the control unit 205 controls to inhibit performing the checking print automatically. To the contrary, assume that the job to be printed is a color print job, a glue binding job, or a job using glossy paper for printing. In this case, the control unit 205 controls to perform the checking print automatically. The printing system 1000 according to the embodiment is applicable to this configuration. This can improve the user friendliness of the checking print function, and suppress a trouble that print materials completed using a high value-added consumable provide only defective printing results.

The printing system 1000 having the following configuration instead of this configuration is also applicable as an embodiment of the present invention.

For example, as still another embodiment of the above-mentioned determination, the control unit 205 determines whether the job to be printed by the printer unit 203 is of the first or second job type. A concrete example of a job of the first job type is a job requiring printing of print data of an original document scanned by the scanner 302 functioning as a document reader. A concrete example of a job of the second job type is a job requiring printing of print data transmitted from an external apparatus, such as an information processing apparatus (e.g., the PC 104), which can communicate data with the printing apparatus 100.

Assume that the job to be printed by the printer unit 203 is of the first job type. If the control unit 205 makes a determination corresponding to this case, it causes the printer unit 203 to complete printing of the job without causing the printer unit 203 to perform printing automatically by the checking print function during printing of the job.

Assume that the job to be printed by the printer unit 203 is of the second type. If the control unit 205 makes a determination corresponding to this case, it causes the printer unit 203 to perform printing automatically by the checking print function during printing of the job.

In this configuration, assume that the job to be printed corresponds to a case where the operator in front of the printing apparatus 100 grasps in advance the contents of an original document to be printed, like a copy job. In this case, the control unit 205 controls to inhibit performing the checking print automatically. To the contrary, assume that the job to be printed corresponds to a case where the operator in front of the printing apparatus 100 does not grasp in advance the contents of an original document to be printed, like an external PDL job. That is, assume that a user other than the operator in front of the printing system 1000 inputs a print job from a remote terminal outside the printing system 1000. In this case, the control unit 205 controls to perform the checking print automatically. The printing system 1000 according to the embodiment is applicable to this configuration. This can improve the user friendliness of the checking print function, and allows the operator of the printing system 1000 to easily check the printing result of data even if he does not grasp in advance the contents of the data to be printed. Further, this can suppress a trouble that the operator cannot know data during printing when he comes to the printing system 1000 in order to copy and printing is already in progress from the outside.

As described above, the printing system 1000 according to the embodiment copes with a plurality of types of configurations to perform printing automatically by the checking print function. However, the printing system 1000 may also be configured to have only one, two or more, or all of these types of configurations. Although the embodiment includes the printing system 1000 having configurations corresponding to various changes and applications, the printing system 1000 preferably comprises even a configuration corresponding to the following configuration of the printing system 1000 according to the embodiment.

Assume that printing by the checking print function is performed automatically during printing of a job by the printer unit 203, as described above. In this case, the control unit 205 controls the printer unit 203 to perform printing automatically by the checking print function repetitively at predetermined intervals.

Assume that the job to be printed requires printing of a predetermined number or more of sheets. In this case, the control unit 205 in the embodiment causes the printer unit 203 to perform printing automatically by the checking print function instead of printing of the job every time a specific number of sheets smaller than the predetermined number of sheets are printed in printing of the job. In the embodiment, assume that the control unit 205 determines that the job to be printed requires printing of 5,000 or more sheets. On condition of this, the control unit 205 causes the printer unit 203 to perform the checking print automatically instead of printing of the job every time 100 print sheets are successively printed in printing of the job. The series of control operations is a concrete example of the configuration.

Assume that the job to be printed is a large-volume print job in which the time necessary for printing from the start to completion of printing is equal to or longer than a predetermined time. In this case, the control unit 205 in the embodiment causes the printer unit 203 to perform printing automatically by the checking print function instead of printing of the job every time printing of the job is done for a specific time shorter than the time necessary to complete printing of the job. In the embodiment, assume that the control unit 205 determines that the job to be printed requires printing of 20 min or more till the completion of printing. On condition of this, the control unit 205 causes the printer unit 203 to perform the checking print automatically instead of printing of the job every time printing of the job is done continuously for 5 min. The series of control operations is another concrete example of the configuration.

The printing system 1000 according to the embodiment is configured to be able to selectively perform an operation of performing the checking print for a job after a specific number of sheets are printed, like the former configuration, and an operation of performing the checking print for a job after printing is done for a specific time, like the latter configuration.

For this purpose, in the embodiment, the control unit 205 functions as a unit for accepting the first or second instruction in advance from the user via a user interface.

The first instruction is an instruction from the user to designate the number of sheets in order to determine the number of sheets printed for a job after which printing by the checking print function is performed automatically when printing by the checking print function is performed automatically during printing of the job by the printer unit 203. In the embodiment, when the first instruction has already been input from the user via a user interface, the control unit 205 controls the printer unit 203 to perform printing automatically by the checking print function in accordance with the first instruction.

The second instruction is an instruction from the user to designate the time in order to determine the time (min) of printing of a job after which printing by the checking print function is performed automatically when printing by the checking print function is performed automatically during printing of the job by the printer unit 203. In the embodiment, when the second instruction has already been input from the user via a user interface, the control unit 205 controls the printer unit 203 to perform printing automatically by the checking print function in accordance with the second instruction.

Various configurations described above can provide a further effect capable of enhancing the above-mentioned effects of the checking print function in the printing system 1000. In addition to these configurations, the printing system 1000 in the embodiment also comprises the following configuration.

For example, the control unit 205 in the embodiment also functions as a unit for accepting a request in advance from the user via a user interface to inhibit or permit performing printing automatically by the checking print function during printing of a job by the printer unit 203.

Assume that the user has already input a request via the user interface to inhibit performing printing automatically by the checking print function. Based on this request, the control unit 205 inhibits performing printing automatically by the checking print function during printing of a job by the printer unit 203, like each configuration described above. To the contrary, assume that the user has not input this request via the user interface yet, but has already input an instruction via the user interface to permit performing printing automatically by the checking print function. When the control unit 205 makes a determination corresponding to this case, it permits performing printing automatically by the checking print function during printing of a job by the printer unit 203, like each configuration described above.

Like various configurations described above, the control unit 205 in the embodiment determines whether the condition to cause the printer unit 203 to perform printing automatically by the checking print function is satisfied. If the control unit 205 determines that no condition is satisfied, it controls not to perform (to inhibit) printing by the checking print function automatically during printing of a job by the printer unit 203.

In this fashion, the printing system 1000 in the embodiment comprises even a configuration corresponding to the case where it is inhibited to perform printing automatically by the checking print function during printing of a job. Even in this case, if the user explicitly inputs an instruction to perform the checking print, the control unit 205 permits the printer unit 203 to perform printing by the checking print function during printing of the job.

Assume that it is inhibited to perform printing automatically by the checking print function during printing of a job. Even in this case, the control unit 205 in the embodiment permits accepting a request from the user via the above-mentioned user interface to print by the checking print function while the printer unit 203 performs printing of a target job. On condition that the user has input this request via the user interface while printing of the job is in progress, the control unit 205 causes the printer unit 203 to perform printing by the checking print function during printing of the job. In this manner, the printing system 1000 according to the embodiment comprises even a configuration corresponding to a manual input.

In other words, the printing system 1000 according to the embodiment has two, first and second modes as a method of causing the printer unit 203 to perform printing by the checking print function.

As the first mode, the printing system 1000 according to the embodiment has an automatic mode in which the control unit 205 causes the printer unit 203 to perform printing automatically by the checking print function when a predetermined condition is satisfied, as described above. In the embodiment, this condition is a predetermined stipulated condition under which the control unit 205 permits performing printing automatically by the checking print function. This condition is decision-making data which defines a condition to permit performing the checking print automatically and is used by the control unit 205.

As for the automatic mode, the embodiment has described the following seven conditions as the predetermined stipulated condition to cause the printer unit 203 to perform printing automatically by the checking print function.

(1) The job to be printed requires a predetermined stipulated number (5,000 in a concrete example to be described later) or more of print media as a condition to complete printing.
(2) The job to be printed requires a predetermined stipulated time (e.g., 10 min) or more as a condition to complete printing.
(3) The job to be printed needs to output print materials to a discharge destination (the stack tray of the large-volume stacker in the embodiment) inside a specific type of post processing apparatus as a discharge destination determined in advance as a condition.
(4) The job to be printed requires specific type of post processing including a plurality of steps (e.g., case binding including a gluing step, cutting step, and the like) as type of post processing determined in advance as a condition.
(5) The job to be printed requires a specific type of consumable (a high value-added coloring material, print medium, or binding member in the above-mentioned example) determined in advance as a condition.
(6) The job to be printed is a print job of a type (attribute) determined in advance as a condition, and requires printing of print data transmitted from an apparatus capable of communicating data with the printing apparatus 100.
(7) The user has not input a request via a user interface in advance to inhibit performing printing automatically by the checking print function.

Stipulated conditions (1) to (7) are registered in advance in the memory of the printing apparatus 100 as management information for performing printing automatically by the checking print function. The embodiment provides a configuration which allows a specific operator such as the administrator to change settings corresponding to these stipulated conditions via an initial setting window (not shown).

Figure 11A:
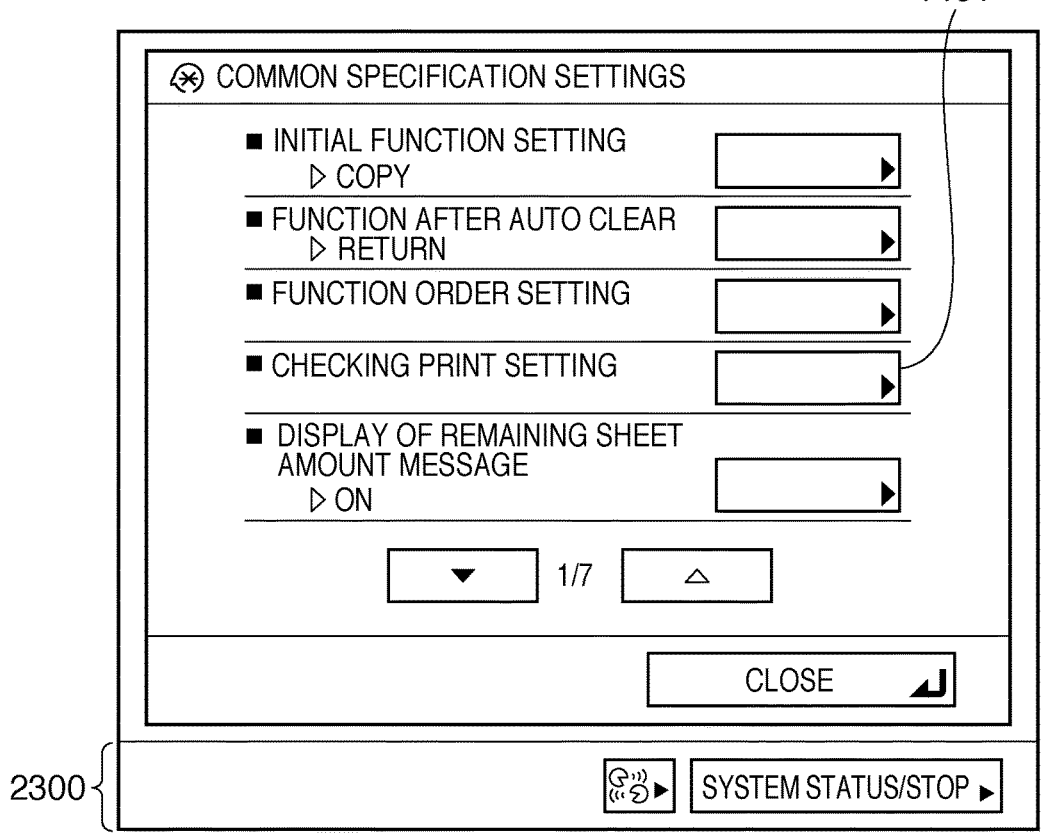
FIG. 11A is a view showing an example of a user interface window.
Figure 11B:
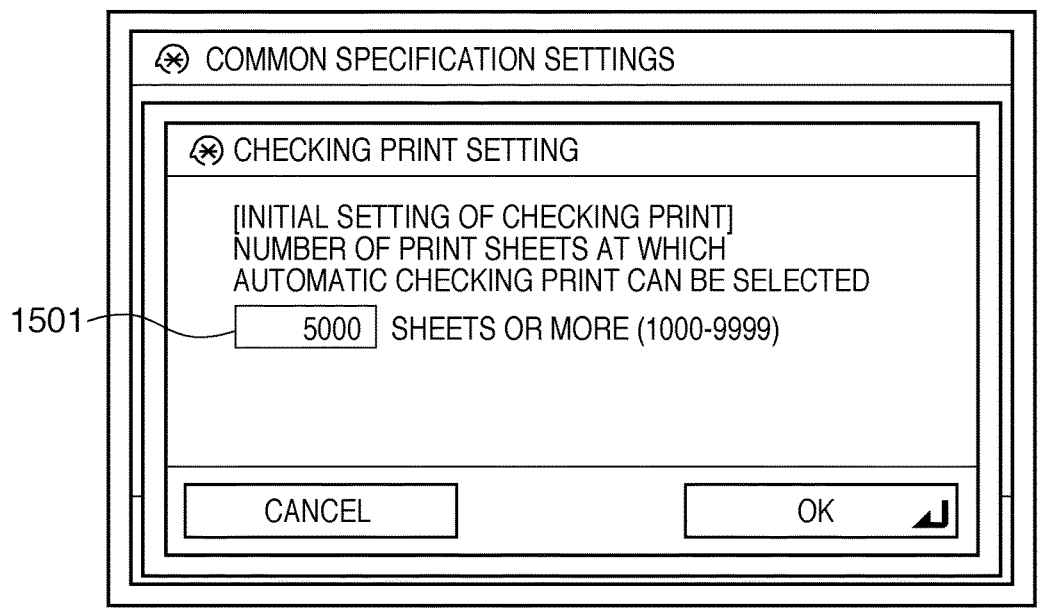
FIG. 11B is a view showing an example of a user interface window.

For example, when "5,000" is registered as the initial value of the stipulated number of sheets corresponding to the above-described condition (1), the control unit 205 causes the operation unit 204 to display a user interface shown in FIG. 11B in response to an instruction from the operator. This user interface displays 5,000 sheets as a default. This user interface presents 1,000 to 9,999 sheets as setting value candidates adaptable as the stipulated number of sheets. When the operator sets a value within this range via the user interface, the control unit 205 changes the setting in response to this to use the value set by the operator as the stipulated number of sheets. Other stipulated conditions can also be similarly changed in accordance with instructions via user interfaces.

The printing system 1000 according to the embodiment comprises a configuration which deals with all the seven conditions under the control of the control unit 205, as described above. As a matter of course, the embodiment includes this configuration, but is not limited to this. For example, the embodiment includes even an apparatus or system having a configuration coping with only one of the seven conditions, or even an apparatus or system having a configuration coping with two to six conditions.

When making the above-mentioned determinations corresponding to conditions (1) to (7), the control unit 205 acquires the print processing conditions of a job to be printed, the total number of pages of print data, system configuration information of the printing system 1000, and information on initial settings. For example, the control unit 205 specifies the print processing conditions on the basis of setting information set by the user via user interfaces in FIGS. 5 and 6. The control unit 205 acquires the number of pages from job attribute information. Alternatively, the control unit 205 specifies the total number of pages from information from a counter which counts the number of pages of print data stored in the HDD 209. System configuration information of the printing system 1000 and information on initial settings are registered in advance in the memory of the printing apparatus 100. The control unit 205 specifies these pieces of information by reading them out. Based on the pieces of acquired information, the control unit 205 executes the above-mentioned determinations and control operations corresponding to conditions (1) to (7). However, these operations are merely examples, and the configuration is arbitrary as long as it can be determined whether the condition to perform printing automatically by the checking print function is satisfied, as described above.

In addition to the automatic mode, the printing system 1000 according to the embodiment also has a manual mode as the second mode. As described above, the printing system 1000 according to the embodiment has a mode in which printing by the checking print function is performed in response to a request input from the user via a user interface to perform printing by the checking print function while the printer unit 203 performs printing. This mode is the manual mode.

In this manner, the printing system 1000 has both the first mode (automatic mode) and the second mode (manual mode). The printing system 1000 according to the embodiment further comprises a constituent feature commonly applied to these two modes. This is a mechanism for further enhancing the effects of the checking print function obtained in the embodiment.

For example, the control unit 205 controls to set the same delivery destination for print materials obtained by printing based on the checking print function in both a case where printing by the checking print function is done in the first mode and a case where printing by the checking print function is done in the second mode. In these two cases, the control unit 205 controls to output, to a discharge destination different from that used in printing of a job, print materials obtained by printing based on the checking print function performed instead of printing of the job during printing of the job. In this way, the control unit 205 in the embodiment also functions as a discharge destination control unit for print materials printed by the checking print function.

In these two modes, the control unit 205 controls to output print materials obtained by the checking print function to the same location (delivery destination). In the embodiment, the control unit 205 controls to select the sample tray of the above-described large-volume stacker as the discharge destination. In both the automatic and manual modes, the control unit 205 outputs print materials obtained by the checking print function to a discharge destination exposed outside a post processing apparatus. Further in the embodiment, in both the automatic and manual modes, the control unit 205 controls not to output print materials obtained by the checking print function to a discharge destination inside a post processing apparatus, such as the stack tray of the large-volume stacker.

In this fashion, the control unit 205 inhibits outputting print materials obtained by printing based on the checking print function to a discharge destination inside a specific type of post processing apparatus regardless of the first or second mode in which printing by the checking print function is performed. In the two cases, the control unit 205 controls to output (permit outputting) print materials obtained by printing based on the checking print function to a discharge destination outside the specific type of post processing apparatus without outputting print material obtained by printing based on the checking print function to the output destination inside the specific type of post processing apparatus.

These configurations can suppress a trouble that the delivery destination of print materials obtained by the checking print function differs between the first and second modes and this confuses the operator. These configurations can also suppress a trouble that print materials obtained by the checking print function are discharged to a discharge destination exposed outside the apparatus in one mode whereas they are discharged to a discharge destination inside the apparatus, and this increases the burden on the operator and impairs the user friendliness of the checking print function.

In addition to these configurations, the printing system 1000 according to the embodiment comprises a configuration coping with control commonly applied to the first and second modes.

For example, the control unit 205 causes the printer unit 203 to perform printing by the checking print function instead of printing of a job during printing of the job regardless of the first or second mode in which printing by the checking print function is performed. In the two cases, the control unit 205 controls the printer unit 203 to automatically resume (permit resuming) printing of a job after the printer unit 203 performs printing by the checking print function.

This configuration can provide a further effect capable of enhancing the above-mentioned effects of the checking print function in both the first and second modes without causing a trouble that the productivity of a job to be printed decreases unnecessarily owing to printing by the checking print function.

In the embodiment, the control unit 205 controls to be able to accept, prior to at least printing by the checking print function in the second mode, an instruction from the user via a user interface in advance to inhibit resuming printing automatically by the checking print function in the second mode. If the control unit 205 has accepted this instruction in advance, it inhibits the printer unit 203 from resuming printing automatically by the checking print function in at least the second mode after performing printing by the checking print function.

The embodiment can provide a mechanism capable of flexibly meeting user needs in the first and second modes. The mechanism can attain a further effect capable of enhancing the above-mentioned effects of the checking print function.

Automatically performing printing by the checking print function means performing printing by the checking print function when the above-mentioned condition is satisfied, without explicitly inputting an instruction from the user to perform printing by the checking print function for a job to be printed.

In the embodiment, as described above, the control unit 205 of the printing apparatus 100 executes a plurality of types of determinations and/or control operations associated with the checking print function. However, the embodiment is not limited to this configuration, and can also employ another one. For example, in place of the control unit 205, the control unit of an apparatus (apparatus capable of communicating data with the printing apparatus 100 via a communication unit), such as an information processing apparatus (e.g., the PC 103 or 104) or a post processing apparatus (e.g., the sheet processing apparatus 108 or 109) executes these determinations and/or control operations. The embodiment is also applicable to this configuration. When an apparatus other than the printing apparatus 100 executes these determinations and/or control operations, this apparatus provides the above-mentioned user interface.

The embodiment may also adopt a configuration in which one unit executes a plurality of types of determinations and/or control operations associated with the checking print function, or a configuration in which a plurality of units execute these determinations and/or control operations in cooperation with each other. Hence, the embodiment is applicable to even a configuration in which one CPU controls the apparatus and/or system, or a configuration in which a plurality of CPUs control the apparatus and/or system in cooperation with each other. In this manner, various modifications and applications can be made.

Supplementary remarks and concrete examples of the configuration associated with the checking print function of the printing system 1000 according to the above-described embodiment will be listed below.

Various configurations to be described below may also be selected and properly applied if they are consistent with the above-described configurations associated with the checking print function. The following configurations are merely examples, and the embodiment is not limited to them. The configuration of the embodiment may also be completed by only configurations based on the above-described configurations associated with the checking print function. The following example employs the operation unit 204 and/or windows displayed on the operation unit 204 as concrete examples of the above-mentioned user interfaces. However, the embodiment is not limited to them. For example, when the PC 103 or PC 104 executes determinations and/or control operations associated with the checking print function, as described above, the operation unit of the apparatus and/or windows displayed on the operation unit are applied as user interfaces in the embodiment.

In the embodiment, the checking print function of the printing system 1000 is a function available to check printing results and/or change printing conditions, as described above. By using this function, the embodiment allows the printing system 1000 to create checking print materials for a target job until the print operation of the job ends after it starts.

Assume that a print execution request has been accepted for a target job from the operator via the operation unit 204. In response to the print execution request, the control unit 205 causes the printing system 1000 to start the print operation of the job. After that, the control unit 205 controls the operation unit 204 to be able to accept a request from the operator to perform the checking print operation for the job during printing while the printing system 1000 actually performs the print operation. Assume that the checking print request is accepted for the job from the operator, or the print status of the job meets an automatic execution condition while the printer unit 203 performs the print operation of the job. In this case, the control unit 205 interrupts the print operation of the job in execution by the printer unit 203 in response to the checking print request input from the operator or the print status of the job that meets the automatic execution condition. Immediately after the printing system 1000 interrupts the print operation of the job subjected to the checking print operation, the control unit 205 causes the printing system 1000 to perform the checking print operation for the job. In the checking print operation, the printing system 1000 creates a checking print material for the checking print-requested job. When performing the checking print operation, the control unit 205 reads out, from the HDD 209, print data of the job whose print operation has been interrupted, and causes the printing apparatus 100 to perform print processing. Upon completion of the print processing by the checking print, the control unit 205 notifies the operator of the completion of the checking print. Immediately after the checking print is complete, the control unit 205 controls the printing system 1000 to automatically resume (continue) the print operation of the print-interrupted job.

When the operator makes the print settings of a target job via the operation unit 204 and the number of print sheets of the job exceeds a stipulated number of print sheets, the control unit 205 displays an automatic checking print execution condition setting window on the operation unit 204 to allow automatically performing the checking print for the job.

Assume that a condition to permit inputting an automatic checking print execution condition has been set in advance via the operation unit 204. At this time, assume that the user inputs a printing condition via the operation unit 204. Then, assume that the control unit 205 accepts a print execution request from the operator via the operation unit 204 for the target job. In response to the print execution request, the control unit 205 causes the printing system 1000 to start the print operation of the job. Thereafter, the control unit 205 controls the operation unit 204 to be able to accept a request from the operator to perform the checking print operation for the job during printing while the printing system 1000 actually performs the print operation. At the same time, the control unit 205 determines whether the print status of the job in execution meets the condition set via the operation unit 204 before the start of the job. If the control unit 205 determines that the print status of the job in execution meets the automatic checking print execution condition, it interrupts the print operation of the job in execution by the printer unit 203 regardless of whether the operator has input a checking print request via the operation unit 204. Immediately after the printing system 1000 interrupts the print operation of the job in execution, the control unit 205 causes the printing system 1000 to perform the checking print operation of the job. In the checking print operation, the printing system 1000 creates a checking print material for the job in execution. When performing the checking print operation, the control unit 205 reads out, from the HDD 209, print data of the job whose print operation has been interrupted, and causes the printing apparatus 100 to perform print processing. Upon completion of the print processing by the checking print, the control unit 205 controls to notify the operator that the checking print is complete. Immediately after the checking print is complete, the control unit 205 controls the printing system 1000 to automatically resume (continue) the print operation of the print-interrupted job.

A print operation which is interrupted in response to a checking print operation execution request and automatically resumes in the printing system 1000 in response to the end of the checking print operation will be called the actual print operation of a job having undergone the checking print operation, or the print operation of a checking print-requested job. Print materials created by the print operation of a job subjected to the checking print will be called the actual print materials of the job subjected to the checking print operation, or the print materials of a checking print-requested job. To the contrary, print materials created by the checking print operation will be called the checking print materials of a checking print-requested job.

As a concrete example of this, a configuration will be described, in which the control unit 205 controls to be able to select which of the first and second type checking print operation is performed automatically or manually on the basis of settings by the operator and the settings of actual print materials.

As another concrete example of this, a configuration will be described, in which the control unit 205 controls the printing system 1000 to perform the checking print automatically for a job, for which the operator has not requested the checking print, on the basis of one of the above-described conditions designated via the operation unit 204.

The first type checking print operation causes the printing system 1000 to print once (i.e., by one set) print data of all pages used in the actual print operation of a checking print-requested job.

The second type checking print operation causes the printing system 1000 to print only print data of one page among print data of a checking print-requested job. In the second type checking print operation, the control unit 205 controls the printing system 1000 to print a page during printing when the operator inputs a checking print request via the operation unit 204.

Assume that the printing system 1000 has started the print operation of a job formed from original document data of 100 pages. Assume that the operator inputs a checking print request for the job via the operation unit 204 at the timing when the printer unit 203 prints the 25-th page. Also assume that the operator requests the checking print for only one page. In this case, the control unit 205 controls the printing system 1000 to print, as the checking print operation, only print data of the 25th page corresponding to the page during printing upon receiving the checking print request. In the embodiment, the printing system 1000 is configured to issue a paper feed command to the printer unit 203 for each page. In the second type checking print operation, the control unit 205 controls the printing system 1000 to print the same page as that for which the paper feed command has been issued upon receiving the checking print request. In this fashion, according to the embodiment, the control unit 205 controls the printing system 1000 to be able to perform the second type checking print operation to print only the same page as that during printing upon receiving a checking print request.

In the second type checking print operation which is performed automatically, the control unit 205 controls the printing system 1000 to print a page during printing when the intermediate execution result of a print job in execution meets the automatic checking print execution condition.

Assume that the printing system 1000 has started the print operation of a job formed from original document data of 10,000 pages. At this time, assume that the checking print is performed for a page during printing every 500 sheets as the automatic checking print execution condition. Also assume that the cumulative number of print sheets of the job reaches 500 sheets after printing of 10 min. In this case, the control unit 205 controls the printing system 1000 to print, as the checking print operation, only print data of the same page as the 500th page during printing. In the embodiment, the printing system 1000 is configured to issue a paper feed command to the printer unit 203 for each page. In the second type checking print operation, the control unit 205 controls the printing system 1000 to print the same page as that for which the paper feed command has been issued upon receiving the checking print request. In this manner, according to the embodiment, the control unit 205 controls the printing system 1000 to be able to perform the second type checking print operation to print only the same page as that during printing upon receiving a checking print request.

Assume that the printing system 1000 has started the print operation of a job requiring printing of 100-page original document data by 100 copies. At this time, assume that the checking print is performed for one copy including a page during printing every 10 min as the automatic checking print execution condition. Also assume that the cumulative print time of the job reaches 10 min after 680 sheets are printed. In this case, the control unit 205 controls the printing system 1000 to print, as the checking print operation, document data including the 680th page during printing from the first page. In the embodiment, the printing system 1000 is configured to issue a paper feed command to the printer unit 203 for each page. When executing the second type checking print operation, the control unit 205 controls the printing system 1000 to print only print data of one page corresponding to a page for which the paper feed command has been issued upon receiving the checking print request. In this way, according to the embodiment, the control unit 205 controls the printing system 1000 to be able to perform the second type checking print operation to print the print data including a page during printing upon receiving a checking print request.

After performing print processing by the checking print, the control unit 205 controls to notify the operator that the checking print has been performed. In a concrete example of this, a configuration in which all the following three types of notifications are issued will be described. However, the embodiment is not limited to this configuration. For example, one or two of the following notifications may also be issued. The following exemplary notification processing may also be commonly applied to the first and second modes, as described above, but may also be applied in a different way. For example, the control unit 205 controls to perform the following exemplary notification processing only in the first mode (automatic mode) and not to perform it in the second mode (manual mode). This configuration can omit unnecessary processing, and further enhance the above-described effects of the checking print function.

(1) Notification by Display on Printing Apparatus

After performing the checking print, the control unit 205 displays, on the operation unit 204 of the printing system 1000, a notification that the checking print has been performed. By combining a display based on lighting of the lamp of the printing system 1000 and a notification based on ringing of a buzzer, the control unit 205 controls to notify the operator that the checking print has been performed. This control allows the operator to detect that the checking print has been performed, and check the result of checking print materials printed by performing the checking print.

(2) Notification by E-Mail

The control unit 205 controls to notify the operator that the checking print has been performed, by sending e-mail representing that the checking print has been performed to an arbitrary e-mail address registered in advance. The control unit 205 controls to describe, in the e-mail, information on a job having undergone the checking print, the state of the job when the checking print is performed, the condition under which the checking print is performed, and the execution result. In an environment at a distance from the printing system 1000 and an e-mail receivable environment independent of the printing system 1000, the operator can detect that the checking print has been performed.

(3) Notification to Remote Terminal

The control unit 205 controls to display, on a terminal such as a Web browser or client software remote-connected to the printing system 1000 via a network, that the checking print has been performed. At this time, the control unit 205 controls to display information on a job having undergone the checking print, the state of the job when the checking print is performed, the condition under which the checking print is performed, and the execution result.

These notifications are selectively issued based on an instruction from the operator. The control unit 205 may also control to issue notifications (1) to (3) simultaneously when the checking print is performed.

The control unit 205 resumes interrupted actual print processing for print materials simultaneously when notifying the operator that the checking print has been performed.

The operator of the printing system 1000 visually checks a checking print material created by the checking print operation. In a concrete example of this, the control unit 205 controls the printing system 1000 to be able to selectively perform at least the following three processes in response to a request from the operator who has checked the output result of the checking print material.

1. Example (1) of Processing Control Unit 205 Causes Printing System 1000 to Perform in Response to Request from Operator Who has Checked Result of Checking Print Material Output by Checking Print Assume that the operator visually checks the checking print material of a job having undergone the checking print operation, and determines that the checking print material does not have an output style he wants. In this case, the control unit 205 controls the printing system 1000 to stop (cancel), based on a request from the operator, the actual print operation of the job that has automatically resumed in the printing system 1000 immediately after performing the checking print operation. By this control, the control unit 205 forcibly ends the processing of the job. Note that the control unit 205 accepts a request from the operator via a key 2401F of a window 2400F in FIG. 10E (to be described later).

2. Example (2) of Processing Control Unit 205 Causes Printing System 1000 to Perform in Response to Request from Operator Who has Checked Result of Checking Print Material Output by Checking Print-Processing to Change Actual Print Processing Condition Specific to Print Job Subjected to Checking Print Assume that the operator visually checks a checking print material, and determines that the checking print material does not have an output style he wants. In this case, the control unit 205 controls the printing system 1000 to suspend, in response to a request from the operator, the actual print operation of the job that has automatically resumed in the printing system 1000 immediately after performing the checking print operation. During the suspension, the control unit 205 accepts a setting from the operator via the operation unit 204 to change the output style of the job. For example, the control unit 205 accepts a setting change for the type of print medium necessary for the actual print operation of a job, and a setting change for the density in printing. As other setting changes, the control unit 205 accepts a setting change to increment/decrement the number of copies, and a setting change for post processing such as stapling. The control unit 205 controls the operation unit 204 to be able to accept, from the operator, these setting changes of job-specific print processing conditions. After that, the control unit 205 controls the printing system 1000 to create and output actual print materials again from the beginning under setting-changed print processing conditions on the basis of a request from the operator. In this manner, the control unit 205 allows the operator to change settings specific to a job subjected to the checking print. The control unit 205 accepts a suspension request from the operator via a key 2401D of a window 2400D in FIG. 10D (to be described later). Also, the control unit 205 accepts setting changes from the operator via a window 2300A in FIG. 9F (to be described later) or a window 2400C in FIG. 10C (to be described later).

3. Example (3) of Processing Control Unit 205 Causes Printing System 1000 to Perform in Response to Request from Operator Who has Checked Result of Checking Print Material Output by Checking Print This processing is applied to a case where the operator visually checks checking print materials, and determines that an adjustment value specific to the printing system 1000 that influences not only the current job but also other jobs needs to be changed. This corresponds to a case where the operator checks the output result of the checking print and determines that the adjustment value (parameter) specific to the printing system 1000 including the printing apparatus 100 needs to be corrected. Note that the system-specific parameter includes system-specific parameters (e.g., the temperature of the fixing unit of the printer unit 203 and the print medium feeding speed) directly related to print processing of the printing system 1000, and a print density value serving as the reference value of the device. In the embodiment, the system-specific parameters include at least one of the following four parameters:

(1) adjustment of the creep (deviation) correction amount of the print position on a print medium, (2) automatic tone correction, (3) density correction, and (4) adjustment of the contrast between the text and the background.

When such an adjustment value is changed, the control unit 205 controls the printing system 1000 to reflect the change result of the adjustment value in even the printout result of a print job output from the printing system 1000 including the printing apparatus 100. That is, the system-specific adjustment values (parameters) themselves are condition values which influence print processing of a target job. The embodiment includes even system-specific adjustment values (parameters) as an example of print processing conditions concerning a target print job.

The embodiment assumes that there are factors which change a printout result, in addition to the above-mentioned adjustment values. For example, members such as the feeder of the scanner unit 201 of the printing apparatus 100, the wire of the printer unit 203, and various rollers for conveying a print medium may be contaminated in accordance with the frequency of use and the period of use. In this case, a contaminated member can be cleaned to obtain a higher-quality output result. Thus, according to the embodiment, the control unit 205 controls the printing system 1000 to be able to perform at least one of the following three processes on the basis of a request from the operator after performing the checking print:

(1) cleaning of the feeder, (2) cleaning of the wire, and (3) cleaning of the roller.

Assume that the control unit 205 causes various related units of the printing system 1000 to clean a variety of members. Also in this case, the printout result of a print job output from the printing system 1000 including the printing apparatus 100 changes. The cleaning processing for the members of the printing system 1000 also influences print processing of a target job. Thus, the embodiment includes even execution of the cleaning processing for the members of the printing system 1000, as an example of changing print processing conditions concerning a target print job.

The control unit 205 causes the printing system 1000 to change the above-mentioned processing conditions (parameters) specific to the printing system 1000 in accordance with an operator operation after performing the above-described checking print operation. Then, the control unit 205 controls the printing system 1000 to be able to process a job having undergone the checking print in print processing complying with the changed system-specific parameter. In addition, the control unit 205 controls the printing system 1000 to process not only a target job but also another job such as a job in the print queue in print processing complying with the changed system-specific parameters.

In this way, the control unit 205 controls the printing system 1000 to be able to change, based on an operator request after performing the checking print, a system-specific processing condition which influences the print processing conditions of a plurality of jobs, and to successively process these jobs by the printing system 1000.

Assume that the control unit 205 causes the printing system 1000 to perform the checking print operation. In this case, the control unit 205 controls to be able to change, in accordance with an instruction accepted from the operator via the operation unit 204, a "print processing condition concerning the print operation of a job subjected to the checking print operation and also concerning the print operation of another job different from this job". The control unit 205 accepts, from the operator via the window 2400C in FIG. 10C (to be described later) or the like, a setting change after performing the checking print.

A configuration associated with the checking print will be further explained.

Assume that the control unit 205 causes the operation unit 204 to present a display in FIG. 5. This display processing corresponds to a process in step S101 of FIG. 16A (to be described later).

When the operator presses the user mode key 505 in the display of FIG. 5, the control unit 205 controls the operation unit 204 to display a window as shown in FIG. 11A. When the operator designates a key 1401 for setting the checking print in the window shown in FIG. 11A, the control unit 205 controls to display a "window which allows the operator to input the initial settings of the checking print" shown in FIG. 11B on the operation unit 204. In FIG. 11B, the number of print sheets in an area 1501 is the set number of print sheets of a job at which an automatic checking print can be selected. This processing corresponds to steps S102 and S103 in FIG. 16A.

The set number of print sheets is defined as a threshold. That is, when the number of print sheets of a print job is equal to or larger than the threshold, the control unit 205 controls to be able to set an automatic checking print execution condition in a print job printing condition setting window. This processing corresponds to step S105 of FIG. 16A.

Assume that the operator sets 5,000 or more sheets as the set number of print sheets of a job at which the automatic checking print can be selected. Thereafter, the control unit 205 controls to display an automatic checking print execution selection window shown in FIG. 12 for the job as long as the set number of print sheets of a subsequent job set to be printed exceeds 5,000 or more.

Assume that the control unit 205 accepts a series of printing conditions for a target job from the operator via the display in FIG. 5. The processing to accept the printing conditions is a process in step S104 of FIG. 16A (to be described later). This job will be referred to as job X. Assume that job X is a job for scanning an original document including a total of 10 pages by the scanner unit 201, and printing the print data of the scanned original document by the printer unit 203 via the HDD 209.

Also assume that the operator sets the following exemplary processing conditions as printing conditions for job X via the display in FIG. 5:

(1) "paper size=A4, and the type of paper=plain paper" as settings of a print medium necessary for printing,
(2) copy ratio=100%,
(3) stapling as a finishing setting, and
(4) total number of copies="100".

Assume that the operator sets these processing condition parameters (1) to (4) via the operation unit 204 presenting the display in FIG. 5. In this case, the control unit 205 controls the operation unit 204 to reflect the contents set by the operator. For example, the control unit 205 controls the touch panel section 401 to update the display contents in the touch panel section 401 of the operation unit 204 from those shown in FIG. 5 to those shown in FIG. 9A.

When the number of print sheets of job X meets the "condition to enable setting the automatic checking print" set in the window shown in FIG. 11B, the control unit 205 permits accepting an instruction to set an automatic checking print execution condition for job X. At this time, the control unit 205 enables a "checking print" key 2310 in a window shown in FIG. 9B as a key used to input an automatic checking print execution condition for job X. When the operator designates the "checking print" key 2310, the control unit 205 causes the touch panel section 401 to present a display shown in FIG. 12. Then, the control unit 205 accepts the setting of the automatic checking print execution condition for job X from the operator via the window shown in FIG. 12.

Figure 12:
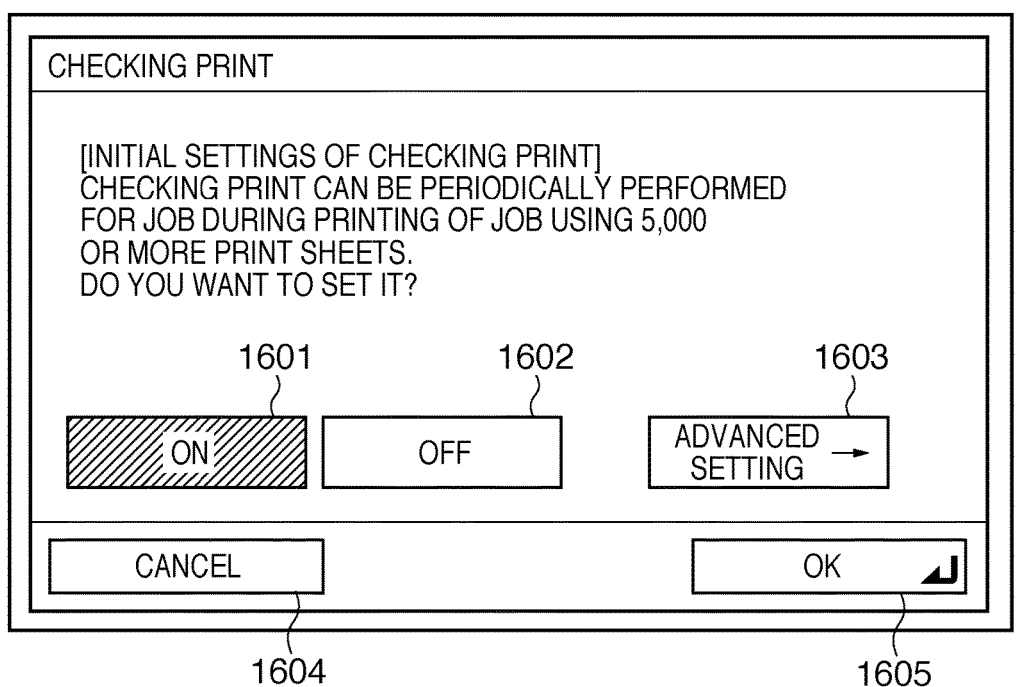
FIG. 12 is a view showing an example of a user interface window.
Figure 13A:
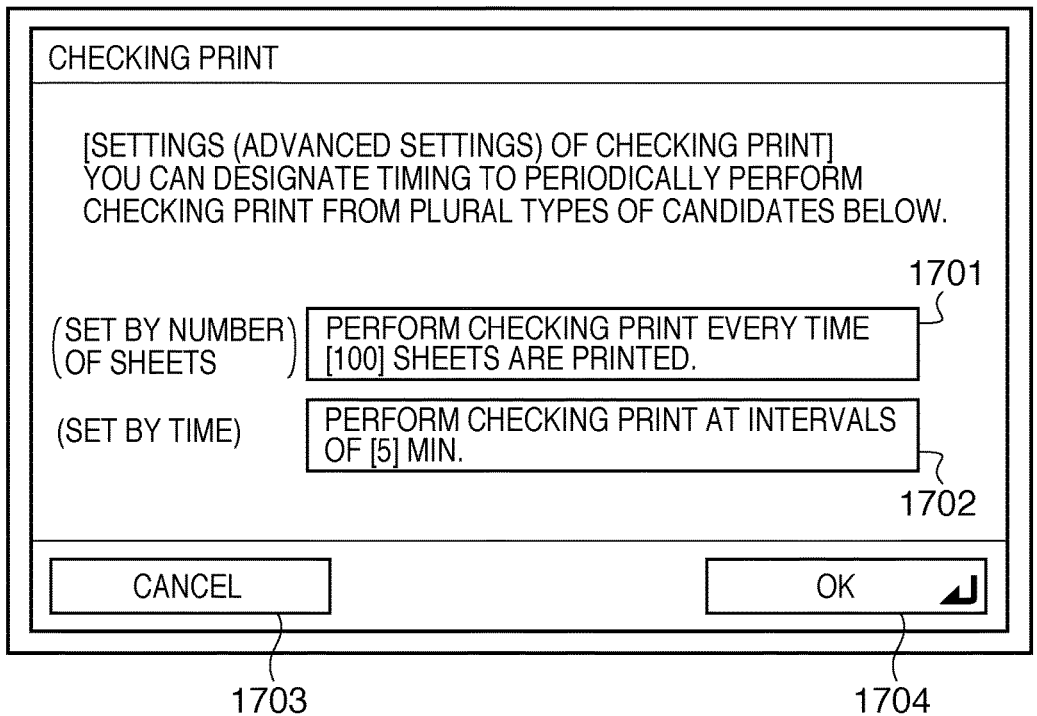
FIG. 13A is a view showing an example of a user interface window.

For example, when the operator designates an advanced setting key 1603 in the window shown in FIG. 12, the control unit 205 causes the touch panel section 401 to display a window shown in FIG. 13A. The operator designates a setting key 1701 in the touch panel section 401, and selects the interval of a stipulated number of sheets at which the checking print is performed automatically. When the operator designates this key to select the number of sheets, the control unit 205 controls to perform the checking print automatically every time the cumulative number of print sheets after the start of a job reaches the interval of the set number of sheets.

Also, the operator designates a setting key 1702 in the touch panel section 401, and selects the interval of a stipulated time at which the checking print is performed automatically. When the operator designates this key to select the time, the control unit 205 controls to perform the checking print automatically every time the cumulative print execution time after the start of a job reaches the set time interval.

In the above description, the control unit 205 displays stipulated automatic execution conditions in the touch panel section 401, and prompts the operator to select one of them. However, the control unit 205 may also adopt another configuration. For example, when the operator designates the advanced setting key 1603 in FIG. 12, the control unit 205 displays, in the touch panel section 401, a window for prompting him to select either the interval of the number of print sheets or the print execution time as the automatic execution condition. After the operator selects either condition, the control unit 205 controls the touch panel section 401 to display a window for prompting him to input an arbitrary interval.

Figure 13B:
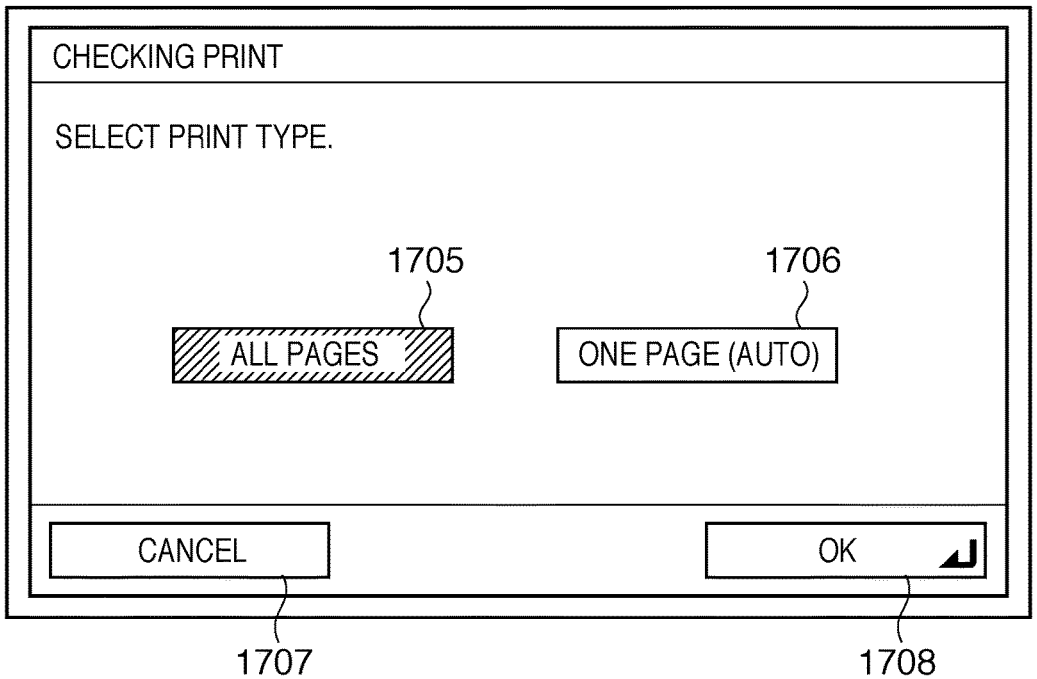
FIG. 13B is a view showing an example of a user interface window.
Figure 15:
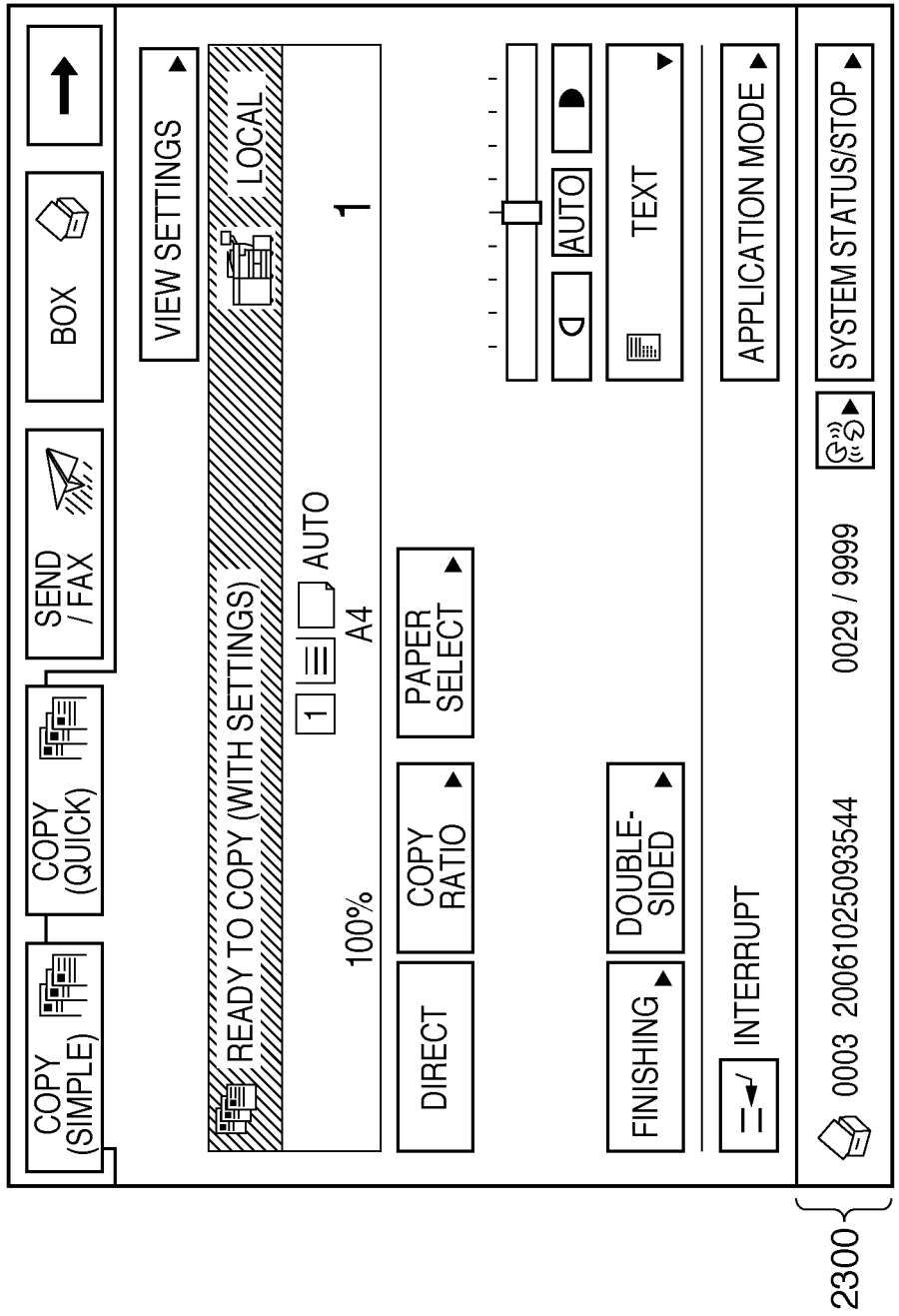
FIG. 15 is a view showing an example of a user interface window.

When the operator designates a key 1704 in the window shown in FIG. 13A, the control unit 205 displays a window shown in FIG. 13B in the touch panel section 401. In this window, the control unit 205 accepts a setting when performing the automatic checking print. For example, if the operator designates a key 1705 shown in FIG. 13B, the control unit 205 controls to perform the first type checking print when performing the automatic checking print. If the operator designates a key 1706 shown in FIG. 13B, the control unit 205 controls to perform the second type checking print when performing the automatic checking print.

A case where the actual print operation of job X starts will be explained. Assume that the operator presses the start key 503 while the touch panel section 401 displays the window shown in FIG. 9A. Then, the control unit 205 determines that it has accepted a request (print execution request) from the operator via the operation unit 204 to perform the print operation of job X. The determination of whether the print execution request (print start request) has been accepted corresponds to a process in step S108 of FIG. 16A (to be described later). This print operation is the actual print operation of job X subjected to the checking print operation. The timing to start the actual print operation of job X is time T0 shown in FIG. 8.

Figure 9A:
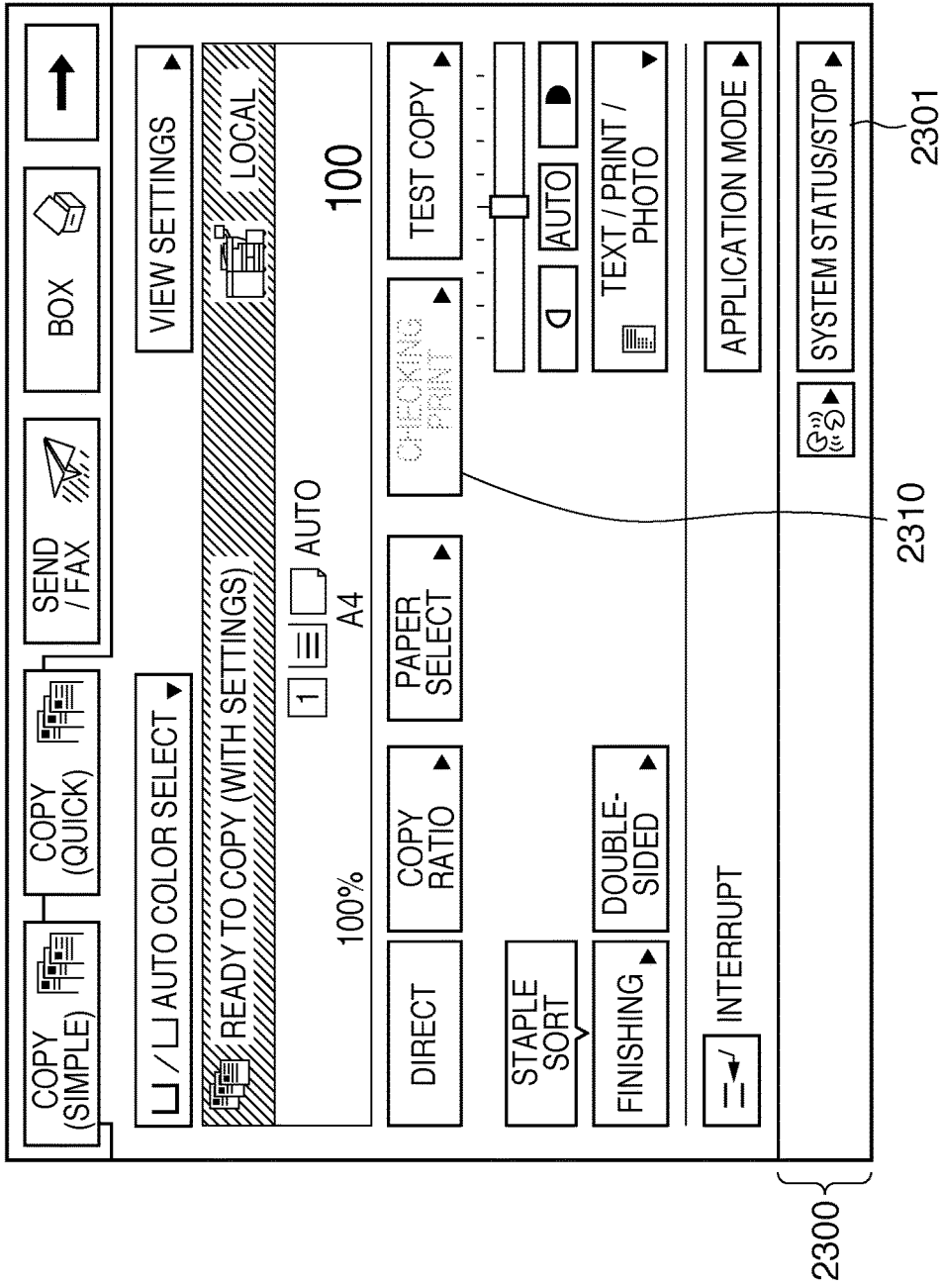
FIG. 9A is a view showing an example of a user interface window.
Figure 9B:
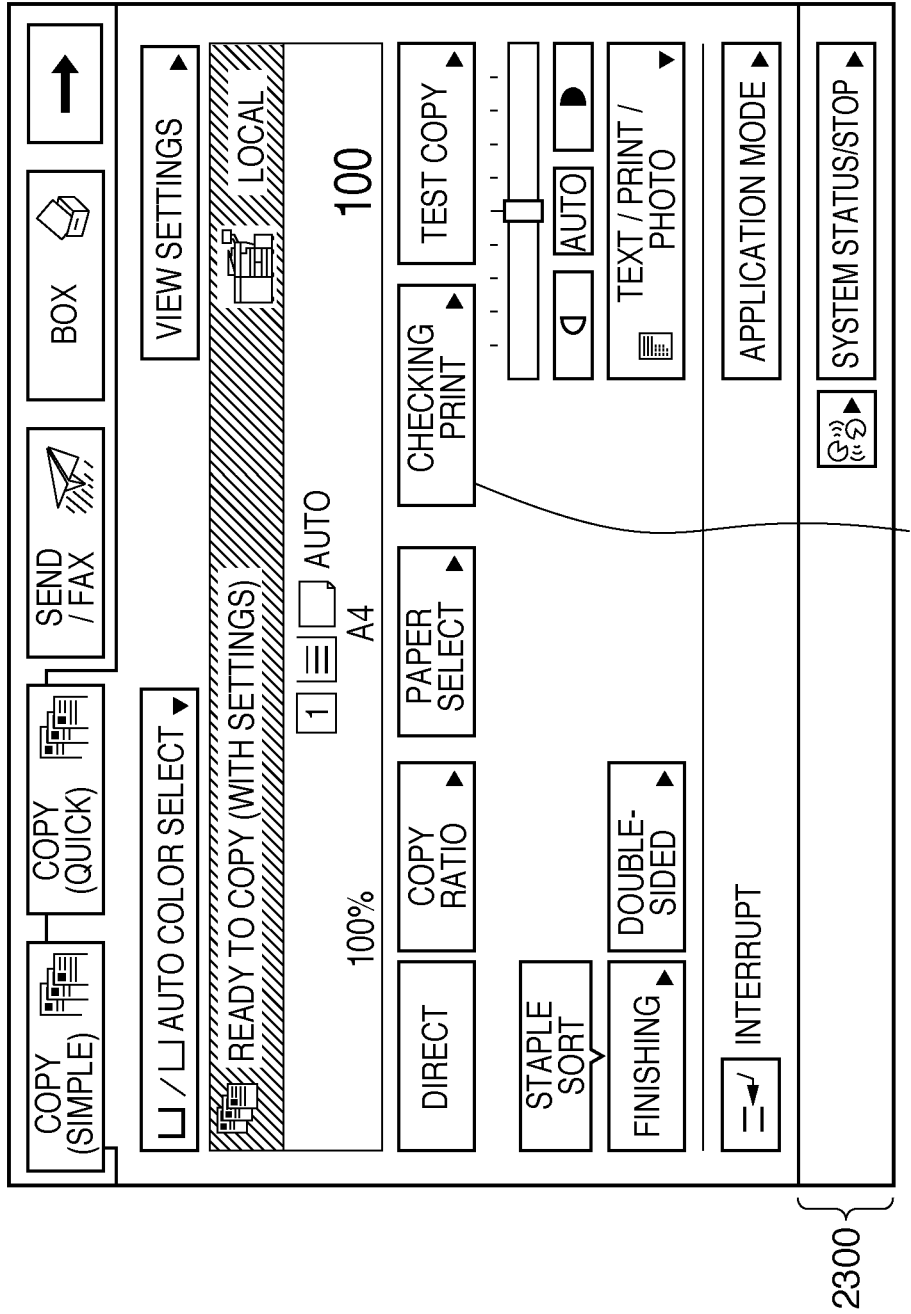
FIG. 9B is a view showing an example of a user interface window.

As described above, assume that the operator presses the start key 503 while the touch panel section 401 displays the window shown in FIG. 9A. Assume that another job, for which a print execution request has been input, does not exist in the HDD 209 other than job X when the operator presses the start key 503. If this condition is satisfied, the control unit 205 causes the printing system 1000 to start a series of print operations of job X in response to a print execution request for job X from the operator. As the series of print operations of job X, the control unit 205 controls the printing system 1000 to perform the following operations.

As described above, upon accepting the print execution request for job X from the operator via the start key 503, the control unit 205 causes the scanner unit 201 to sequentially scan a 10-page original document of job X from the first page. Simultaneously when the printing system 1000 starts the scanning operation, or simultaneously when the control unit 205 rasterizes the 10-page original document data in the HDD 209, the control unit 205 causes the touch panel section 401 to present a display for prompting the operator to check the progress (process status) of job X. The control unit 205 controls the touch panel section 401 to popup-display the window 2300A at a timing when it accepts the print execution request for job X from the operator. The processing to popup-display the window 2300A corresponds to a process in step S109 of FIG. 16A (to be described later). The window 2300A is a job process status window configured to be able to notify the operator in real time of the progress such as the process status of a job whose print operation starts. The job process status window 2300A is a "print status window" shown in FIG. 16B.

The control unit 205 acquires pieces of status information of job X from units which perform operations (e.g., a scanning operation, storage operation, reception operation, rasterization operation from the storage device, print operation, and finishing operation for job X) necessary to complete the print operation of job X. The control unit 205 controls the touch panel section 401 to update the display contents of the window 2300A to those reflecting the status information.

A display field 2300 at the bottom of windows exemplified in FIGS. 9A to 11A, 14, and 15 is a status display portion capable of displaying status information when there is status information of high priority which should be notified to the operator. For example, in the stage of the window shown in FIG. 9A, no actual processing of job X has started. In this case, as shown in FIG. 9A, the control unit 205 controls the touch panel section 401 not to display any status information in the display field 2300. In the state of the window shown in FIG. 9D, the print operation of job X is in progress. In this case, the control unit 205 controls the touch panel section 401 to display, even in the display field 2300, information representing the process status of job X.

Assume that the printer unit 203 does not perform printing of job X at present. In this case, the control unit 205 inhibits accepting a checking print request for job X from the operator.

Figure 9C:
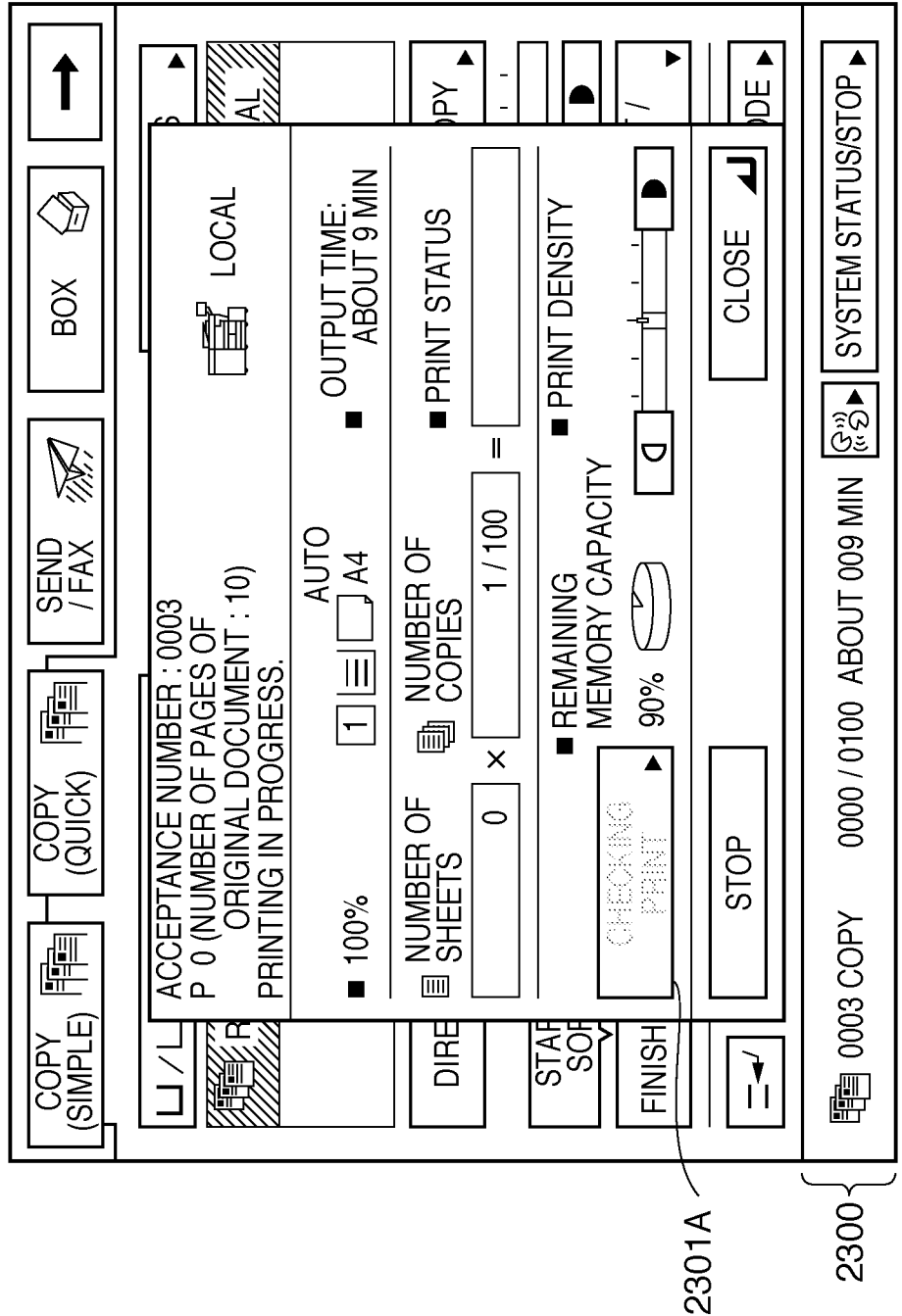
FIG. 9C is a view showing an example of a user interface window.

For example, in the stage of the window shown in FIG. 9C, the storage operation of job X in the HDD 209 has started, but printing of print data of job X has not started yet. In this case, the control unit 205 inhibits accepting a checking print request for job X in the stage of the window shown in FIG. 9C. In this case, the control unit 205 controls the touch panel section 401 to disable a key 2301A so the operator cannot designate the key 2301A, as shown in FIG. 9C. When the job processed in the printing system 1000 is not during printing, the control unit 205 controls to inhibit accepting a checking print request for the job from the operator. As a method of disabling the key 2301A, the key 2301A may also be grayed out as shown in FIG. 9C, or may also be disabled in another way, e.g., hatched or not displayed.

After the end of reading in FIG. 9C, the total number of print sheets of job X is finalized. At this time, the control unit 205 determines in advance whether job X meets the automatic checking print execution condition as shown in FIG. 11B. If job X meets this condition, the control unit 205 controls the operation unit 204 to display a checking print setup window as shown in FIGS. 12, 13A, and 13B.

When the operator designates a key 1601 shown in FIG. 12 and sets to perform the checking print automatically, the control unit 205 sets an automatic checking print execution condition. When the operator designates the advanced setting key 1603, the control unit 205 controls to successively display windows shown in FIGS. 13A and 13B.

When the operator designates an OK key 1605 shown in FIG. 12 or an OK key 1708 shown in FIG. 13B, the control unit 205 controls to return the window to the display shown in FIG. 9C.

Assume that the progress of job X has further changed from the stage of the display shown in FIG. 9C. For example, all 10 pages of the original document of job X have been transferred from the scanner unit 201 to the HDD 209. Assume that all the 10 pages of job X have been stored in the HDD 209. Further, assume that the print data of job X are being read out from the HDD 209 and printed now in order to complete printing of a total of 100 copies necessary for job X. The control unit 205 acquires various kinds of information for specifying this situation from the operation unit 204, scanner unit 201, HDD 209, and printer unit 203. In this manner, even if the process status has changed, the control unit 205 controls the touch panel section 401 to update the display contents of the window 2300A to those based on the acquired information.

For example, the control unit 205 controls the touch panel section 401 to update the display contents of the window 2300A representing the process status of job X to those shown in FIG. 9D so as to deal with a change of the progress of job X.

The display shown in FIG. 9D is configured to allow the operator to confirm that the storage operation of print data of job X in the HDD 209 is complete and the print operation of print data of job X is in execution. For example, the window shown in FIG. 9D displays a message "printing of job of acceptance number 0003 (job X in this example) is in progress". The window shown in FIG. 9D notifies the operator that job X requires printing of a total of 100 copies and printing of the 10th sheet in printing of the fourth copy (printing of the fourth set) is in progress now. The display shown in FIG. 9D corresponds to a stage in which printing of job X is in execution. As shown in FIG. 9D, the control unit 205 controls the touch panel section 401 to enable the "checking print" key 2301A in the window 2300A. When the target job, for which a print execution request has been issued, is during printing, the control unit 205 controls to permit (enable) accepting a checking print request for the job from the operator. The control unit 205 controls the touch panel section 401 to display status information of the job even in the display field 2300 so that the operator can grasp the process status of the job even after the popup display of the window 2300A disappears.

In this fashion, the control unit 205 controls the touch panel section 401 to update the display contents of the window 2300A for a job, for which a print execution request has been issued, in real time in synchronism with the process status of the job in the printing system 1000. For example, the control unit 205 controls the touch panel section 401 to sequentially update the display contents of the window 2300A in accordance with the progress of job X in the printing system 1000, like an example of control to change the display to those shown in FIGS. 9A to 9D. The control unit 205 also controls the touch panel section 401 to update the display contents of the display field 2300 at the bottom of the touch panel section 401 to those synchronized with the process status of the target job.

Based on whether printing of a target job, for which a print execution request has been issued, is in execution in the printing system 1000, the control unit 205 determines whether to accept a checking print request for the job. For example, the control unit 205 controls the operation unit 204 to allow the operator to designate the key 2301A, as shown in FIG. 9D, on condition that the print operation of job X is in execution by the printer unit 203. Accordingly, the control unit 205 permits accepting a checking print request for job X from the operator via the key 2301A. When the target job, for which a print execution request has been issued, is during printing, the control unit 205 controls to permit (enable) accepting a checking print request for the job from the operator.

Based on whether printing of a target job, for which a print execution request has been issued, is in progress in the printing system 1000, the control unit 205 determines the automatic checking print execution condition of the job. For example, when the automatic checking print execution condition is set to an interval of 5 min, as represented in the window shown in FIG. 13A, the control unit 205 determines the execution condition on condition that the print operation of job X is in execution by the printer unit 203. That is, while print processing is suspended in response to designation of a print suspension key 2401A shown in FIG. 10A, the control unit 205 neither determines the execution condition nor performs the checking print even if a suspension time of 5 min or more has elapsed. In this way, when the target job, for which a print execution request has been issued, is during printing, the control unit 205 controls to determine whether to perform the checking print automatically for the job.

In contrast, if no printing of job X is in progress, the control unit 205 disables the key 2301A to prevent the operator from designating it, and inhibits accepting a checking print request for job X from the operator, as shown in FIG. 9C. When the target job, for which a print execution request has been issued, is not during printing, the control unit 205 controls to inhibit (disable) accepting a checking print request for the job from the operator.

Assume that the operator designates the active key 2301A in the job process status window 2300A shown in FIG. 9D while the touch panel section 401 presents the display shown in FIG. 9D. In this case, the control unit 205 causes the touch panel section 401 to present a display shown in FIG. 9E in response to this key operation. This processing corresponds to a case where YES is determined in step S115 of FIG. 16B (to be described later) and the process advances to step S116.

A window 2300B shown in FIG. 9E is a display window configured to allow the operator to determine which of the first and second type checking print operations described above is performed for a job subjected to the checking print operation. The window 2300B is a "checking print type selection window" shown in FIG. 16B.

An "all pages" key 2301B in the window 2300B is a display key configured to allow the operator to input an instruction which causes the printing system 1000 to perform the first type checking print operation for a job permitted to perform the checking print operation.

An "one page (auto)" key 2302B in the window 2300B is a display key configured to allow the operator to input an instruction which causes the printing system 1000 to perform the second type checking print operation for a job permitted to perform the checking print operation.

The control unit 205 controls to alternatively select the key 2301B or 2302B. Except for a case where the operator selects the key 2301B, the control unit 205 controls to select the key 2302B in the window 2300B. After the operator determines either checking print operation by selecting either key and designates a "start print" key 2304B shown in FIG. 9E, the control unit 205 determines that it has accepted a checking print operation execution request from the operator. If the operator does not designate the key 2304B, the control unit 205 controls not to start the print operation for a job permitted to perform the checking print operation.

For example, it is determined as the current status that the operation unit 204 presents the display shown in FIG. 9E, and the operator has not designated the key 2304B. This determination corresponds to a case where NO is determined in step S117 of FIG. 16B (to be described later). In this state, the control unit 205 inhibits the start of the checking print operation of job X. In this state, the control unit 205 controls the printing system 1000 to continuously perform the actual print operation of job X by the printing system 1000 in order to complete the actual print operation of job X. In addition, the control unit 205 controls the touch panel section 401 to update even the display contents of the job process status window of job X in synchronism with the print status so as to notify the operator of this status in real time.

In this regard, for example, printing of the fourth copy (fourth set) of "job X requiring printing of 100 copies of 10-page print data by the actual print operation" is in execution in the stage of the display shown in FIG. 9D. After that, the control unit 205 causes the operation unit 204 to present the display shown in FIG. 9E. Further, the control unit 205 confirms that the operator has not designated the key 2304B shown in FIG. 9E. In this state, the control unit 205 causes the printing system 1000 to continue the actual print operation of job X permitted to perform the checking print operation. Assume that the control unit 205 causes the printer unit 203 to print the fourth copy (fourth set) of job X now. In this case, the control unit 205 controls the touch panel section 401 to notify the operator that "job X of acceptance number 0001 is during printing, and printing of the fourth copy (fourth set) out of a total of 100 copies (100 sets) is in progress now". For example, the control unit 205 controls to display in the display field 2300 a message "0001 copy printing in progress (4/100)" as the process status of job X, as shown in FIG. 9E, while keeping displaying the window 2300B.

Assume that the operator designates the "all pages" key 2301B in the window 2300B shown in FIG. 9E and then the "start print" key 2304B. Then, assume that the control unit 205 determines in response to this key operation that the operator has input a request to perform the first type checking print operation. This determination corresponds to a case where YES is determined in step S117 of FIG. 16B (to be described later). Upon receiving this request, the control unit 205 controls the printing system 1000 to stop (interrupt) the actual print operation of job X serving as a job in progress by the printing system 1000. The control unit 205 controls the printing system 1000 to start the first type print operation as the checking print operation of job X without performing the second type checking print operation immediately after interrupting the actual print operation of job X.

To the contrary, assume that the operator designates the "one page (auto)" key 2302B in the window 2300B shown in FIG. 9E and then the "start print" key 2304B. In this case, assume that the control unit 205 determines in response to this key operation that the operator has input a request to perform the second type checking print operation. In this case, the control unit 205 controls the printing system 1000 to stop (interrupt) the actual print operation of job X serving as a job in execution by the printing system 1000. The control unit 205 controls the printing system 1000 to start the second type print operation as the checking print operation of job X without performing the first type checking print operation immediately after interrupting the actual print operation of job X.

As described above, in the "first type checking print operation" which starts in the printing system 1000 instead of the actual print operation, print data of all pages to be printed in printing of one set in the actual print operation are printed once. In the above-described example, the control unit 205 controls the printing system 1000 to print the print data of all 10 pages of job X once, as first type checking print operation of job X.

As described above, in the "second type checking print operation" which starts in the printing system 1000 instead of the actual print operation, only a specific page out of all pages to be printed in printing of one set in the actual print operation is printed. In the embodiment, the control unit 205 controls to print a page during printing when a checking print request is input, as described above. Assume that the operator designates the "one page (auto)" key 2302B in the window 2300B and then the "start print" key 2304B. At the timing when the designation of the key 2304B is input, the control unit 205 instructs the printer unit 203 to start printing of the seventh page of job X in the print operation of the fourth set of job X. In this manner, assume that the control unit 205 reads out print data of the seventh page of job X from the HDD 209, and issues a paper feed command to the printer unit 203 to feed one print medium used to print the seventh page from the paper feeder. In this case, the control unit 205 controls the printing system 1000 to perform, on one print medium, printing based on only print data of the seventh page of job X as the second type checking print operation immediately after interrupting the actual print operation of job X. As described above, when the operator designates the keys 2302B and 2304B, the control unit 205 confirms the page number subjected to the actual print operation of the job at this time. The control unit 205 controls to print only the confirmed page by the checking print operation. A page printed by the second type checking print operation is automatically determined based on the timing when the operator inputs a checking print request, and the page is printed on one print medium.

Assume that the operator designates a "cancel" key 2303B shown in FIG. 9E. In response to this key operation, the control unit 205 cancels settings associated with the checking print for a job permitted to perform the checking print operation. In this case, the control unit 205 controls the operation unit 204 to end the popup display of the window 2300B and display the window 2300A representing the progress of the job again in the touch panel section 401. For example, in this case, the window 2300A for job X is displayed again.

The embodiment has described a configuration in which the control unit 205 automatically specifies a print page subjected to the checking print in the second type checking print operation on the basis of determination made by the control unit 205 itself, and controls to print only the specified page on one print medium. However, the embodiment may also employ another configuration. For example, after the operator designates the key 2302B, he specifies one arbitrary page out of print data of a job permitted to perform the checking print. In response to the selection of the arbitrary page by the operator and designation of the key 2304B, the control unit 205 controls to perform printing based on the print data of the arbitrary page designated by the operator on one print medium, and output the page. This configuration is also available. Even in this configuration, the checking print request is issued on condition that the target job is during printing.

As described above, assume that the operator designates either the key 2301B or 2302B in the window 2300B shown in FIG. 9E to select the type of checking print, and designates the key 2304B to input a checking print request. Then, the control unit 205 determines that the operator has input the checking print request. This processing corresponds to a case where YES is determined in step S117 of FIG. 16B (to be described later). In response to this, the control unit 205 controls the printing system 1000 to automatically interrupt (stop) the actual print operation of job X. This processing corresponds to a process in step S121 of FIG. 16C (to be described later). After interrupting the actual print operation of job X, the control unit 205 controls the printing system 1000 to automatically start a checking print operation of a type selected by the operator in the window 2300B. This processing corresponds to a process in step S122 of FIG. 16C (to be described later). Assume that the printing system 1000 completes (ends) the checking print operation for job X. In response to the end of the checking print operation for job X, the control unit 205 controls the printing system 1000 to automatically resume (continue) the actual print operation of job X. These processes correspond to those in steps S123 to S125 of FIG. 16C (to be described later).

Assume that the printing system 1000 resumes the actual print operation of the job having undergone the checking print operation. In this case, the control unit 205 controls the printing system 1000 not to print, in the resumed operation, print data which have already been processed immediately before the operator inputs the checking print operation execution request. The control unit 205 controls the printing system 1000 to print only print data (remaining print data) of the job that have not been processed before performing the checking print operation, in the actual print operation automatically resumed in response to the end of the checking print operation.

For example, job X subjected to the checking print operation is a "job requiring printing of a series of 10-page print data by a total of 100 copies (100 sets)" in the actual print operation. In the above-described example, pages up to the seventh page of the fourth copy (fourth set) have been printed by the actual print operation of job X immediately before the operator inputs a request via the key 2304B shown in FIG. 9E to perform the checking print operation for job X. In this case, the control unit 205 controls the printing system 1000 to sequentially perform the following operations as the actual print operation of job X that automatically resumes in response to the end of the checking print operation.

(1) Print data of the eighth to 10th pages of job X are printed page by page using three print sheets in order to complete printing of the fourth copy (fourth set).

(2) Printing of up to the 100th set corresponding to the final copy is completed from printing of the fifth set.

More specifically, printing of 953 sheets as the sum of [three remaining print sheets of the fourth set] and [(10 sheets×95 sets) in printing of the fifth to 100th sets] is performed in the print operation of job X that automatically resumes immediately after the checking print operation of job X.

When the checking print operation is done in this way in the embodiment, the control unit 205 controls the printing system 1000 to automatically perform the following operations in order.

[Operation 1]

The control unit 205 causes the printing system 1000 to start the print operation of a target job in response to a print execution request input from the operator using the start key 503, or if the automatic checking print execution condition is met. This print operation is the actual print operation of a job subjected to the checking print operation. The timing to start this print operation is time T0 shown in FIG. 8. [Operation 1] is the operation of [step 1] shown in FIG. 8 that is performed by the printing system 1000 during a period immediately before time TX after time T0 shown in FIG. 8.

[Operation 2]

The control unit 205 interrupts the actual print operation of the job in response to a checking print operation execution request input from the operator using the key 2304B, or if the print status of a job meets the automatic checking print execution condition. Immediately after interrupting the actual print operation, the control unit 205 causes the printing system 1000 to start the checking print operation of the job automatically. In the checking print operation, print processing is performed using print data of the job whose print operation has been interrupted.

Assume that the operator designates the key 2301B in the window 2300B prior to designating the key 2304B. In this case, the control unit 205 causes the printing system 1000 to perform the first type checking print operation as the checking print operation. To the contrary, assume that the operator designates the key 2302B in the window 2300B prior to designating the key 2304B. In this case, the control unit 205 causes the printing system 1000 to perform the second type checking print operation as the checking print operation.

Assume that the operator has designated the key 1705 shown in FIG. 13B in advance when not the operator inputs an automatic checking print execution request, but the automatic checking print execution condition is met. In this case, the control unit 205 causes the printing system 1000 to perform the first type checking print operation as the checking print operation. When the operator has designated the key 1706 shown in FIG. 13B in advance, the control unit 205 causes the printing system 1000 to perform the second type checking print operation as the checking print operation.

Figure 8:
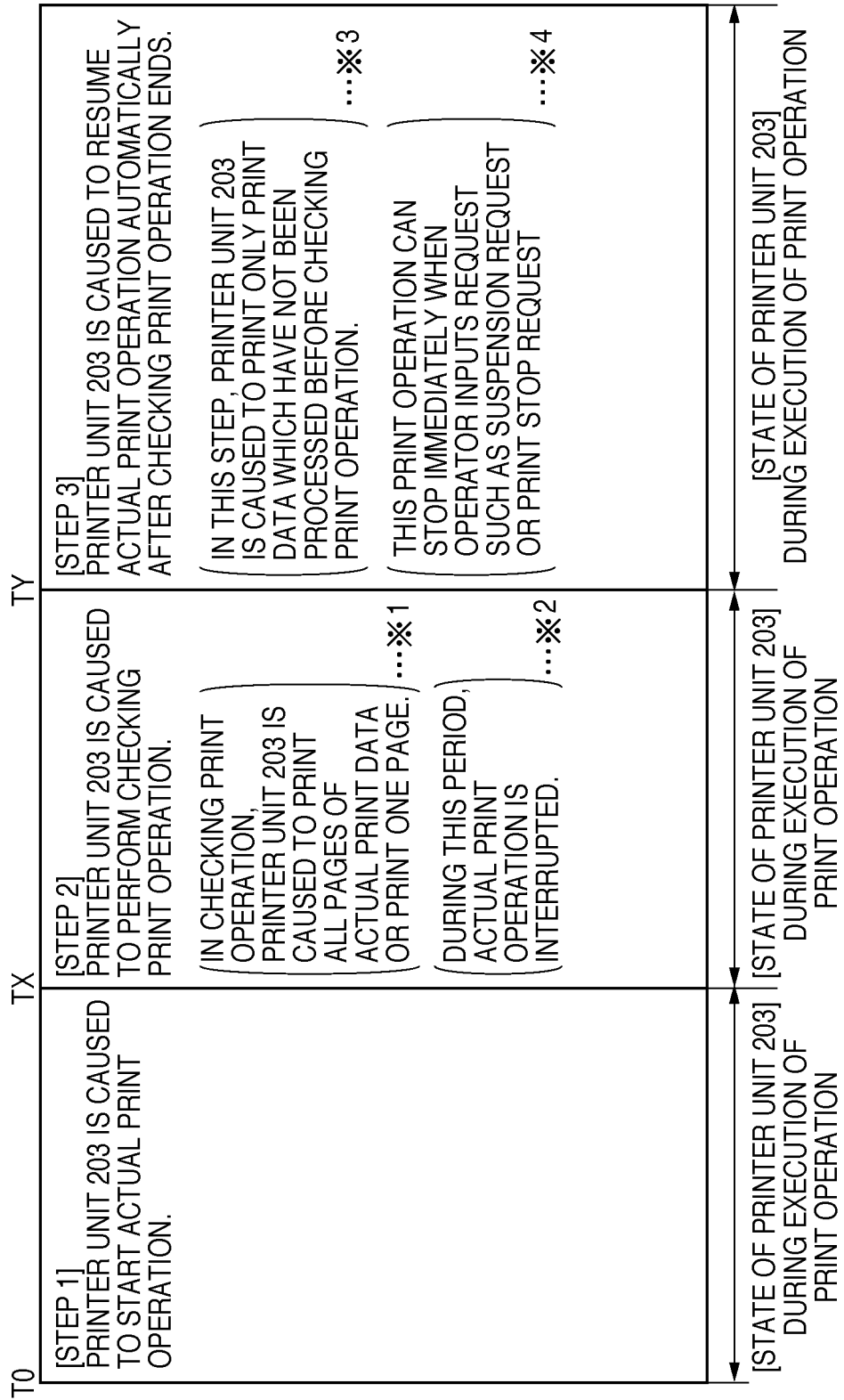
FIG. 8 is a timing chart.

The timing to start the checking print is time TX shown in FIG. 8. The checking print operation in [operation 2] is the operation of [step 2] shown in FIG. 8 that is performed during a period immediately before time TY after time TX shown in FIG. 8.

[Operation 3]

The control unit 205 causes the printing system 1000 to automatically resume (continue) the actual print operation of the print-interrupted job immediately after the end of the checking print operation. The timing to resume the print operation is time TY shown in FIG. 8. [Operation 3] is the operation of [step 3] shown in FIG. 8 that is performed during a period immediately before the end of the sequence shown in FIG. 8 after time TY shown in FIG. 8.

As is apparent from the control sequence shown in FIG. 8, in the use of the checking print function, the control unit 205 controls the printing system 1000 to continuously perform the print operation of the printing system 1000 without unnecessarily stopping it.

For example, the control unit 205 allows the printer unit 203 to perform the print operation, like [step 1] shown in FIG. 8, during the period from time T0 to time TX shown in FIG. 8. The control unit 205 controls the printing system 1000 to be able to maintain (continue) the print operation of the printer unit 203 without stopping it, like [step 2] shown in FIG. 8, even during the period from time TX to time TY shown in FIG. 8. In addition, the control unit 205 controls the printing system 1000 to be able to maintain (continue) the print operation of the printer unit 203 without stopping it, like [step 3] shown in FIG. 8, even during the period from time TY shown in FIG. 8 to the end of the sequence shown in FIG. 8.

In this manner, the printing system 1000 is configured to be able to continuously perform the print operation in the printing system 1000 without unnecessarily stopping it even when the printing system 1000 performs an operation concerning the checking print function.

The mechanism associated with the checking print function is also different from the test copy function.

As described above, when the operator designates the key 2304B during the actual print operation of job X by the printer unit 203 or the print status of the job meets the automatic checking print execution condition, the control unit 205 interrupts the actual print operation of job X. The control unit 205 causes the printing system 1000 to start the checking print operation of job X at the timing when the actual print operation of job X is interrupted. At the timing when the checking print operation of job X ends, the control unit 205 causes the printing system 1000 to resume (continue) the actual print operation of print-interrupted job X. After the actual print operation of job X is again in execution in this fashion, the control unit 205 causes the touch panel section 401 to automatically display the window 2300A for job X.

As described above, when the operator designates the key 2304B, the control unit 205 controls the touch panel section 401 to automatically end the popup display of the window 2300B and display the window 2300A for job X again. For example, the control unit 205 causes the touch panel section 401 to present a display shown in FIG. 9F at the timing when the actual print operation of job X resumes.

Figure 9F:
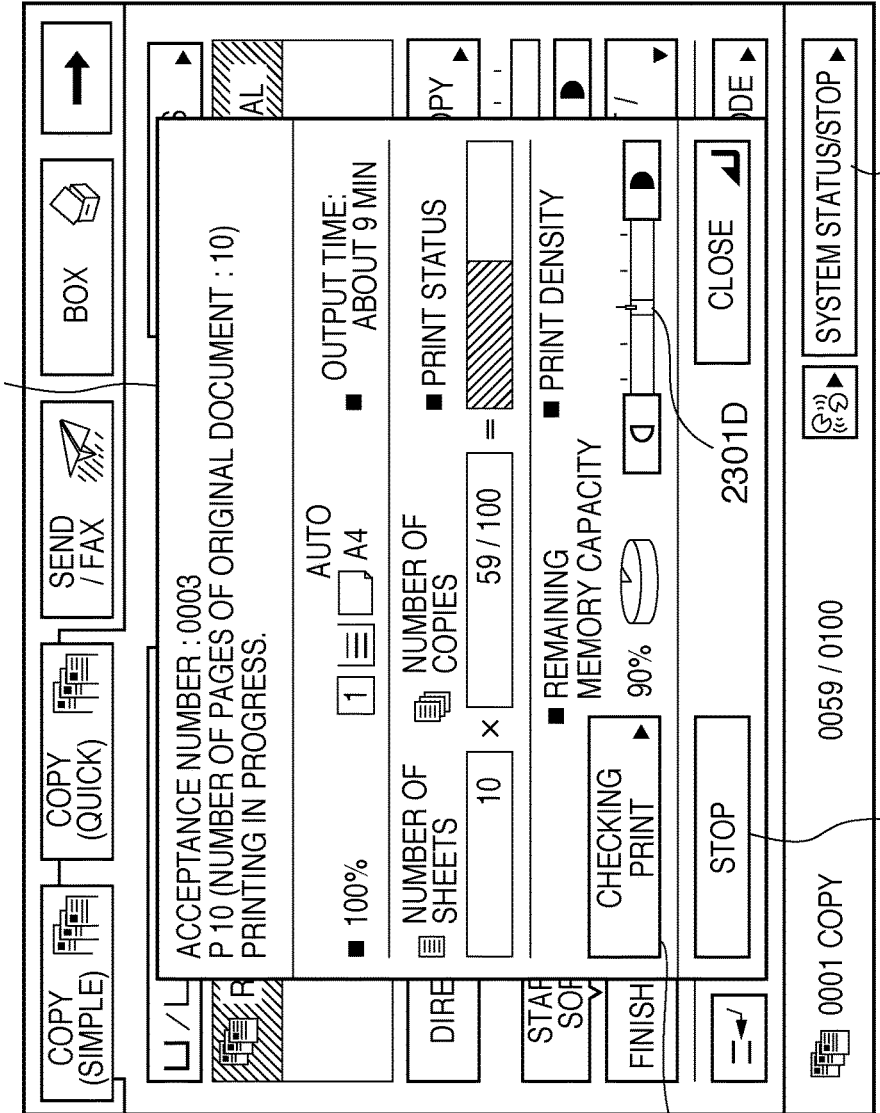
FIG. 9F is a view showing an example of a user interface window.

In the stage in which the touch panel section 401 presents the display shown in FIG. 9F, the checking print operation of job X has ended, and the print operation of job X has resumed. This stage is a stage in which the printing system 1000 performs the operation of [step 3] shown in FIG. 8.

As described above, assume that the control unit 205 causes the printing system 1000 to resume the print operation of job X automatically in response to the end of the checking print operation of job X. Further, assume that printing of the 10th sheet of the 59th copy (59th set) of job X is in execution now as the progress of the actual print operation of job X that has resumed in the printing system 1000. In this case, the control unit 205 controls the touch panel section 401 to update the display contents of the window for job X corresponding to a job of acceptance number 0001 to those reflecting the current print progress, as represented by the window 2300A shown in FIG. 9F.

The control unit 205 controls the touch panel section 401 to enable the above-mentioned "checking print" key 2301A even in the window 2300A shown in FIG. 9F that appears again in the touch panel section 401. Assume that the operator designates the active key 2301A in the window 2300A shown in FIG. 9F. In response to this key operation, the control unit 205 causes the touch panel section 401 to display the checking print type selection window 2300B shown in FIG. 9E again.

Assume that the operator designates the key 2304B again via the window 2300B shown in FIG. 9E that appears again in the touch panel section 401. In response to the second checking print request input by designating the key 2304B, the control unit 205 controls the printing system 1000 to sequentially perform the following operations.

Alternatively, assume that printing of job X proceeds, and the number of print sheets or the print execution time meets the automatic checking print execution condition again. In this case, the control unit 205 controls the printing system 1000 to sequentially perform the following operations in accordance with the automatic checking print execution condition.

[Operation A1]

The control unit 205 causes the printing system 1000 to interrupt again the actual print operation of job X that has resumed in the printing system 1000 in response to the end of the first checking print operation of job X.

[Operation A2]

Immediately after the print operation of job X is interrupted, the control unit 205 causes the printing system 1000 to perform the second checking print operation of job X. Also in the second checking print operation, print processing is performed using print data of job X whose print operation has been interrupted.

Assume that the operator has designated the key 2301B in the window 2300B prior to inputting the second checking print request by designating the key 2304B. In this case, the control unit 205 causes the printing system 1000 to perform the first type checking print operation as the second checking print operation. To the contrary, assume that the operator has designated the key 2302B in the window 2300B prior to inputting the second checking print request by designating the key 2304B. In this case, the control unit 205 causes the printing system 1000 to perform the second type checking print operation as the second checking print operation.

Similar to a checking print execution request via a key, if the operator has designated the key 1705 shown in FIG. 13B in advance when performing the checking print automatically, the control unit 205 causes the printing system 1000 to perform the first type checking print operation. If the operator has designated the key 1706 shown in FIG. 13B in advance, the control unit 205 causes the printing system 1000 to perform the second type checking print operation.

[Operation A3]

The control unit 205 causes the printing system 1000 to automatically resume (continue) the actual print operation of job X immediately after the end of the second checking print operation for job X. In this fashion, the second print resume operation of job X having undergone the checking print operation twice is done.

In the actual print operation of job X that resumes in [operation A3], the control unit 205 controls to print not print data which have been processed immediately before the start of [operation A2], but print data which have not been processed immediately before the start of [operation A2]. Assume that the operator inputs the second checking print request for job X via the key 2304B immediately after the display shown in FIG. 9F, or the print progress of job X meets the automatic checking print execution condition. In this case, pages up to the 10th page of the 59th copy of job X corresponding to a job requiring printing of a series of 10-page print data by a total of 100 sets have already been printed. Thus, in this case, the control unit 205 controls to print the 60th to 100th sets of job X as [operation A3].

On condition that the actual print operation of a print-resumed job has not been completed yet and is in execution now, the control unit 205 controls the operation unit 204 to permit accepting a checking print request again from the operator for the job. The control unit 205 also controls to resume determining whether to perform the checking print automatically. Assume that the operator inputs a checking print request again, or the print progress of the job meets the automatic checking print execution condition. In this case, the control unit 205 causes the printing system 1000 to perform again the above-described series of processes (i.e., interruption of the actual print operation, the checking print of a job, and resume of the actual print operation of the job) for a job whose checking print has been performed again.

As described above, as long as the actual print operation is in progress, the control unit 205 permits repetitively accepting a checking print request for the job from the operator. The control unit 205 controls the printing system 1000 to be able to perform the checking print operation of the job repetitively every time the checking print request is input. Even in the second mode (manual mode), the control unit 205 controls to be able to repetitively perform the checking print available to change the printing result and/or processing condition of a job in response to an explicit instruction from the user during the period till the completion of the job.

The control unit 205 controls the printing system 1000 to determine an automatic checking print execution condition and if the condition is satisfied, repetitively perform the checking print. Even in the first mode (automatic mode), the control unit 205 controls to be able to repetitively perform the checking print available to change the printing result and/or processing condition of a job without any explicit instruction from the user as long as the condition is satisfied during the period till the completion of the job.

Assume that the target job requires as many as 5,000 sheets, and the automatic checking print execution condition is every 20 min. In this case, for example, when the 1,000th sheet is printed, the operator performs the first checking print for the job. Then, when 1,500 sheets are printed, 20 min has elapsed after the start of printing, so the second checking print is performed in accordance with the automatic checking print execution condition without any execution request from the operator. When the 2,500th sheet is printed, the operator performs the third checking print for the job. Subsequently, when 3,000 sheets are printed, 40 min has elapsed after the start of printing, so the fourth checking print is performed in accordance with the automatic checking print execution condition without any execution request from the operator. Further, when the 4,000th sheet is printed, the operator performs the fifth checking print for the job. Finally, when 4,500 sheets are printed, 60 min has elapsed after the start of printing, so the sixth checking print is performed in accordance with the automatic checking print execution condition without any execution request from the operator.

In this way, the control unit 205 can control the printing system 1000 to periodically perform the checking print operation over and over even for a single job. Accordingly, for example, the operator can periodically check, without missing the checking print execution timing, whether the result of print materials output by the actual print operation of a job requiring large-volume printing is proper, like a sampling check, while the print operation continues. The operator can also periodically check, without decreasing productivity, whether the density of output results, the print position, or the like has changed while printing continues. For example, if the output results of actual print materials of a job requiring printing of a large number of sheets have changed, the printing conditions can be quickly changed to continue the print operation. This can provide an effect capable of preventing generation of the following problems:

(1) a problem that the operator notices that the output results of print materials have changed halfway only after inspecting all the printing results of a job requiring large-volume printing upon completion of all the actual print operation of the job.

(2) a problem that the operator performs the actual print operation of the job again from the beginning upon completion of all the actual print operation because problem (1) occurs. In addition, a problem as the waste of resources and a dead work time more than necessary due to the first problem in (2) such that resources are used more than necessary or an unnecessarily long work time is needed.

(3) a problem that the operator must always stay at the printing system in order to always inspect output results during output of a large-volume job though he checks the printing result of the job by the checking print. Another problem is that it is cumbersome when the operator must be aware of the timing to perform the checking print during output of a large-volume job.

Further in the embodiment, the control unit 205 controls the printing system 1000 to be able to selectively accept a plurality of types of requests including, e.g., at least one of the following requests (1) to (4) as an operator request permitted to be accepted from the operator immediately after performing the checking print operation.

[Operator Request (1) Control Unit 205 Permits to Accept Immediately after Performing Checking Print]

Request (1) is an operator request to suspend the actual print operation of a job that has resumed after performing the checking print operation.

The control unit 205 allows accepting request (1) from the operator via the operation unit 204 while the printing system 1000 resumes the actual print operation of a job having undergone the checking print. Upon accepting request (1), the control unit 205 controls the printing system 1000 to suspend the actual print operation. In this case, while the job is suspended, the control unit 205 controls the operation unit 204 to allow the operator to change a system-specific processing condition which influences the output results of the job and the printing results of another queued subsequent job. After the operator changes the processing condition, the control unit 205 controls the printing system 1000 to resume the actual print operation of the job under the changed processing condition. Upon completion of the print operation of the job, the control unit 205 controls the printing system 1000 to start, under the changed processing condition, the actual print operation of another queued subsequent job whose print data have been stored in the HDD 209.

In this manner, after performing the checking print of one job, the control unit 205 allows the operator to change (adjust) a print processing condition which is associated with a processing condition specific to the printing system 1000, and is a processing parameter influencing the output results of jobs including the job having undergone the checking print. "Influencing the output results of jobs including a job having undergone the checking print" means "common to a plurality of jobs". The control unit 205 allows the printing system 1000 to continuously perform the print operations of these jobs under the changed processing condition.

A concrete example of control based on request (1) will be explained using the above-described job X.

Assume that the actual print operation of job X has resumed now, and the print operation is in execution in the printing system 1000. When the print operation of job X has resumed, the operator visually checks the result of a checking print material of job X that has been output by the above-described checking print operation. Assume that as a result of visually checking the output result of the checking print material of job X, the operator determines that the processing condition specific to the printing system 1000 needs to be changed.

In this state, the control unit 205 controls the touch panel section 401 to enable a "system monitor" key 2301 even while the window 2300A is kept displayed, as shown in FIG. 9F.

In this state, assume that the operator designates the key 2301. In response to the operation of the key 2301, the control unit 205 causes the touch panel section 401 to display a window shown in FIG. 10A while the printing system 1000 continues the actual print operation of job X.

Figure 10A:
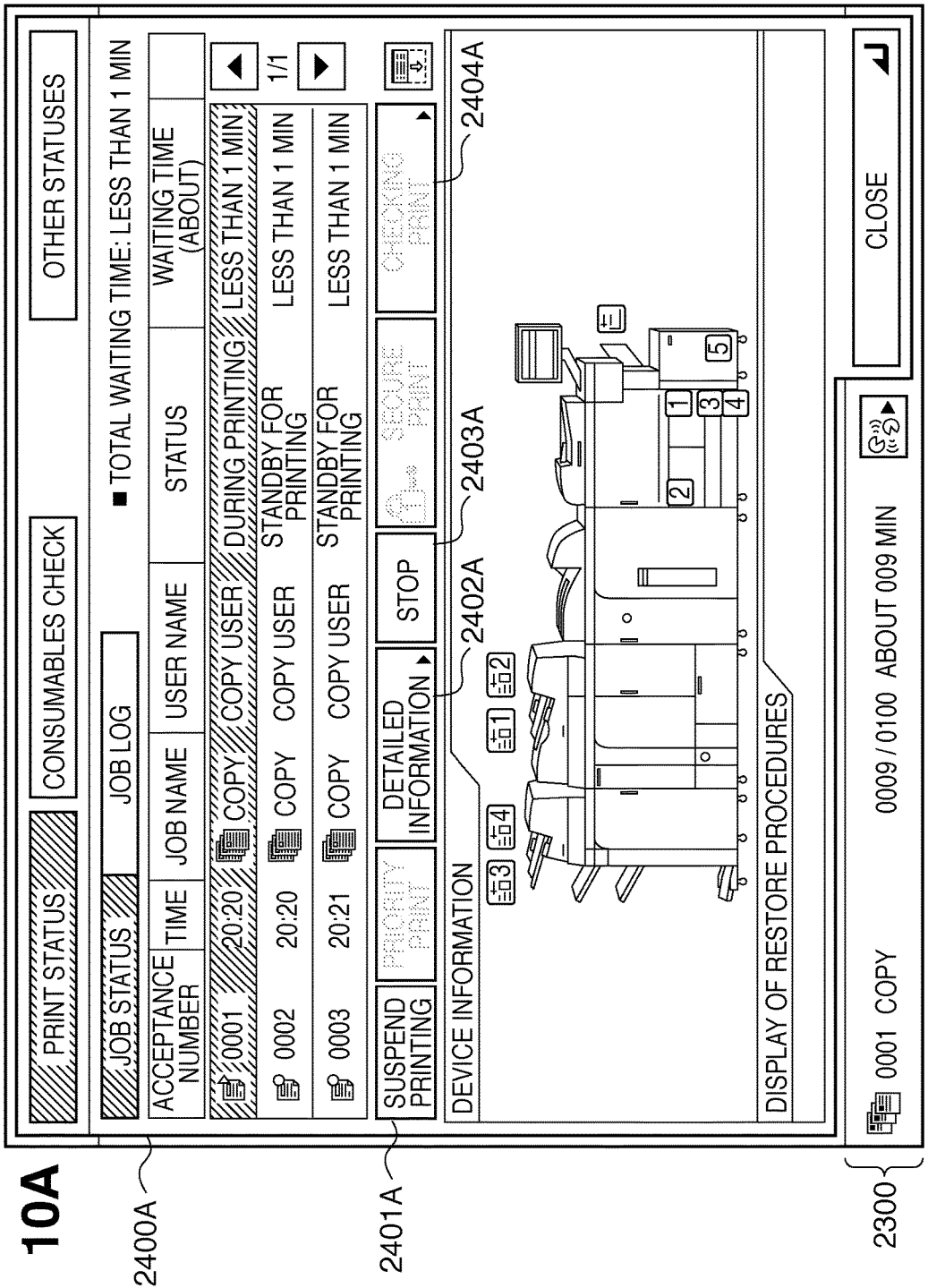
FIG. 10A is a view showing an example of a user interface window.

The control unit 205 controls the touch panel section 401 to display the display contents based on the following information in a window 2400A shown in FIG. 10A.

(Information 1)

Information 1 is system configuration information of the printing system 1000. This information notifies the operator of, for example, the number, types, and connection order of sheet processing apparatuses connected to the printing apparatus 100.

(Information 2)

Information 2 is information of jobs which include a job during printing and a queued job, have print data stored in the HDD 209, and are to be printed by the printer unit 203. For example, information 2 includes information on the acceptance number, acceptance time, job name (job type), user name, and status.

Based on (information 1) and (information 2), the control unit 205 controls the touch panel section 401 to display device information graphically representing the appearance of the printing system 1000 in the window 2400A, as shown in FIG. 10A.

Also based on (information 1) and (information 2), the control unit 205 controls the touch panel section 401 to display a job list at an upper portion in the display area of the window 2400A, as shown in FIG. 10A.

When displaying the job list, the control unit 205 displays pieces of information of jobs in the job list in distinction from each other. These jobs have print data stored in the HDD 209 and require the print operation by the printer unit 203. These jobs include a job during printing and a queued job.

The control unit 205 controls the order of jobs displayed in the job list in the window 2400A so that it coincides with the order of print execution requests accepted from the operator. That is, the control unit 205 displays pieces of information of jobs in the list in the same order as the order of processes by the printing system 1000.

The job list in the window 2400A is configured to allow the operator to select a desired one of jobs displayed in the job list in response to an operation by the operator to the touch panel section 401. When the operator touches the display line of any job among a plurality of jobs in the job list shown in FIG. 10A, the control unit 205 determines that the operator has selected the job.

When the operator selects a desired job from the job list in the window 2400A, the control unit 205 controls the touch panel section 401 to highlight the display line of the selected job so that the operator can specify the selected job. For example, in the display state of FIG. 10A, the operator selects job X.

The window 2400A further comprises the following display building elements.

The print suspension key 2401A is a display key which allows the operator to input an instruction to suspend the print operation of a job (job which requires the print operation by the printer unit 203 and whose printing has not been completed yet) selected from the job list in the window 2400A.

The control unit 205 controls the printing system 1000 to cancel the suspension of the print operation-suspended job and resume the print operation later in accordance with an instruction from the operator.

In the embodiment, when the operator inputs a print suspension instruction via the key 2401A, the control unit 205 can lock the start of performing the print operations of all jobs displayed in the job list of the window 2400A.

The control unit 205 may also control to lock (suspend) only the print operation of a job selected by the operator from the job list. Assume that the operator selects job X in the display state of FIG. 10A and designates the key 2401A. In this case, the control unit 205 may also control the printing system 1000 to suspend only the print operation of job X and perform the print operations of subsequent queued jobs such as jobs Y and Z.

When the operator does not designate the key 2401A, the control unit 205 causes the printer unit 203 to continue the print operation of a job (job X in this example) whose print operation is in execution, while causing the touch panel section 401 to keep displaying the window 2400A.

Even in this state, the control unit 205 updates the display of the display field 2300 in correspondence with the progress of the job, as needed, in order to notify the operator in real time of information on the job during printing. For example, printing of the fourth set in printing of 100 sets of job X is in execution in the stage of the display shown in FIG. 9D. However, job X progresses in the stage of the display shown in FIG. 9F.

Assume that the operator designates the key 2401A in the window 2400A shown in FIG. 10A. In response to the designation of the key 2401A, the control unit 205 causes the touch panel section 401 to popup-display a window 2400B exemplified in FIG. 10B.

The window 2400B is a print suspension confirmation window configured to allow the operator to determine whether to suspend the print operation of a job in progress.

Assume that the operator designates a key 2402B in the window 2400B. In this case, the control unit 205 controls the touch panel section 401 to end the display of the window 2400B and return to the display shown in FIG. 10A without stopping the print operation of job X in execution.

To the contrary, assume that the operator designates a key 2401B in the window 2400B. In this case, the control unit 205 stops the print operation of job X in execution. Accordingly, the control unit 205 suspends the print operation of job X.

Assume that the print operation by the printer unit 203 is suspended by the above-described method. In this state, assume that the operator designates the user mode key 505 of the operation unit 204. In response to this key operation, the control unit 205 causes the touch panel section 401 to present the window 2400C exemplified in FIG. 10C.

The window 2400C is a display window which allows the operator to change, in accordance with an instruction from him, processing conditions which commonly influence the printing result of one job printed by the printer unit 203 and those of other jobs. The window 2400C is used to cause the printing system 1000 to clean a plurality of units of the printing system 1000 including the printing apparatus 100.

Assume that the operator designates a "creep (deviation) correction amount adjustment" key 2490 in the window 2400C while the actual print operation of the above-described job X is suspended. In response to this operation, the control unit 205 causes the touch panel section 401 to display a creep correction amount adjustment window (not shown).

The creep correction amount adjustment window (not shown) is a display window configured to allow the operator to input an instruction to finely adjust the print position, on a print medium (print sheet), of an image to be printed on a print medium. This window (not shown) is also a display window configured to allow the operator to explicitly input a print image shift amount (creep correction amount) and the like.

The control unit 205 accepts the print position correction amount of an image on a print medium from the operator via the creep correction amount adjustment window (not shown). In the embodiment, the correction amount is a print processing condition specific to the printing system 1000. In the embodiment, this print processing condition is a parameter common to not only one job to be printed by the printer unit 203 but also other jobs.

Assume that the operator changes the "creep correction amount" via the creep correction amount adjustment window (not shown), and then inputs an instruction to resume the print operation of job X. When suspension of the print operation of job X is canceled to resume the print operation of job X, the control unit 205 sequentially performs the following exemplary processes.

First, the control unit 205 controls print processing of the printing apparatus 100 to adjust the print position of the print image of print data of job X on a print medium to a print position complying with the changed creep correction value.

Then, the control unit 205 controls print processing of the printing apparatus 100 to adjust the print position of the print image of print data of job Y on a print medium to a print position complying with the changed creep correction value also in the print operation of job Y subsequent to job X.

Further, the control unit 205 controls print processing of the printing apparatus 100 to adjust the print position of the print image of print data of job Z on a print medium to a print position complying with the changed creep correction value also in the print operation of job Z subsequent to job Y.

The control unit 205 controls the printing apparatus 100 to automatically start the print operation of job Y in accordance with the setting-changed correction value upon completion of the print operation of job X in accordance with the creep correction value whose setting has been changed by the operator via the window 2400C. The control unit 205 controls the printing apparatus 100 to automatically start the print operation of job Z in accordance with the setting-changed correction value upon completion of the print operation of job Y. In this way, the control unit 205 controls the printing system 1000 to automatically, successively process all target jobs while reflecting the correction value whose setting has been changed by the operator.

The printing system 1000 according to the embodiment is configured to deal with parameters in addition to the above-described one as "print processing conditions concerning the print operations of jobs", for which the operator is permitted to change settings after performing the checking print.

Assume that the operator designates a "density correction" key 2491 in the window 2400C while the actual print operation of job X is suspended. In response to this operation, the control unit 205 causes the touch panel section 401 to display a density correction window (not shown).

The density correction window (not shown) is a display window configured to allow the operator to input an instruction to finely adjust the print density of an image to be printed on a print medium (print sheet). This window (not shown) is a display window configured to allow the operator to explicitly input a print image density and the like.

Assume that the operator changes the density setting in the density correction window (not shown) to be higher than the print density of the image of print data of job X on a print medium in the checking print operation performed for job X. Then, assume that the operator inputs an instruction to resume the print operation of job X. When suspension of the print operation of job X is canceled to resume the print operation of job X, the control unit 205 sequentially performs, for example, the following exemplary job processes.

First, the control unit 205 controls print processing of the printing apparatus 100 to adjust the print density of the print image of print data of job X on a print medium to a print density complying with the changed density value (density correction value).

Then, the control unit 205 controls print processing of the printing apparatus 100 to adjust the print density of the print image of print data of job Y on a print medium to a print density complying with the changed density value even in the print operation of job Y subsequent to job X.

Further, the control unit 205 controls print processing of the printing apparatus 100 to adjust the print density of the print image of print data of job Z on a print medium to a print density complying with the changed density value even in the print operation of job Z subsequent to job Y.

As described above, also when the operator changes the setting of the print density via the window 2400C shown in FIG. 10C, the control unit 205 processes a plurality of jobs, similar to the above-described case. That is, the control unit 205 controls the printing system 1000 to automatically, successively process all jobs to be printed including jobs X, Y, and Z in accordance with the print density whose setting has been changed by the operator.

There are other print processing conditions concerning the print operations of jobs, in addition to processing conditions such as the "creep correction value" and "density correction value" described above. Other print processing conditions include "print processing conditions concerning automatic tone correction" and "processing conditions concerning text/background contrast adjustment". The control unit 205 also controls to allow the operator to change these print processing conditions via windows (not shown) displayed in the touch panel section 401 in response to operator operations to an "automatic tone correction" key 2492, "text/background contrast adjustment" key 2493, and the like.

In the embodiment, the control unit 205 can further accept an instruction from the operator via the window 2400C to perform the following exemplary cleaning by the printing system 1000.

(Feeder Cleaning)

This processing cleans the document feed unit of the auto document feeder (ADF) 301 in the scanner unit 201. A concrete example of performing this processing will be explained.

Assume that the operator designates a "feeder cleaning" key 2494 in the window 2400C while the actual print operation of job X is suspended. In response to this key operation, the control unit 205 causes the touch panel section 401 to display a feeder cleaning execution window (not shown) which allows the operator to input an instruction to start feeder cleaning by the ADF 301.

The feeder cleaning execution window (not shown) is a display window configured to present a guidance message such as "set about 10 blank sheets on the feeder and press the 'start' key" to the operator. This window (not shown) has a "start" key to cause the ADF 301 to clean the feeder.

Assume that the operator sets blank sheets for dirt removal on the document tray of the ADF 301 and designates the start key (not shown) in accordance with the guidance message. In response to this key operation, the control unit 205 causes the ADF 301 to feed the blank sheets. The ADF 301 successively feeds the blank sheets by document feed rollers. As a result, dirt such as powder of a pencil attached to the document feed rollers of the ADF 301 is removed from the document feed rollers and attaches to the blank sheets. By successively feeding a specific number of blank sheets for dirt removal, dirt is removed from the document feed rollers.

In the embodiment, the processing to cause the printing system 1000 to clean the feeder also falls within processing to change print processing conditions specific to the printing system 1000.

The control unit 205 controls the printing system 1000 to resume the print operation of job X and successively process a plurality of jobs including job X and subsequent jobs Y and Z after cleaning the feeder.

In the embodiment, the control unit 205 can accept an instruction from the operator via the window 2400C to perform the following exemplary cleaning by the printing system 1000.

(Wire Cleaning)

This processing cleans a wire unit (not shown) in the printer unit 203. A concrete example of performing this processing will be explained.

Assume that the operator designates a "wire cleaning" key 2495 in the window 2400C while the actual print operation of job X is suspended. In this case, the control unit 205 causes the touch panel section 401 to display a wire cleaning execution window (not shown) which allows the operator to input an instruction to start this cleaning by the printer unit 203.

The wire cleaning execution window (not shown) has a "start" key (not shown) to cause the printer unit 203 to clean the wire unit in the printer unit 203.

Assume that the operator presses the start key (not shown). In response to this, the control unit 205 causes the printer unit 203 to clean the wire unit (not shown) in the printer unit 203.

In the embodiment, the "processing to clean the wire unit (not shown) in the printer unit 203" also falls within processing to change print processing conditions specific to the printing system 1000.

The control unit 205 controls the printing system 1000 to resume the print operation of job X and successively process a plurality of jobs including job X and subsequent jobs Y and Z after cleaning the wire unit in the printer unit 203.

In addition to the above-mentioned cleaning processes, there is an item to clean the conveyance rollers of the printer unit 203 for conveying a print sheet. For example, when a "roller cleaning" key (not shown) is arranged in the window 2400C and the operator designates this key, the control unit 205 causes the printer unit 203 to clean the conveyance rollers in the printer unit 203. In the embodiment, the processing to clean the conveyance rollers also falls within processing to change print processing conditions specific to the printing system 1000. The control unit 205 controls the printing system 1000 to resume the print operation of job X and successively process a plurality of jobs including job X and subsequent jobs Y and Z after cleaning the conveyance rollers in the printer unit 203.

In the embodiment, assume that change of the above-mentioned print processing conditions is completed in accordance with an instruction accepted from the operator via the window 2400C while the print operation of job X is suspended. Then, assume that the operator designates the "system monitor" key 2301. In this case, the control unit 205 causes the touch panel section 401 to present the window 2400D exemplified in FIG. 10D while keeping the actual print operation of job X suspended.

Figure 10D:
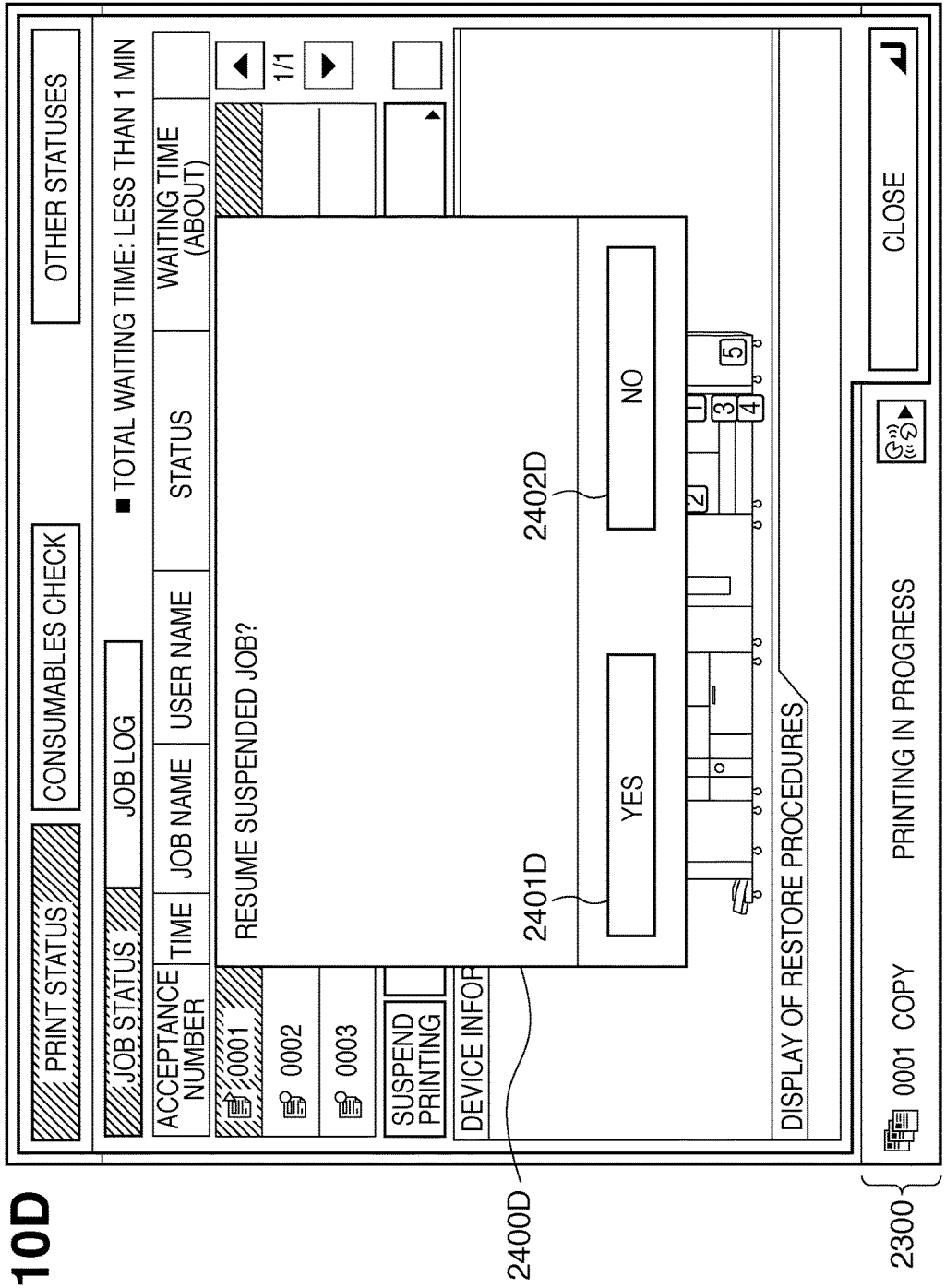
FIG. 10D is a view showing an example of a user interface window.

As shown in FIG. 10D, the control unit 205 causes the touch panel section 401 to popup-display the window 2400D while the display field 2300 displays information that the print operation of job X is suspended.

The window 2400D is a display window configured to allow the operator to determine whether to cancel the suspension of the print operation in the printing system 1000 and resume the print operation by the printer unit 203.

Assume that the operator designates a key 2402D in the window 2400D. In this case, the control unit 205 ends the display of the window 2400D without resuming the print operation by the printer unit 203 while keeping the print operation suspended. The control unit 205 causes the touch panel section 401 to display, e.g., the window 2400A again. The control unit 205 controls the touch panel section 401 to represent, in the job list of the window 2400A, that the print operation of job X is suspended.

In contrast, assume that the operator designates the key 2401D in the window 2400D. In this case, the control unit 205 cancels the suspension of the print operation in the printing system 1000, and causes the printer unit 203 to resume the print operation. By this control, the control unit 205 causes the printing system 1000 to resume the actual print operation of job X.

Assume that the operator has changed, via the window 2400C, print processing conditions commonly concerning the print operations of jobs including job X before the operator inputs an instruction via the key 2401D in the window 2400D. In response to the instruction from the user via the key 2401D, the control unit 205 causes the printing system 1000 to resume the actual print operation of job X. At this time, the control unit 205 causes the printing system 1000 to perform a print operation complying with the setting-changed print processing conditions accepted before the instruction from the user via the key 2401D. Upon completion of all the printing of job X, the control unit 205 causes the printing system 1000 to perform the print operation of job Y. Also in the print operation of job Y, the control unit 205 causes the printing system 1000 to perform a print operation complying with the setting-changed print processing conditions. Upon completion of all the printing of job Y, the control unit 205 causes the printing system 1000 to perform the print operation of job Z. Also in the print operation of job Z, the control unit 205 causes the printing system 1000 to perform a print operation complying with the setting-changed print processing conditions.

Note that various print processing conditions subjected to setting change in the window 2400C are all exemplary.

As described above, after the operator checks the output result of a checking print material by the checking print operation, the control unit 205 can accept a change of print processing conditions concerning the print operations of not only a job having undergone the checking print but also other jobs. Then, the control unit 205 can cause the printing system 1000 to print a plurality of jobs under the setting-changed print processing conditions.

In the embodiment, the printing system 1000 is configured to be able to change only print processing conditions specific to a job having undergone the checking print operation.

For example, the control unit 205 controls the touch panel section 401 to display the window 2300A again while the printing system 1000 resumes and continues the actual print operation of job X performing the checking print, as described with reference to FIG. 9F. The window 2300A, which can repetitively appear as long as the actual print operation is in execution, has a display key to select the print density.

Assume that the operator designates a print density adjustment key 2301D in the redisplayed window 2300A shown n FIG. 9F while the actual print operation of job X is resumed and continues.

In this manner, assume that the operator requests a change of the print density for job X during the resume operation for the print operation of job X. In this case, the control unit 205 controls the printing system 1000 to change the print density midway along a series of print steps of job X and continue the actual print operation of job X without stopping the actual print operation of job X. For example, the control unit 205 controls the printing system 1000 to print the print image of job X on a print medium at the changed print density at the timing when the image of job X is printed on a print medium fed from the paper feed unit immediately after the operator designates the print density adjustment key 2301D.

In this manner, the control unit 205 controls to automatically change the print density midway along a series of print steps in the actual print operation of job X in accordance with a print density change instruction accepted via the window 2300A.

The control unit 205 causes the printer unit 203 to start the print operation of job Y automatically after the actual print operation of job X ends. In this case, the control unit 205 controls the printing system 1000 to perform print processing based on a print density set by the operator for job Y in the print operation of job Y.

The control unit 205 causes the printer unit 203 to start the print operation of job Z automatically after the actual print operation of job Y ends. Also in this case, the control unit 205 controls the printing system 1000 to perform print processing based on a print density set by the operator for job Z in the print operation of job Z.

As described above, the operator can also change job-specific print processing conditions concerning a job having undergone the checking print operation but not concerning other jobs. The control unit 205 controls the printing system 1000 to perform the print operation upon changing only the settings of the print processing conditions of only the target job, and automatically process subsequent jobs in order in their print operations under job-specific printing conditions independently of the setting change.

The printing system 1000 according to the embodiment is also configured to meet the following request in addition to request (1).

[Operator Request (2) Control Unit 205 Permits to Accept Immediately after Performing Checking Print]

Request (2) is an operator request to stop (cancel) the actual print operation of a job whose actual print operation has resumed after performing the checking print operation.

Upon receiving request (2), the control unit 205 quickly stops the actual print operation of a job whose actual print operation has started immediately after performing the checking print operation.

A concrete example of request (2) will be described.

Assume that the actual print operation of job X that has resumed after the end of the checking print operation is in execution in the printing system 1000. In this state, assume that the operator selects a job of acceptance number 0001 corresponding to job X from the job list in the window 2400A. In this case, the control unit 205 highlights the display line of the job information. Then, assume that the operator selects job X from the job list and designates a stop key 2403A in the window 2400A. In response to this key operation, the control unit 205 causes the touch panel section 401 to display the window 2400F shown in FIG. 10E.

Figure 10E:
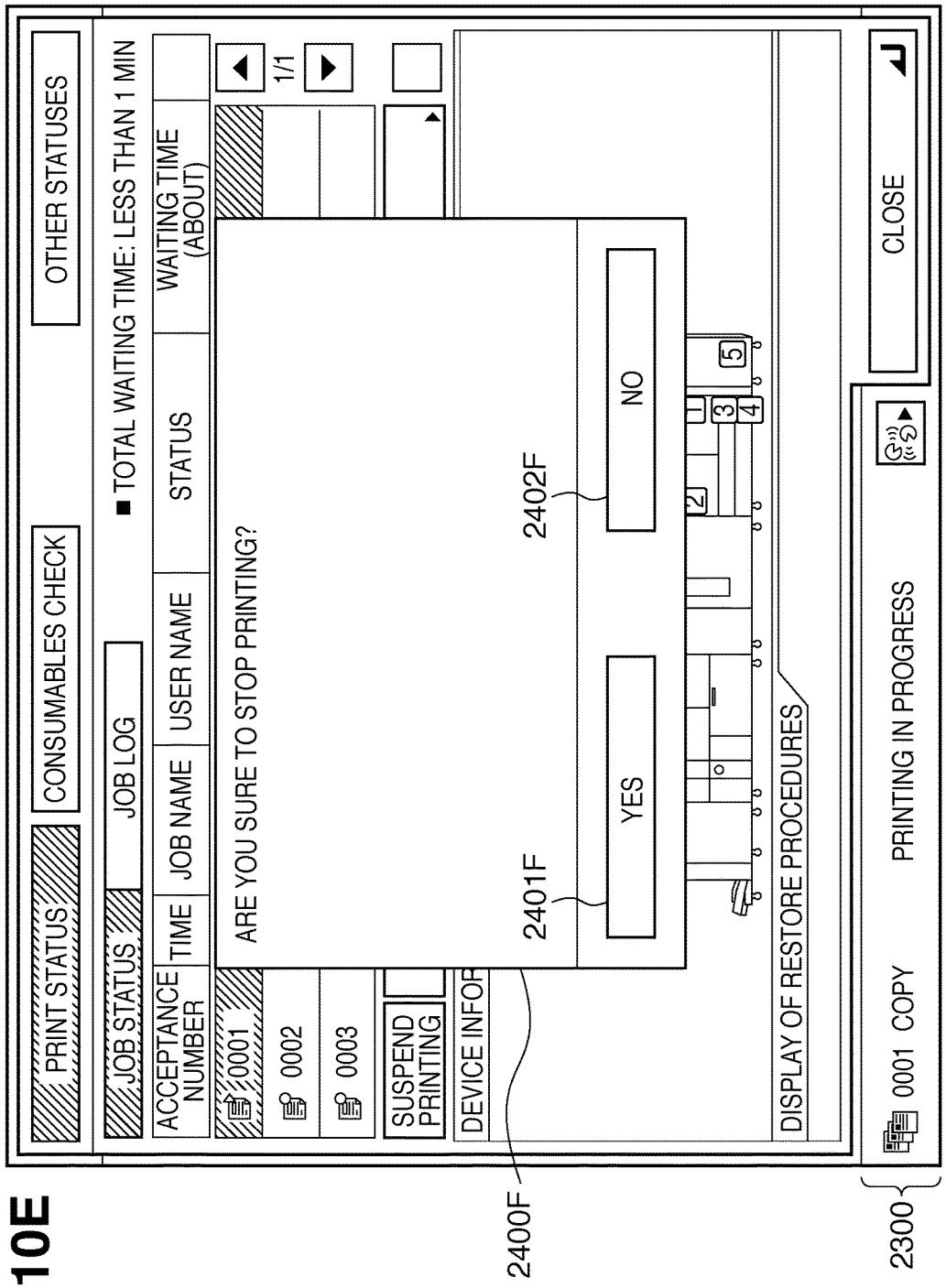
FIG. 10E is a view showing an example of a user interface window.

When the operator designates the stop key 2403A, the control unit 205 causes the touch panel section 401 to popup-display the window 2400F while the display field 2300 keeps displaying a message that job X is during printing, as shown in FIG. 10E.

The window 2400F is a display window configured to allow the operator to determine whether to cancel the print operation of a job (job X in this example) in execution.

Assume that the operator designates a key 2402F in the window 2400F. In this case, the control unit 205 causes the touch panel section 401 to end the display of the window 2400F while maintaining the print operation of job X in execution. The control unit 205 causes the touch panel section 401 to display the window 2400A again.

Assume that the operator designates the key 2401F in the window 2400F. In this case, the control unit 205 controls the printing system 1000 to stop the print operation of job X in execution. As the job stop processing, for example, the control unit 205 controls the printing system 1000 to perform all the following exemplary processes as the job stop process.

(Stop Processing 1)

The control unit 205 controls the printing apparatus 100 to stop the print operation of job X.

(Stop Processing 2)

The control unit 205 controls the printing apparatus 100 to erase 10-page print data of job X from the HDD 209.

(Stop Processing 3)

The control unit 205 controls the touch panel section 401 to delete job information of job X from the job list in the window 2400A.

As described above, when the operator uses the key 2401F to input an instruction to stop processing for job X, the control unit 205 controls the printing system 1000 to perform the stop processing (cancel processing) including (stop processing 1) to (stop processing 3). When the operator designates the key 2401F, the control unit 205 further performs the following control operations.

(Control 1)

The control unit 205 controls the printing apparatus 100 so that the printer unit 203 automatically starts the print operation of job Y immediately after performing the above-mentioned cancel processing for job X. The control unit 205 controls the touch panel section 401 to update the display contents of system configuration information in the window 2400A, and reflect and display the start of the print operation of job Y in the job list.

(Control 2)

The control unit 205 controls the printing apparatus 100 so that the printer unit 203 automatically starts the print operation of job Z upon completion of the print operation of job Y. The control unit 205 controls the touch panel section 401 to update the display contents of the window 2400A, and reflect and display the completion of the print operation of job Y and the start of the print operation of job Z in the job list.

Assume that the actual print operation of job X stops. In this case, for example, it is also possible to return the display to one shown in FIG. 5 or 9A, and set printing conditions for job X from the beginning. It is also possible to input job X again as a job requiring a print operation complying with the changed print processing conditions, and perform the print operation.

In this case, the control unit 205 controls the printing system 1000 to process job X input again after the processes of jobs Y and Z.

The printing system 1000 according to the embodiment is configured to meet even the following request in addition to request (2).

[Operator Request (3) Control Unit 205 Permits to Accept Immediately after Performing Checking Print]

Request (3) is an operator request to cause the touch panel section 401 to display detailed information on the actual print operation of a job whose actual print operation has resumed after performing the checking print operation.

The printing system 1000 according to the embodiment is configured to meet even the following request in addition to request (3).

[Operator Request (4) Control Unit 205 Permits to Accept Immediately after Performing Checking Print]

Request (4) is an operator request to perform the checking print of a job again while performing the actual print operation of the job that has resumed after performing the checking print operation.

A concrete example of request (4) has already been described in detail with reference to FIG. 9F, and a description thereof will not be repeated.

As exemplified with reference to FIGS. 10A to 10E, the control unit 205 can selectively accept the above-described four types of requests from the operator via the operation unit 204 immediately after causing the printing system 1000 to perform the checking print operation. The control unit 205 can selectively accept these four types of requests from the operator via the operation unit 204 while the actual print operation of a job having undergone the checking print operation resumes. Upon accepting one of these requests, the control unit 205 controls the printing system 1000 of the embodiment including the printing apparatus 100 to perform processing and an operation complying with the accepted request.

As described with reference to FIG. 9F, the control unit 205 accepts a checking print request repetitively from the operator for a job during printing, and determines the automatic checking print execution condition as long as the print operation of the job continues. However, the control unit 205 inhibits accepting a checking print request from the operator for a job not during printing, and does not determine the automatic execution condition.

Assume that the control unit 205 causes the touch panel section 401 to display the window 2400A shown in FIG. 10A in response to an instruction via the key 2301 while the printing system 1000 continues the actual print operation of job X.

Then, assume that the operator selects a job of acceptance number 0001 corresponding to job X from the job list in the window 2400A while the actual print operation of job X is in execution. In this case, the control unit 205 highlights the display line of the job information in the job list.

In this manner, assume that the operator selects the job of acceptance number 0001, i.e., job X during printing in the window 2400A. In this case, the control unit 205 controls the touch panel section 401 to enable a key 2404A in the window 2400A, as shown in FIG. 10A. When the operator designates the key 2404A, the control unit 205 controls the touch panel section 401 to display the window 2300B shown in FIG. 9E again. When the operator inputs a checking print request for job X again via the key 2304B, the control unit 205 causes the printing system 1000 to interrupt the actual print operation of job X again and perform the second checking print of job X, as described above. The control unit 205 can accept a checking print request from the operator via the window 2400A. As a result, the checking print operation can be performed a plurality of number of times for a single job without using the redisplayed window 2300A, as described with reference to FIG. 9F.

Assume that the operator selects a job not during printing from the job list in the window 2400A. For example, the operator selects job Y of acceptance number 0002 from the job list in the window 2400A. When the operator selects the queued job in the window 2400A, the control unit 205 controls the touch panel section 401 to disable the key 2404A in the window 2400A. As described above, when the operator selects a job not during printing via the operation unit 204, the control unit 205 controls the operation unit 204 to inhibit accepting a checking print request from the operator for the selected job. The control unit 205 controls the printing system 1000 to neither interrupt the print operation of job X nor perform the checking print operation of outputting the print materials of jobs Y and Z.

As described with reference to FIGS. 10A to 10E and the like, the configuration relevant to the checking print function of the printing system 1000 according to the embodiment has the following effects. More specifically, the operator can quickly, visually check a checking print material output by the checking print function for a job during printing in the printing system 1000. Even when the sheet feeding path in the printing system 1000 becomes long upon connecting a plurality of sheet processing apparatuses to the printing apparatus 100 as shown in FIG. 3, the operator can quickly, easily determine a job in progress and an image during printing. Even when the output destination of the print materials of a job during printing is an output destination inside a sheet processing apparatus such as the large-volume stacker or glue binding apparatus, the operator can quickly, easily determine a job in progress and an image during printing. In addition, all the processes can be periodically executed without bothering the operator to be aware of the timings to perform them. Even while the operator checks a checking print material, the printing system 1000 can continue the print operation without stopping it. Hence, the print operation can continue without unnecessarily decreasing high operating ratio of the printing system 1000.

The control unit 205 controls the printing system 1000 to complete a plurality of jobs after changing print processing conditions concerning a plurality of print jobs including a job subjected to the checking print operation and subsequent jobs, as described with reference to FIG. 10C. The embodiment can, therefore, provide an effect capable of building a printing environment where the qualities of the printing results of all jobs do not unnecessarily degrade even if no processing condition is changed individually for each job. The printing system 1000 is configured to be able to quickly cancel the actual print operation of job X when the checking printing result is undesirable, as described with reference to FIG. 10E and the like. As an effect obtained by the checking print operation, effects specific to a job subjected to the checking print operation can also be attained. A wasteful output can be suppressed as much as possible even in a printing environment where it is important to process a plurality of jobs at productivity as high as possible.

The control unit 205 causes the touch panel section 401 to present the window 2300A configured to be able to display the key 2301A while the actual print operation is in execution in [step 1] shown in FIG. 8.

Assume that the operator designates the active key 2301A as in the window 2300A shown in FIG. 9D in the touch panel section 401 while printing of a target job is in progress. In step S115 of FIG. 16B (to be described later), the control unit 205 determines, based on whether the operator has designated the active key 2301A, whether the control unit 205 has accepted a checking print request from the operator.

When the control unit 205 determines that the operator has designated the key 2301A, it causes the touch panel section 401 to display the window 2300B for selecting the type of checking print, as shown in FIG. 9E. This corresponds to a case where the control unit 205 determines YES in step S115 of FIG. 16B and advances the process to step S116.

The state in which the touch panel section 401 displays the window 2300B is the stage of [step 1] in FIG. 8, i.e., a state in which the actual print operation of a job subjected to the checking print operation continues.

Assume that the operator designates either the key 2301B or key 2302B, and then the key 2304B in the window 2300B. This corresponds to a case where the control unit 205 determines YES in step S117 of FIG. 16B.

As described above, in response to a checking print start instruction input when the operator designates the key 2304B, the control unit 205 interrupts the actual print operation in execution in the printing system 1000 for a job subjected to the checking print. Upon completion of interrupting the actual print operation, the control unit 205 causes the printing system 1000 to automatically start a checking print of a type corresponding to either the key 2301B or 2302B designated by the operator.

In the embodiment, when interrupting the actual print operation, the control unit 205 controls the printing system 1000 to perform, for example, the following control as the actual print operation interruption processing.

Assume that feed of print materials from the paper feed unit of the printing system 1000 for the actual print operation has already started upon receiving a checking print start instruction. In this case, the control unit 205 controls the printer unit 203 to print all the fed actual print materials. Further, the control unit 205 controls to discharge all the actual print materials of the printed job to the output destination (delivery destination) of a sheet processing apparatus used to hold the final product of the job. Then, the control unit 205 controls to hold the final product at the output destination.

In this manner, the control unit 205 causes the printing system 1000 to perform the above-described interruption processing if the printing system 1000 has already started feeding actual print materials when the operator inputs a checking print request or the automatic checking print execution condition is met.

The control unit 205 permits feeding a checking print medium for the job from the paper feed unit of the printing system 1000 even when all the actual print materials, feed of which has already started in the former or latter case, have not been discharged yet to the output destination of actual print materials.

This can prevent any delay of the checking print execution timing even if the print medium feeding path is long to some extent in the printing system 1000, as shown in FIG. 3.

The printing system 1000 according to the embodiment is configured to be able to start the checking print before the completion of discharging, to the output destination in the printing system 1000, all actual print materials which have already been fed upon receiving a checking print request. This can prevent generation of a trouble such as a delay of the timing when output of a checking print material is completed due to a trouble such as a delay of the checking print start timing. This can also prevent generation of a trouble such as the influence on the productivity of all jobs including not only a target job but also subsequent jobs due to a delay of the timing when the operator visually checks a checking print material or a delay of the timing when the actual print operation resumes, which delays are caused by the above-mentioned trouble.

In this manner, the control unit 205 controls the printing system 1000 to feed a checking print material from the paper feed unit even if feed of actual print materials has already started upon receiving a checking print start instruction and not all the actual print materials have been discharged to the output destination.

As a concrete example, the system configuration in FIG. 3 will be exemplified. Assume that the target job is a job whose print materials by the actual print operation are to be discharged to output destination Z of the saddle stitching apparatus 200-3c in FIG. 3. Assume that feed of the actual print materials of the job from the paper feed deck 319 has just started upon receiving a checking print start instruction.

In this case, for example, after confirming that actual print materials, feed of which has already started, have passed through point A in FIG. 3, the control unit 205 controls the printing apparatus 100 so that the operator takes out the checking print material of the job from the paper feed deck 319 and the feed processing starts. On condition that the actual print materials have passed through point A in FIG. 3, the control unit 205 starts feeding the checking print material regardless of whether the actual print materials have been discharged to delivery destination (output destination) Z.

In this fashion, the control unit 205 allows the printing system 1000 to start the checking print operation as quickly as possible after interrupting the actual print operation. Hence, the control unit 205 allows the printing system 1000 to perform the checking print operation without unnecessarily delaying the start of the checking print operation (by quickly starting the checking print operation).

In the embodiment, the printing system 1000 is configured to be able to perform the same operation as that of the above-mentioned configuration even when the actual print operation resumes after performing the checking print.

For example, referring back to FIG. 3, after confirming that a checking print material has passed through point A in FIG. 3, the control unit 205 controls the printing apparatus 100 so that the operator takes out the actual print materials of the job from the paper feed deck 319 and the feed processing starts. On condition that the checking print material of the job having undergone the checking print has passed through point A in FIG. 3, the control unit 205 starts feeding print materials necessary for the actual print operation of the job regardless of whether the checking print material has been discharged to the delivery destination (output destination).

As described above, the control unit 205 causes the printing system 1000 to start the checking print operation from time TX shown in FIG. 8 on the basis of a checking print start request or automatic checking print execution instruction input when the operator designates the key 2304B. The control unit 205 causes the printing system 1000 to automatically resume the actual print operation of the job having undergone the checking print upon completion of the checking print, i.e., from time TY shown in FIG. 8. This resume processing corresponds to [step 3] shown in FIG. 8.

In the resume processing for the actual print operation of the job, the control unit 205 controls the printing system 1000 to print only unprocessed print data during the period immediately before [step 2] shown in FIG. 8.

In the resume processing, the control unit 205 utilizes, as information necessary for even the resume processing, information which represents the process status (progress) of a target job and is used by the control unit 205 as information necessary for the display processing of the window 2300A. The control unit 205 controls to hold this information in the HDD 209 at least until the printing system 1000 completes all the actual print operation of the target job.

When the actual print operation resumes, the control unit 205 causes the touch panel section 401 to automatically display the window 2300A again for the job. For example, the control unit 205 allows the touch panel section 401 to display the window 2300A for the job during the resume operation for the actual print operation in [step 3] shown in FIG. 8. Assume that the current timing falls within the period from time immediately after the actual print operation of a given job starts to time immediately before the actual print operation of the job ends. In this case, the control unit 205 controls the printing system 1000 to repetitively perform the checking print operation of one job every time the operator inputs a checking print request via the key 2301A displayed again in the touch panel section 401, or the checking print is performed automatically.

During the execution period of the actual print operation which has resumed from time TY shown in FIG. 8 in the printing system 1000, the control unit 205 selectively accepts the above-mentioned operator requests (1) to (4) from the operator via the operation unit 204. The control unit 205 allows the printing system 1000 to perform processing corresponding to the accepted request.

In the embodiment, the control unit 205 controls the printing system 1000 to allow the operator to change the above-described settings specific to the printing system 1000 while continuing the actual print operation of the job that has resumed from time TY shown in FIG. 8. For example, the control unit 205 accepts a request via the window 2400C shown in FIG. 10C to change the settings specific to the printing system 1000 while the actual print operation resumes in [step 3] shown in FIG. 8. In this case, the control unit 205 controls the printing system 1000 to automatically change the print operation processing conditions of the job upon accepting the request. Also when performing the print operations of subsequent jobs to be processed after the current job, the control unit 205 controls the printing system 1000 to keep processing the subsequent jobs under the setting-changed print processing conditions accepted from the operator via the window 2400C.

Assume that the density of printing results gradually decreases as a result of performing the checking print for the same job repetitively at regular intervals. Even in this case, if the operator changes settings via the window 2400C to increase the density, the printing results of the job during printing and those of subsequent jobs can be output at proper print density.

Figure 16A:
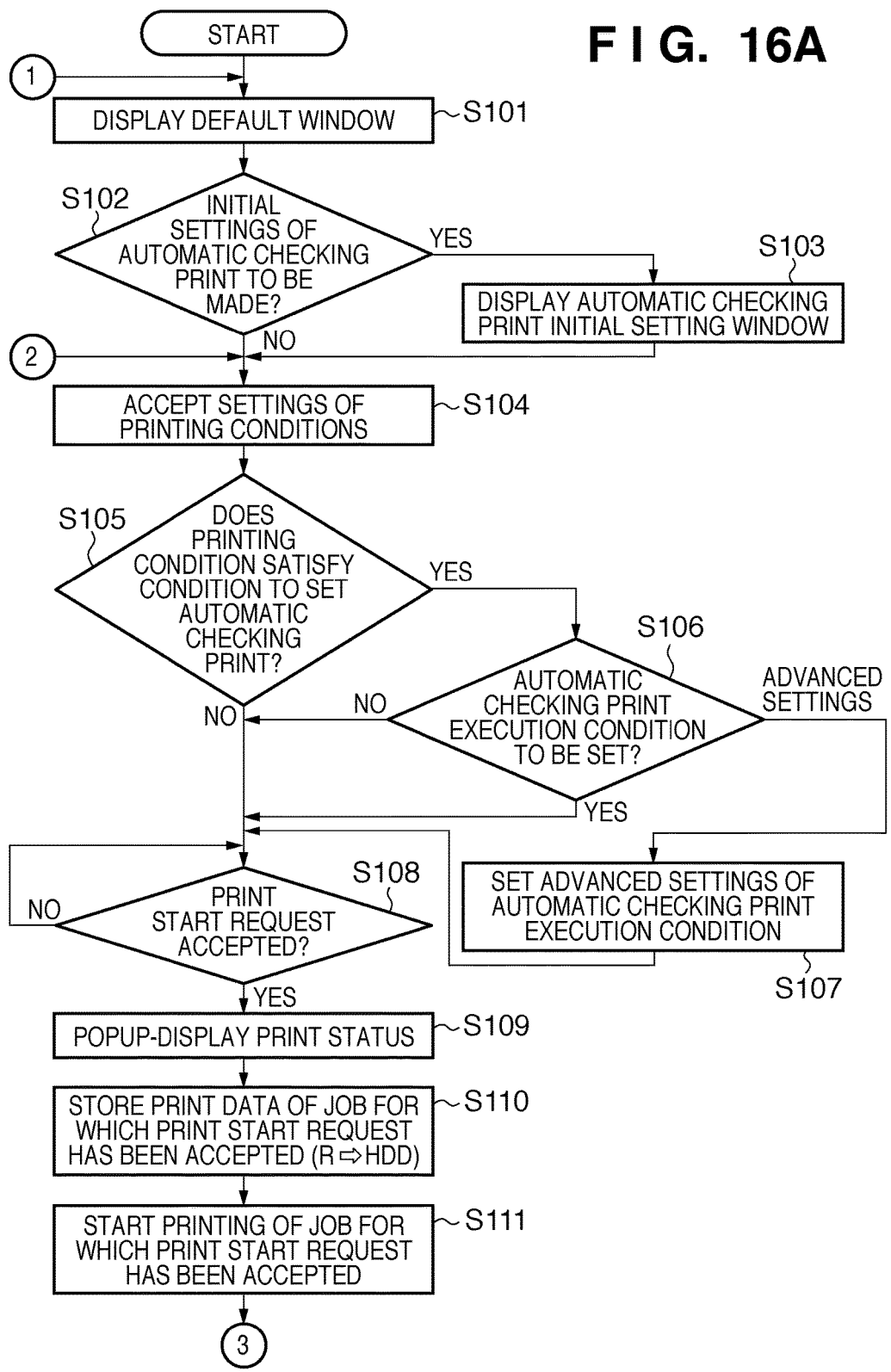
FIGS. 16A, 16B, and 16C are flowcharts each showing the process of a checking print operation performed by a control unit 205.
Figure 16B:
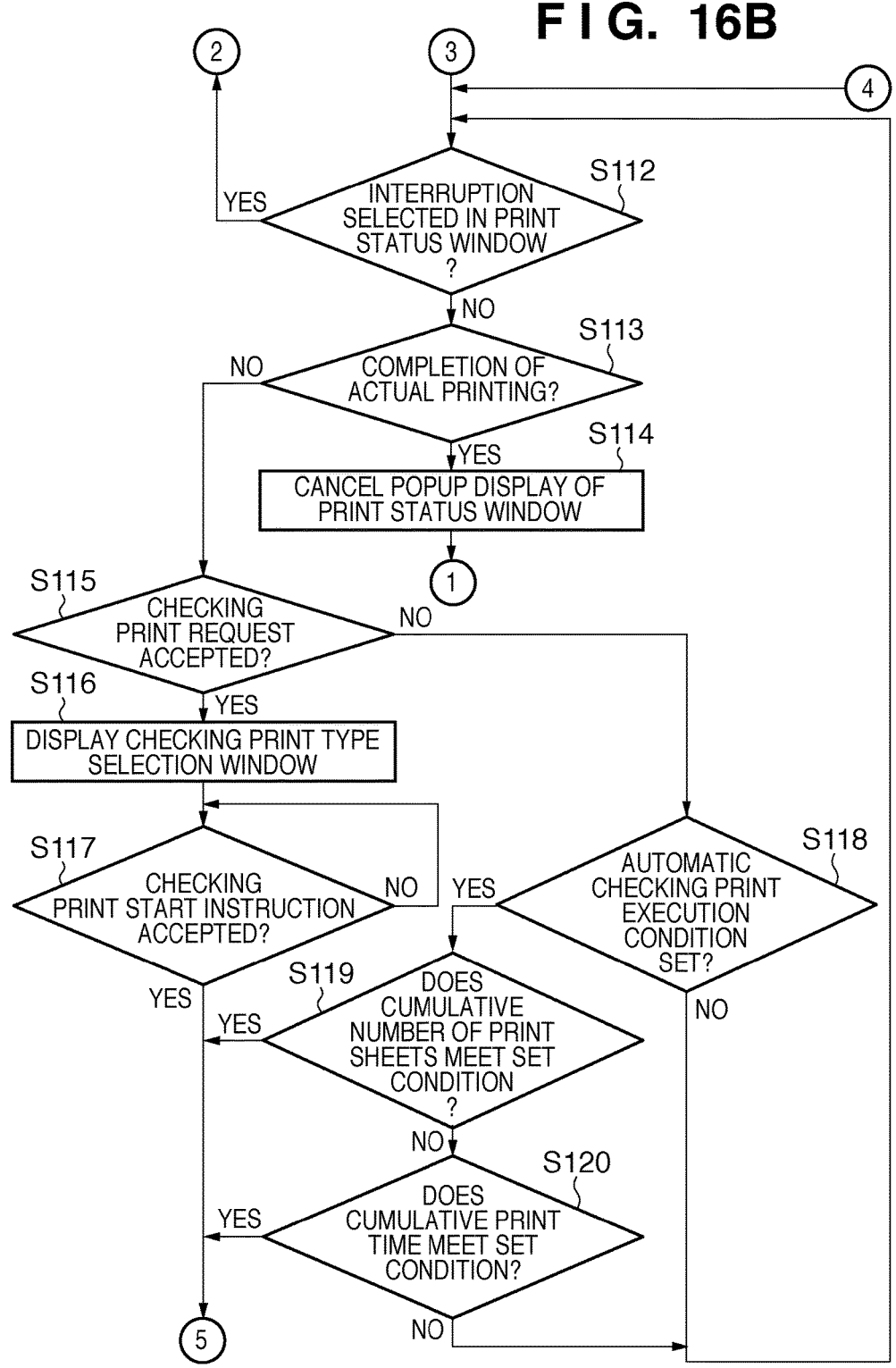
Figure 16C:
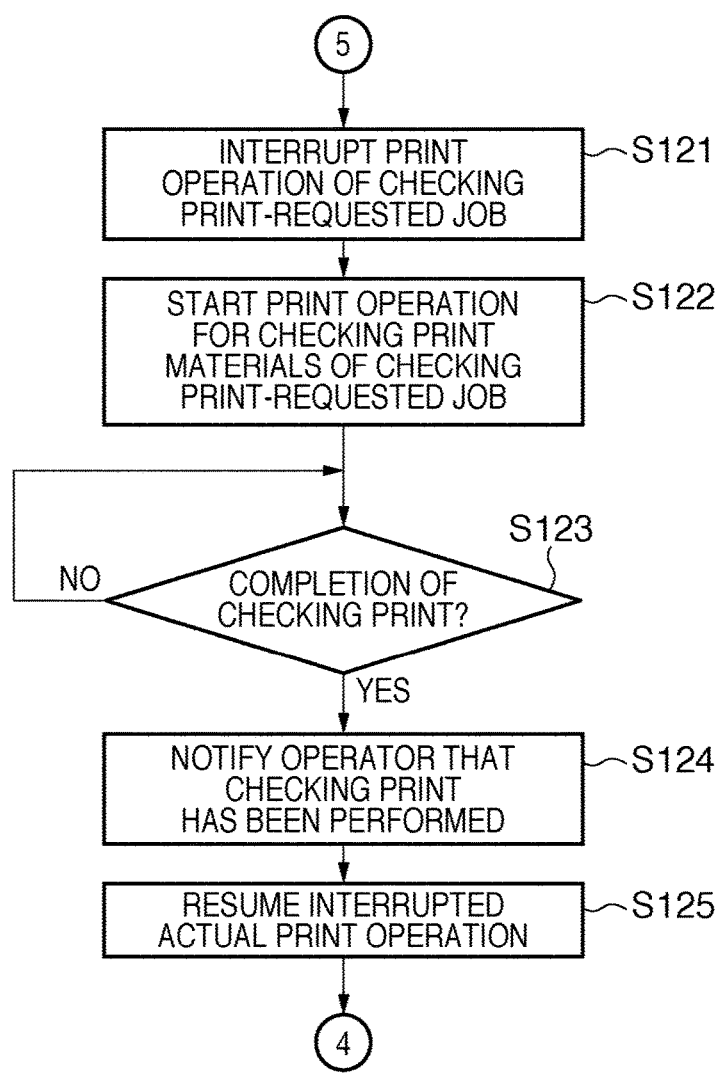

Flowcharts shown in FIGS. 16A, 16B, and 16C represent the process of the checking print operation performed by the control unit 205.

In step S101, the control unit 205 causes the touch panel section 401 of the operation unit 204 to display the default window of the printing system 1000 as shown in FIG. 5 after the printing apparatus 100 is turned on. Then, the control unit 205 advances to step S102.

In step S102, the control unit 205 causes the touch panel section 401 of the operation unit 204 to display the key 1401 as shown in FIG. 11A. The operator can designate the key 1401 to make the initial setting of the automatic checking print. If the operator designates the key 1401 to make the initial setting of the automatic checking print, the control unit 205 advances to step S103. If the operator does not make any initial setting, the control unit 205 advances to step S104.

In step S103, the control unit 205 causes the touch panel section 401 of the operation unit 204 to display a window (automatic checking print initial setting window) as shown in FIG. 11B. The operator can make the initial setting of the automatic checking print in the initial setting window. The operator can input the number of sheets of a print job, at which the automatic checking print function can be selected, in the area 1501 in the automatic checking print initial setting window. An initial setting input (set) in this window is applied to all print jobs after this setting. Then, the control unit 205 advances to step S104.

In step S104, the control unit 205 accepts the settings of various printing conditions in response to a key operation by the operator via the operation unit 204. Then, the control unit 205 advances to step S105.

In step S105, the control unit 205 obtains the number of print sheets of the print job from the number of print pages of the print job, and the number of copies serving as one of the printing conditions set in step S104. The control unit 205 determines whether the obtained number of print sheets meets the condition of the number of sheets of the print job set in step S103 at which the automatic checking print can be selected. If the obtained number of print sheets is equal to or larger than the number of sheets of the print job at which the automatic checking print can be selected, the control unit 205 determines that the automatic checking print can be performed for the print job. Then, the control unit 205 advances to step S106. If the obtained number of print sheets is smaller than the number of sheets of the print job at which the automatic checking print can be selected, the control unit 205 determines that no automatic checking print can be performed for the print job. Then, the control unit 205 advances to step S108.

In step S106, the control unit 205 causes the touch panel section 401 of the operation unit 204 to display the window (automatic checking print execution condition setting window) shown in FIG. 12. If the operator designates the key 1601 in the automatic checking print execution condition setting window, the control unit 205 sets execution of the automatic checking print. If the operator designates the OK key 1605 in this state, the control unit 205 sets execution of the checking print, and advances to step S108.

If the operator designates the OK key 1605 while designating an OFF key 1602 in the automatic checking print execution condition setting window, the control unit 205 advances to step S108 without setting execution of the checking print. If the operator designates the advanced setting key 1603, the control unit 205 advances to step S107.

In step S107, the control unit 205 causes the touch panel section 401 of the operation unit 204 to display the window (automatic checking print execution condition advanced setting window) shown in FIG. 13A. The operator can set a print execution sheet count and print execution time in the automatic checking print execution condition advanced setting window.

In step S107, the control unit 205 causes the touch panel section 401 of the operation unit 204 to display the window shown in FIG. 13B. If the operator designates the key 1705, the control unit 205 controls to perform the first type checking print operation. If the operator designates the key 1706, the control unit 205 controls to perform the second type checking print operation.

The control unit 205 writes the execution condition input by the operator over a predetermined execution condition setting held in advance, and holds the input execution condition. More specifically, in step S106, the operator designates the key 1601 to set execution of the checking print. However, if the operator does not designate the advanced setting key 1603 so as not to make any advanced setting in step S107, only execution of the automatic checking print is set. A detailed execution condition complies with a predetermined setting held in advance in the control unit 205.

The print execution sheet count of a print job is a condition to perform the checking print automatically every time the number of printed sheets reaches the number of sheets set as the print execution sheet count when the automatic checking print execution condition is determined.

If the operator sets the automatic checking print execution condition in step S107, the control unit 205 sets execution of the checking print in step S119 every set print execution sheet count of a print job. For example, the total number of print sheets of a job requiring printing of 10 copies each of 10 sheets is 100. If the operator sets "30 sheets" as the print execution sheet count via the key 1701, the control unit performs the checking print every time the cumulative number of print sheets reaches 30, 60, and 90.

Similarly, the print execution time of a print job is a condition to perform the checking print automatically every time the cumulative print execution time of a print job reaches the time set as the print execution time when the automatic checking print execution condition is determined.

In step S107, the control unit 205 sets execution of the checking print in step S120 every set print execution time of a print job. For example, when the operator sets "every 10 min" as the print execution time, the checking print is performed every 10 min till the completion of printing after the start of printing the print job.

The operator may also set either or both of the print execution sheet count and print execution time. When the operator sets both of the print execution sheet count and print execution time, the control unit 205 sets the checking print if the condition is satisfied in either of the processes in steps S119 and S120.

If the operator designates the key 1704 shown in FIG. 13A in step S107, the control unit 205 displays the window shown in FIG. 13B. In this window, the operator sets the type of checking print material when performing the checking print automatically on the basis of the automatic checking print execution condition set in the window shown in FIG. 13A. If the operator designates the "all pages" key 1705, the control unit 205 holds the setting to print all the pages of one copy in the print job as the checking print target. If the operator designates the "one page (auto)" key 1706, the control unit 205 holds the setting to print one page satisfying the above-described condition as the checking print target.

If the control unit 205 detects that the operator has designated the OK key 1708 in the window shown in FIG. 13B, it holds the type of checking print. Then, the control unit 205 advances to step S108.

In step S108, the control unit 205 determines, based on whether the operator has pressed the start key 503, whether it has accepted a print start request for the target job.

Assume that the operator inputs a series of print processing conditions via the operation unit 204 for the target job and then presses the start key 503. In this case, the control unit 205 detects the print start request (input from the start key 503), and determines YES in step S108. Then, the control unit 205 advances the process from step S108 to step S109.

In step S109, the control unit 205 controls the touch panel section 401 to popup-display the window (job process status window & print status window) 2300A shown in FIG. 9D and the like as a display representing the processing conditions (progress) of the print start-requested job.

The control unit 205 controls the printing apparatus 100 to perform a process in step S110 at the same time as (in parallel with) performing the process in step S109.

Assume that the job requires a document scan operation by the scanner unit 201. In this case, in step S110, the control unit 205 causes the scanner unit 201 to start the scan operation of the job. The control unit 205 stores the print data of the scanned job sequentially from the first page in the HDD 209. This storage operation continues until the print data of the final page of the job is stored in the HDD 209. The control unit 205 controls the printing system 1000 to execute, in step S110, the operation of storing print data of the print start-requested job in the HDD 209.

In step S111, the control unit 205 causes the printer unit 203 to read out, from the HDD 209, the print data of the job for which the print start request has been accepted in step S108, and print based on the readout print data. In step S111, the control unit 205 controls the printing system 1000 to perform a print operation complying with the series of print processing conditions of the job that has been accepted from the operator in step S104. Then, the control unit 205 advances to step S112.

The "print operation" performed in step S111 is the "actual print operation".

The control unit 205 controls to keep holding the print data of all the pages of the job in the HDD 209 until the printing system 1000 completes all the actual print operation. The control unit 205 controls the HDD 209 to allow using the print data of the job held in the HDD 209, as needed.

Further, the control unit 205 controls the touch panel section 401 to maintain the popup display of the window 2300A for the job in step S109 while performing the process in step S111.

As described with reference to FIG. 9D, the control unit 205 controls the touch panel section 401 so that the display contents of the window 2300A reflect in real time the actual process status (progress) of the target job in the printing system 1000.

The control unit 205 sets, in the printer unit 203, a print density set in the window 2300A displayed in step S109, and reflects the set print density in the print job in execution without stopping the print processing. Similarly when the print density is changed, the control unit 205 sets the changed print density in the printer unit 203, and quickly reflects it in the print job in execution.

This control continues until the actual print job is completed in step S113 after the window 2300A is displayed in step S109.

In step S112, the control unit 205 determines whether the operator has designated a stop key 2301C in the popup display of the window 2300A for the job shown in FIG. 9D in order to stop the print job in execution. Immediately when the operator designates the stop key 2301C, the control unit 205 controls to stop processing for the job by the printer unit 203. After the printing by the printer unit 203 stops, the control unit 205 advances to step S104 to allow making print settings for the print job.

The operator checks the print quality of a checking print material obtained by the checking print executed during printing (actual printing) of the print job, instead of the actual printing. Immediately after the end of printing by the checking print function, the actual printing resumes automatically. Thus, even while the operator checks the result of the checking print material, the actual printing is being executed. If the operator who has checked the printing result of the checking print material determines that the density is not proper, he operates the key 2301D in the window 2300A shown in FIG. 9D. Then, the operator can change the density of actual print materials during printing. If a quality other than the density is not proper, or no density can be adjusted by the above-mentioned density adjustment, the operator can designate the stop key 2301C to stop the print job in execution. After the print setting is changed, printing of the stopped print job is performed again.

In step S113, based on information from units (e.g., the printer unit 203 and sheet processing apparatus 200) necessary to process the job, the control unit 205 determines whether the printing system 1000 completes the actual print operation of the job that has started in step S111.

If the control unit 205 determines in step S113 that all the actual print operation of the job is complete, it advances the process from step S113 to step S114.

In step S114, the control unit 205 controls the touch panel section 401 to end the popup display of the window 2300A (cancel the popup window) for the job which has already started from the stage of step S109.

The control unit 205 controls the touch panel section 401 to automatically end the display of the window 2300A upon completion of the actual print operation. Also when the operator designates a "close" key in the window 2300A, the control unit 205 controls the touch panel section 401 to end the display of the window 2300A. After the end of the process in step S114, the control unit 205 returns to the process in step S101.

If the control unit 205 determines that all the actual print operation of the target job is not complete in the printing system 1000, it advances the process from step S113 to step S115.

In step S115, the control unit 205 determines whether the operator has input a checking print request to output the checking print material of the job while the printer unit 203 continues the actual print operation of the job in execution.

The determination in step S115 is based on whether the operator has designated the "checking print" key 2301A in the window 2300A that has been displayed in the touch panel section 401 for the job from the stage of step S109.

If the operator has not designated the key 2301A and the control unit 205 determines that he has not input any checking print request, the control unit 205 advances from step S115 to step S118.

If the operator has designated the key 2301A and the control unit 205 determines that he has input a checking print request, the control unit 205 shifts the process from step S115 to step S116.

In step S116, the control unit 205 causes the touch panel section 401 to display the window 2300B representing the type of checking print, as shown in FIG. 9E.

The control unit 205 causes the touch panel section 401 to display the window 2300B shown in FIG. 9E while the printer unit 203 continues the actual print operation of the job in execution. Then, the control unit 205 advances to step S117.

In step S117, the control unit 205 determines whether the operator has input a checking print start instruction for the job while continuing the actual print operation of the job.

The determination in step S117 is made by determining whether the operator has designated the key 2304B in the window 2300B shown in FIG. 9E.

Assume that the control unit 205 determines in step S117 that the operator has neither designated the key 2304B nor input a checking print start instruction. In this case, the control unit 205 waits until the operator selects the type of checking print in the window 2300B, without advancing the process from step S117. In this state, the control unit 205 controls the printing system 1000 so that the printer unit 203 continues the actual print operation of the job in execution.

Assume that the operator selects either the first or second type checking print operation with either the key 2301B or 2302B in the window 2300B, and designates the key 2304B. In response to the checking print start instruction input from the operator via the key 2304B, the control unit 205 advances the process from step S117 to step S121.

In step S118, the control unit 205 determines whether the automatic checking print execution condition has been set for the print job in execution. If the control unit 205 determines in step S118 that the automatic checking print execution condition has been set in step S106, it advances to step S119 in order to confirm whether the state of the print job in execution meets the execution condition. If the control unit 205 determines, in step S118 based on the setting in step S106, that no automatic checking print execution condition has been set, it returns the process from step S118 to step S112.

In step S119, the control unit 205 determines whether the cumulative number of print sheets of the print job in execution meets the automatic checking print execution condition set in step S106. The control unit 205 compares the cumulative number of sheets after the start of printing of the print job in execution with the automatic checking print execution condition set in step S106 or S107.

Assume that the operator sets printing of 10 copies of a 10-page original document as a print setting condition in step S104. In this case, assume that the operator sets in step S107 to perform the checking print every 20 copies.

If the cumulative number of print sheets of the print job in execution meets this condition, the control unit 205 advances from step S119 to step S121 to stop the print job in execution and start the checking print. If the cumulative number of print sheets of the print job in execution satisfies does not meet this condition, the control unit 205 advances to step S120 in order to determine the automatic checking print execution condition based on the print execution time.

In step S120, the control unit 205 determines whether the cumulative print time of the print job in execution meets the automatic checking print execution condition set in step S106. The control unit 205 compares the execution time till this determination after the start of printing of the print job in execution with the automatic checking print execution condition set in step S106 or S107. If the cumulative print time of the print job in execution meets the automatic checking print execution condition as a result of the comparison, the control unit 205 advances to step S121. If the cumulative print time of the print job in execution does not meet the automatic checking print execution condition, the control unit 205 returns the process to step S112 without performing the checking print.

In step S121, the control unit 205 interrupts the actual print operation of the checking print-requested job. This actual print operation is the print operation which has already started from the stage of step S111 in the printing system 1000. The control unit 205 controls the printing system 1000 to interrupt the actual print operation.

In step S122, the control unit 205 controls the printing system 1000 to automatically start the checking print operation of outputting the checking print material of the job immediately after interrupting (suspending) the actual print operation.

The control unit 205 controls the printing system 1000 to print the same print data as print data subjected to the actual print operation of the job on a print medium (also called print paper or a sheet) necessary for the checking print operation performed in step S122.

For this purpose, the control unit 205 controls the printing apparatus 100 to utilize, even in step S122, print data which has already been held in the HDD 209 by the process of step S110 and is necessary for the actual print operation of the job, as described above.

In the checking print operation performed in step S122, print data of all pages necessary for the actual print operation can be printed. This case corresponds to a case where the control unit 205 controls the printing system 1000 to perform the first type checking print operation in response to selection of the key 2301B.

In the checking print operation performed in step S122, print data of one page out of print data necessary for the actual print operation can also be printed. This case corresponds to a case where the control unit 205 controls the printing system 1000 to perform the second type checking print operation in response to selection of the key 2302B.

In this way, in step S122, the control unit 205 causes the printing system 1000 to perform an operation designated by the operator out of the first and second type checking print operations described above.

After step S122, the control unit 205 executes the process in step S123.

In step S123, the control unit 205 determines, based on information from various sensors arranged on the sheet feeding path in the printing system 1000, whether the checking print operation of the job that has started in step S122 is complete.

If the control unit 205 determines in step S123 that the checking print operation is not complete, it waits for the completion of the checking print operation without shifting to the next step.

If the control unit 205 determines in step S123 that the checking print operation is complete, it advances the process from step S123 to step S124.

In step S124, the control unit 205 executes a predetermined notification means. By this operation, the control unit 205 notifies the operator at a distance from the printing apparatus 100 that the checking print has been performed. Upon receiving the notification, the operator checks the quality of output materials.

The notification means executed by the control unit 205 to the operator in step S124 includes the following examples. That is, there are a notification on the UI (User Interface) of an application installed in the PC 104, and a notification on the UI of a Web application activated on a Web browser which runs in a PC on the network 101. There is also a notification by sending e-mail to the operator. There are further notifications by notification means such as the printing apparatus 100, a lamp or buzzer attached to the printing apparatus 100, a display on the UI, and a display on the UI of a terminal carried by the operator. A combination of these notification means can more reliably notify the operator that the checking print has been performed.

After notifying the operator by the notification means in step S124 that the checking print has been performed, the control unit 205 advances to step S125.

In step S125, the control unit 205 controls the printing system 1000 to perform (continue) the actual print operation of the job having undergone the checking print operation again from this timing.

In the actual print operation of the job that resumes in step S125, the control unit 205 controls the printing system 1000 not to print the print data of the job that have been processed immediately before interrupting the print operation of the job in step S121.

In step S125, the control unit 205 controls the printing system 1000 to print only the remaining print data of the job that have not been processed in the stage of step S121.

When performing again the actual print operation in step S125, the control unit 205 controls the printing apparatus 100 to utilize, even in step S125, print data which have already been held in the HDD 209 in step S110 or the like and are necessary for the actual print operation of the job, as described above.

After the process in step S125, the control unit 205 controls to return the process from step S125 to step S112.

If the process returns from step S125 to step S112, the control unit 205 controls the touch panel section 401 to display the window 2300A again on condition that the actual print operation is not complete, as described with reference to FIG. 9F.

The control unit 205 controls the printing system 1000 to shift the process again from step S113 to step S115 and perform the processes in steps S115 to S125 again.

[Other Mechanisms]

A host computer (e.g., the PC 103 or 104) may also execute an externally installed program to achieve the functions shown in the drawings. In this case, data for displaying the same windows as those described in the embodiment including respective windows are externally installed to provide various user interface windows on the display of the host computer.

For this purpose, a computer-readable storage medium which stores software program codes for implementing the functions of the above-described embodiment is supplied to a system or apparatus. The computer (CPU or MPU) of the system or apparatus reads out and executes the program codes stored in the storage medium, achieving the object of the present invention. In this case, the program codes read out from the storage medium implement new functions of the present invention, and the storage medium which stores the program codes constitutes the present invention. The program form is arbitrary such as an object code, a program executed by an interpreter, or script data supplied to an OS as long as a program function is attained.

The storage medium for supplying the program includes a flexible disk, hard disk, optical disk, magnetooptical disk, MO, CD-ROM, CD-R, CD-RW, magnetic tape, nonvolatile memory card, ROM, and DVD. In this case, the program codes read out from the storage medium implement the functions of the above-described embodiment, and the storage medium which stores the program codes constitutes the present invention.

As another program supply method, a client computer connects to an Internet homepage via the browser of the client computer. Then, the computer program of the present invention or a compressed file containing an automatic installing function is downloaded from the homepage to a recording medium such as a hard disk, thereby supplying the program. The program can also be supplied by grouping program codes which form the program of the present invention into a plurality of files, and downloading the files from different homepages. That is, the present invention also incorporates a WWW server, FTP server, and the like which prompt a plurality of users to download the program files for implementing functional processes of the present invention by a computer.

The program of the present invention can be encrypted, stored in a storage medium such as a CD-ROM, and distributed to a user. A user who satisfies predetermined conditions is prompted to download decryption key information from a homepage via the Internet. The user executes the encrypted program using the key information, and installs the program in the computer.

The functions of the above-described embodiment are implemented when the computer executes the readout program codes. Also, the functions of the above-described embodiment are implemented when an OS (Operating System) or the like running on the computer performs some or all of actual processes on the basis of the instructions of the program codes.

Further, the functions of the above-described embodiment are implemented in the following case. That is, the program codes read out from the storage medium are written in the memory of a function expansion board inserted into the computer or the memory of a function expansion unit connected to the computer. The CPU of the function expansion board or function expansion unit performs some or all of actual processes on the basis of the instructions of the program codes.

The present invention may also be applied to a system including a plurality of devices or an apparatus formed by a single device. The present invention can also be achieved by supplying a program to the system or apparatus. In this case, the system or apparatus can obtain the effects of the present invention by providing, to the system or apparatus, a storage medium which stores a software program for achieving the present invention.

The present invention is not limited to the above-described embodiment, and various modifications (including organic combinations of embodiments) can be made without departing from the gist of the invention, and are not excluded from the scope of the invention.

For example, in the embodiment, jobs controlled by the checking print function may also include a "print job for printing" issued from a PC application. In this case, the job also contains a form of instructing the checking print for the print job saved in the hard disk.

The embodiment has exemplified a configuration in which the control unit 205 of the printing apparatus 100 performs the above-described control operations. However, another control unit different from the control unit 205 may also execute some or all of the control operations described above. Examples of another control unit different from the control unit 205 are the external controller of a housing different from the printing apparatus 100, the CPU of a remote external apparatus such as the PC 104, and the CPU of an inline finisher. This configuration can further improve the effect capable of building a flexible printing environment complying with a printing environment where the printing system 1000 may be installed.

The embodiment can provide a convenient printing system with an eye toward a future digital printing system. For example, the embodiment can establish a convenient, flexible printing environment capable of coping with use cases and needs assumed in a POD environment described in Description of the Related Art. The embodiment can provide various mechanisms toward practical application of the printing system.

Various examples and embodiments of the present invention have been described. It is apparent to those skilled in the art that the spirit and scope of the invention are not limited to a specific description in this specification.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-229457 filed Sep. 4, 2007, which is hereby incorporated by reference herein in its entirety.

What is claimed is:

1. An image processing system including a printing unit, comprising:
   at least one processor and at least one memory coupled to each other and cooperating to act as:
   a print job acceptance unit configured to accept a print job;
   a first print unit configured to control the printing unit to perform a first print process which is a print process using print data of a the print job;
   a setting unit configured to receive, via a setting screen, an execution timing of a second print process which is a print process using a part of the print data of the print job before performance of the first print process, wherein the execution timing is specified by a user using the setting screen;
   an acceptance unit configured to accept, via a user interface, during performance of the first print process, a user instruction for performing the second print process; and
   a second print unit configured to control the printing unit to perform the second print process, the second print process being the print process using a part of the print data used in the first print process, during the performance of the first print process, the first print process being the print process using the print data of the print job, based on the execution timing of the second print process set by the setting unit and the user instruction which is accepted by the acceptance unit during the performance of the first print process,
   wherein, in a case where the second print unit controls the printing unit to perform the second print process based on the user instruction accepted by the acceptance unit during the performance of the first print process, the second print unit is configured to control the printing unit to perform the second print process using only one page of the print data of the print job of the first print process being performed when the acceptance unit accepts the user instruction, the only one page being defined by a timing at which the acceptance unit accepts the user instruction, a page to be printed by the second print process being a page varying in accordance with the timing at which the acceptance unit accepts the user instruction,
   wherein, in a case where the second print unit controls the printing unit to perform the second print process based on the execution timing of the second print process received by the setting unit, the second print unit is configured to control the printing unit to perform the second print process using print data of only one page defined by the execution timing of the second print process received by the setting unit,
   wherein a delivery destination of the second print process being performed based on the user instruction accepted by the acceptance unit during the performance of the first print process is the same as a delivery destination of the second print process being performed based on the execution timing of the second print process received by the setting unit,
   wherein both of the setting of the execution timing of the second print process by the setting unit and the acceptance of the user instruction for performing the second print process by the acceptance unit can be made for the accepted single print job, and
   wherein pages to be printed by the first print process include a same page as a page to be printed by the second print process.

2. The system according to claim 1, wherein the second print unit is configured to control the printing unit to perform the second print process during the performance of the first print process, every time a predetermined number of print sheets is printed.

3. The system according to claim 1, wherein the second print unit is configured to control the printing unit to perform the second print process during the performance of the first print process, at predetermined intervals.

4. The system according to claim 1, wherein the second print unit is configured to control the printing unit to output at least a print sheet obtained by the second print process to a tray being used for the second print process.

5. The system according to claim 1, wherein the delivery destination of the print sheet obtained by the second print process is different from a delivery destination of a print sheet obtained by the first print process.

6. The system according to claim 1,
wherein a paper feed command is issued to the printing unit for each page to be printed, and
wherein the second print unit is configured to control the printing unit to perform the second print process using print data of only one page for which the paper feed command is issued when the acceptance unit accepts the user instruction.

7. The system according to claim 1,
wherein a paper feed command is issued to the printing unit for each page to be printed, and
wherein the second print unit is configured to control the printing unit to perform the second print process using print data of only one page for which the paper feed command is issued at the execution timing.

8. The system according to claim 1,
wherein the user instruction for performing the second print process of the print job is acceptable by the acceptance unit via the user interface during performance of the first print process, even in a case where the execution timing of the second print process has been received by the setting unit via the setting screen before performance of the first print process.

9. The system according to claim 1, wherein the print job is a job for printing document data obtained by scanning using a scan unit.

10. A control method of an image processing system including a printing unit, comprising:
accepting a print job;
controlling the printing unit to perform a first print process which is a print process using print data of a the print job;
receiving, via a setting screen, an execution timing of a second print process which is a print process using a part of the print data of the print job before performing the first print process, wherein the execution timing is specified by a user using the setting screen;
accepting, via a user interface, during performance of the first print process, a user instruction for performing the second print process; and
controlling the printing unit to perform the second print process, the second print process being the print process using a part of the print data used in the first print process, during the performance of the first print process, the first print process being the print process using the print data of the print job, based on the execution timing of the second print process and the user instruction accepted during the performance of the first print process,
wherein, in a case where the printing unit is controlled to perform the second print process based on the user instruction accepted during the performance of the first print process, the printing unit is controlled to perform the second print process using only one page of the print data of the print job of the first print process being performed when the user instruction is accepted, the only one page being defined by a timing at which the acceptance unit accepts the user instruction, a page to be printed by the second print process being a page varying in accordance with the timing at which the user instruction is accepted,
wherein, in a case where the printing unit is controlled to perform the second print process based on the execution timing of the second print process received via the setting screen, the printing unit is controlled to perform the second print process using print data of only one page defined by the execution timing of the second print process received via the setting screen,
wherein a delivery destination of the second print process being performed based on the user instruction accepted during the performance of the first print process is the same as a delivery destination of the second print process being performed based on the execution timing of the second print process received via the setting screen,
wherein both of the setting of the execution timing of the second print process and the acceptance of the user instruction for performing the second print process can be made for the accepted single print job, and
wherein pages to be printed by the first print process include a same page as a page to be printed by the second print process.

11. The method according to claim 10, wherein the printing unit is controlled to perform the second print process during the performance of the first print process, every time a predetermined number of print sheets is printed.

12. The method according to claim 10, wherein the printing unit is controlled to perform the second print process during the performance of the first print process, at predetermined intervals.

13. The method according to claim 10, wherein the printing unit is controlled to output at least a print sheet obtained by the second print process to a tray being used for the second print process.

14. The method according to claim 10, wherein the print job is a job for printing document data obtained by scanning using a scan unit.

15. A non-transitory computer readable storage medium storing a computer program for causing a computer of an image processing system including a printing unit to function as:
a print job acceptance unit configured to accept a print job;
a first print unit configured to control the printing unit to perform a first print process which is a print process using print data of the print job;
an acceptance unit configured to accept, via a user interface, during performance of the first print process, a user instruction for performing a second print process which is a print process using a part of the print data of the print job;
a setting unit configured to receive, via a setting screen, an execution timing of the second print process before performance of the first print process, wherein the execution timing is specified by a user using the setting screen; and
a second print unit configured to control the printing unit to perform the second print process, the second print process being the print process using a part of the print data used in the first print process, during the performance of the first print process, the first print process being the print process using the print data of the print job, based on the execution timing of the second print process set by the setting unit and the user instruction which is accepted by the acceptance unit during the performance of the first print process, wherein, in a case where the second print unit controls the printing unit to perform the second print process based on the user instruction accepted by the acceptance unit during the performance of the first print process, the second print unit is configured to control the printing unit to perform the second print process using only one page of the print data of the print job of the first print process being performed when the acceptance unit accepts the user instruction, the only one page being defined by a timing at which the acceptance unit accepts the user instruction, a page to be printed by the second print process being a page varying in accordance with the timing at which the acceptance unit accepts the user instruction, wherein, in a case where the second print unit controls the printing unit to perform the second print process based on the execution timing of the second print process received by the setting unit, the second print unit is configured to control the printing unit to perform the second print process using print data of only one page defined by the execution timing of the second print process received by the setting unit, wherein a delivery destination of the second print process being performed based on the user instruction accepted by the acceptance unit during the performance of the first print process is the same as a delivery destination of the second print process being performed based on the execution timing of the second print process received by the setting unit, wherein both of the setting of the execution timing of the second print process by the setting unit and the acceptance of the user instruction for performing the second print process by the acceptance unit can be made for the accepted single print job, and wherein pages to be printed by the first print process include a same page as a page to be printed by the second print process.

16. The medium according to claim 15, wherein the second print unit is configured to control the printing unit to perform the second print process during the performance of the first print process, every time a predetermined number of print sheets is printed.

17. The medium according to claim 15, wherein the second print unit is configured to control the printing unit to perform the second print process during the performance of the first print process, at predetermined intervals.

18. The medium according to claim 15, wherein the second print unit is configured to control the printing unit to output at least a print sheet obtained by the second print process to a tray being used for the second print process.

19. The medium according to claim 15, wherein the print job is a job for printing document data obtained by scanning using a scan unit.

* * * * *